US012730359B2

(12) United States Patent
Lee

(10) Patent No.: US 12,730,359 B2
(45) Date of Patent: Sep. 8, 2026

(54) ACTUATOR DEVICE AND CAMERA DEVICE

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 121 days.

(21) Appl. No.: 18/730,622

(22) PCT Filed: Feb. 1, 2023

(86) PCT No.: PCT/KR2023/001443
§ 371 (c)(1),
(2) Date: Jul. 19, 2024

(87) PCT Pub. No.: WO2023/163404
PCT Pub. Date: Aug. 31, 2023

(65) Prior Publication Data

US 2025/0155779 A1 May 15, 2025

(30) Foreign Application Priority Data

Feb. 28, 2022 (KR) ........................ 10-2022-0026084

(51) Int. Cl.
*G03B 13/36* (2021.01)
*G03B 30/00* (2021.01)

(52) U.S. Cl.
CPC ............. *G03B 13/36* (2013.01); *G03B 30/00* (2021.01)

(58) Field of Classification Search
CPC .......... G03B 5/00; G03B 13/36; G03B 17/17; G03B 30/00; G03B 2205/0007; G03B 2205/0046; G03B 2205/0069; G02B 27/646; H02K 23/00; H02K 23/52; H02K 23/54; H02K 23/55; H02K 23/68; H02K 23/687; H02K 33/16
See application file for complete search history.

(56) References Cited

U.S. PATENT DOCUMENTS

| | | | |
|---|---|---|---|
| 2020/0371404 | A1 | 11/2020 | Saito |
| 2022/0014611 | A1 | 1/2022 | Yoon et al. |

FOREIGN PATENT DOCUMENTS

| | | | |
|---|---|---|---|
| CN | 110662998 | A | 1/2020 |
| CN | 114080562 | A | 2/2022 |
| JP | 2010-191130 | A | 9/2010 |

(Continued)

*Primary Examiner* — Jack Dinh
(74) *Attorney, Agent, or Firm* — Birch, Stewart, Kolasch & Birch, LLP

(57) ABSTRACT

The present embodiment relates to a camera device comprising: an image sensor; a reflective member; a lens; and a reflective member driving device, wherein the reflective member driving device includes a holder being coupled to the reflective member and a driving magnet being disposed in the holder, wherein the holder of the reflective member driving device includes a first surface, and second and third surfaces being disposed on both sides of the first surface, wherein the driving magnet includes a first driving magnet being disposed on a first surface of the holder and a second driving magnet being disposed on at least one of the second and third surfaces of the holder, wherein the second driving magnet includes a first surface facing a lens driving device, and wherein a yoke is disposed on the first surface of the driving magnet.

20 Claims, 36 Drawing Sheets

(56) References Cited

FOREIGN PATENT DOCUMENTS

| | | | |
|---|---|---|---|
| KR | 10-2013-0096810 | A | 9/2013 |
| KR | 10-1751105 | B1 | 6/2017 |
| KR | 10-2304672 | B1 | 9/2021 |
| KR | 10-2022-0011519 | B1 | 1/2022 |
| TW | I742899 | B | 10/2021 |

ACTUATOR DEVICE AND CAMERA DEVICE

CROSS REFERENCE TO RELATED APPLICATIONS

This application is the National Phase of PCT/KR2023/001443 filed on Feb. 1, 2023, which claims priority under 35 U.S.C. § 119 (a) to Patent Application No. 10-2022-0026084 filed in the Republic of Korea on Feb. 28, 2022, all of which are hereby expressly incorporated by reference into the present application.

TECHNICAL FIELD

The present embodiment relates to an actuator device.

BACKGROUND ART

A camera device is a device that takes a picture or video of a subject and is installed in an optical instrument such as a smartphone, a drone, or a vehicle.

In recent camera devices, in order to improve the quality of images in recent camera devices, optical image stabilization (OIS) function that compensates for image shaking caused by user movement, auto focus (AF) function that automatically adjusts the distance between the image sensor and the lens to align the focal length of the lens, and zoom function that increases or decreases the magnification of a distant subject through a zoom lens are being required (Patent Document 1) KR 10-2018-0095420 A

DETAILED DESCRIPTION OF THE INVENTION

Technical Subject

The present embodiment is intended to provide an actuator device in which an OIS function is implemented by tilting a reflective member.

Furthermore, it is intended to provide an actuator device that minimizes magnetic field interference to a lens driving device.

In addition, it is intended to provide an actuator device that reduces the possibility of coil disconnection.

Technical Solution

A camera device according to the present embodiment comprises: an image sensor; a reflective member; a lens disposed between the image sensor and the reflective member; a reflective member driving device for moving the reflective member; and a lens driving device for moving the lens, wherein the reflective member driving device comprises a holder being coupled to the reflective member and a driving magnet being disposed on the holder, wherein the holder of the reflective member driving device comprises a first surface, and second and third surfaces being disposed on both sides of the first surface, wherein the driving magnet comprises a first driving magnet being disposed on the first surface of the holder and a second driving magnet being disposed on at least one of the second surface and the third surface of the holder, wherein the second driving magnet comprises a first surface facing the lens driving device, and wherein a yoke may be disposed on the first surface of the driving magnet.

An actuator device according to the present embodiment comprises: a housing; a holder being disposed inside the housing; a reflective member being disposed in the holder; a magnet being disposed in the holder; a coil being disposed to interact with the magnet; and a moving plate being disposed between the housing and the holder, wherein the holder comprises a first surface on which the moving plate is disposed, a second surface connected to the first surface, and a third surface and a fourth surface being connected to the first surface and the second surface and being disposed at an opposite side to each other, wherein the magnet is disposed on at least one of the third and fourth surfaces of the holder, wherein the magnet comprises a first surface facing the same direction as the first surface of the holder, and a second surface opposite to the first surface of the magnet, and wherein a first yoke may be disposed on the second surface of the magnet.

The holder comprises a groove being concavely formed on the third surface and the fourth surface of the holder, wherein the magnet is disposed in the groove of the holder, and wherein the first yoke may be disposed between the second surface of the magnet and the holder.

The magnet comprises a third surface facing the coil and a fourth surface opposite to the third surface of the magnet, wherein a second yoke may be disposed between the fourth surface of the magnet and the holder.

The first yoke may be formed as a separate member from the second yoke.

A yoke may not be disposed between the first surface of the magnet and the holder.

The magnet comprises: a first sub magnet being disposed on the third surface of the holder; and a second sub magnet being disposed on the fourth surface of the holder, wherein the first yoke may be disposed on each of the first sub magnet and the second sub magnet.

The first yoke may not be overlapped with the first sub magnet in a direction in which the first sub magnet faces the second sub magnet.

An actuator device according to the present embodiment comprises: a housing; a holder being disposed inside the housing; a reflective member being disposed in the holder; a magnet being disposed in the holder; a coil being disposed to interact with the magnet; and a moving plate being disposed between the housing and the holder, wherein the holder comprises a first surface on which the moving plate is disposed, a second surface connected to the first surface, and third and fourth surfaces being connected to the first surface and the second surface and being disposed opposite to each other, wherein the magnet is disposed on at least one of the third and fourth surfaces of the holder, wherein the magnet comprises a first surface facing the same direction as the first surface of the holder, a second surface opposite to the first surface of the magnet, a third surface facing the coil, and a fourth surface opposite to the third surface of the magnet, and wherein the magnet may comprise a first recess being formed at a corner region where the second surface of the magnet and the fourth surface of the magnet meet.

The first recess may be a shape in which a part is omitted when compared to the corner area where the second surface of the magnet and the third surface of the magnet meet.

The first recess may comprise an inclined surface connecting the second surface of the magnet and the third surface of the magnet in an inclined manner.

The length of the third surface of the magnet may be longer than the length of the fourth surface of the magnet in a direction in which the first surface of the magnet faces the second surface of the magnet.

The magnet may comprise a second recess being formed at a corner region where the first surface of the magnet and the fourth surface of the magnet meet.

The length of the second surface of the magnet may be 40 to 60% of a distance between the third surface of the magnet and the fourth surface of the magnet in a direction in which the third surface of the magnet faces the fourth surface of the magnet.

A camera device according to the present embodiment may comprise: a printed circuit board; an image sensor being disposed in the printed circuit board; actuator devices; and a lens being disposed in an optical path being formed by the reflective member of the actuator device and the image sensor.

An optical device according to the present embodiment may comprise: a main body; a camera device being disposed in the main body; and a display being disposed in the main body and outputting at least one of a video and an image photographed by the camera device.

Advantageous Effects

Through the present embodiment, magnetic interference of the magnet of the reflective member driving device affecting to a lens driving device can be minimized.

In more detail, by additionally placing a yoke on a driving magnet of a reflective member driving device, a phenomenon in which leakage flux being generated from the reflective member driving device and the magnetic field interference with the driving magnet of the lens driving device can be minimized.

In addition, disconnection due to an impact at the start line of the coil can be prevented.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a reflective member driving device according to the present embodiment will be described with reference to drawings.

Figure 1:
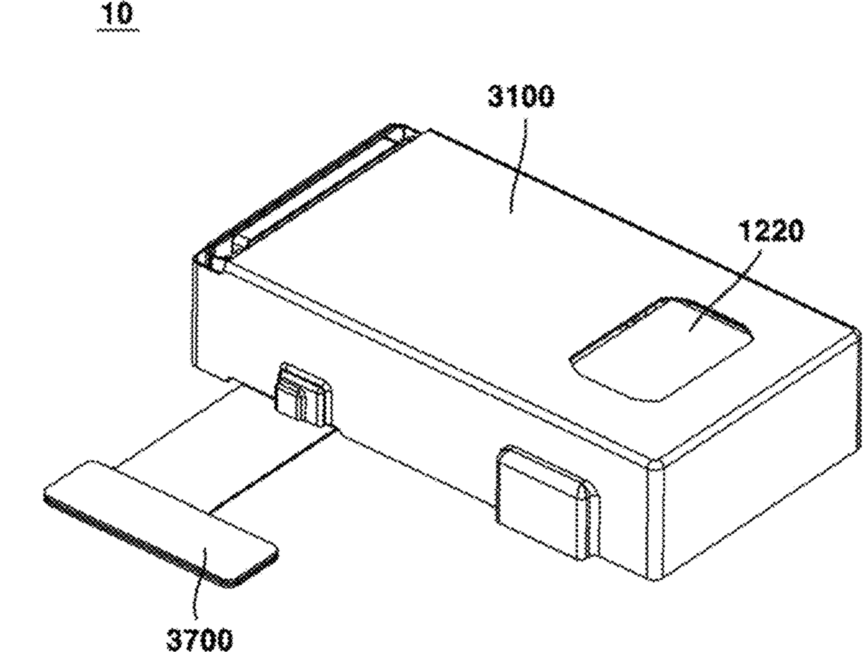
FIG. 1 is a perspective view of a camera device according to the present embodiment.
Figure 2:
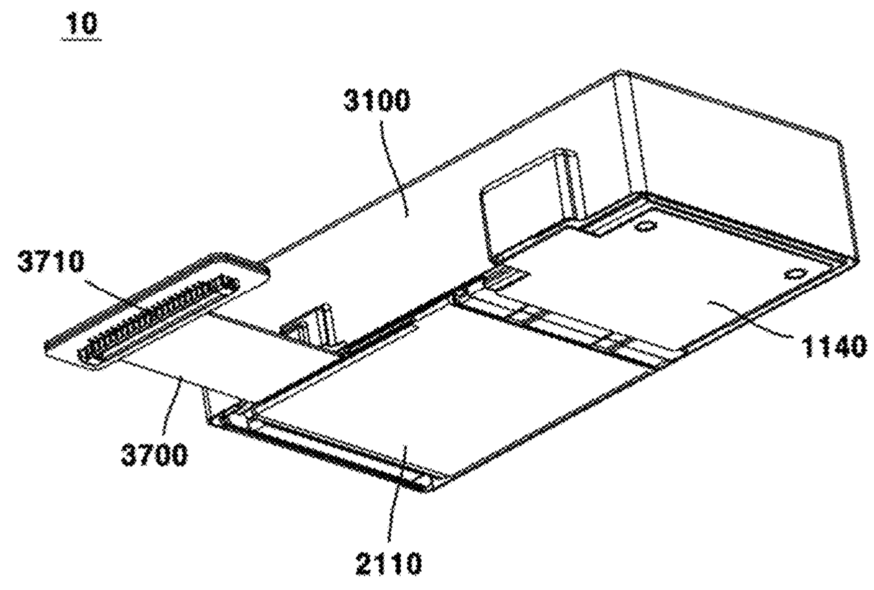
FIG. 2 is a bottom perspective view of a camera device according to the present embodiment.
Figure 3:
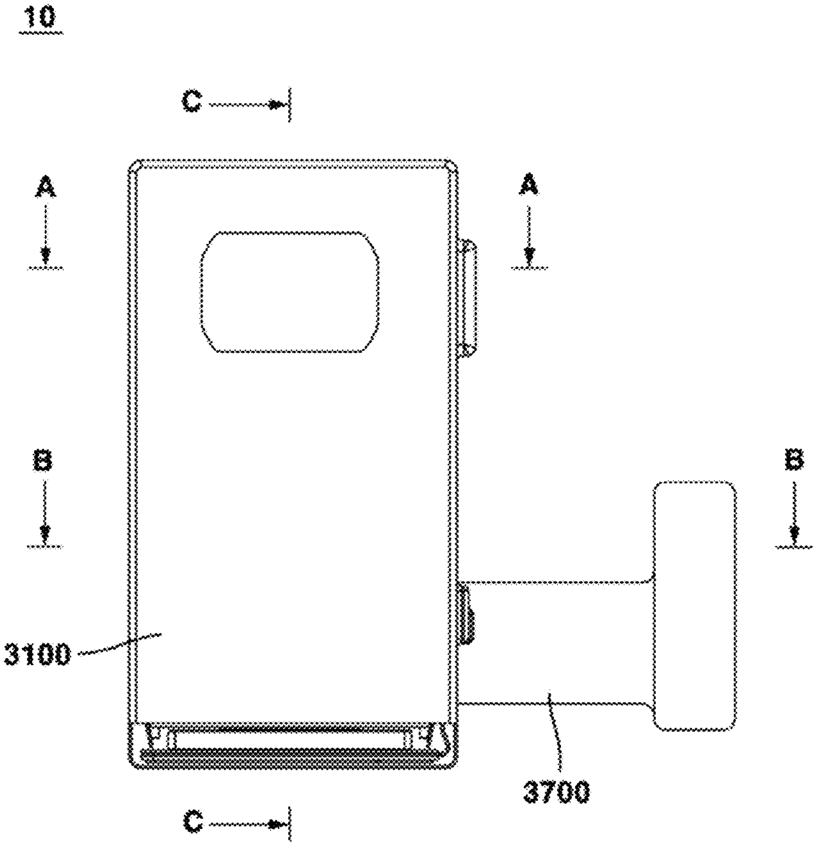
FIG. 3 is a plan view of a camera device according to the present embodiment.
Figure 4:
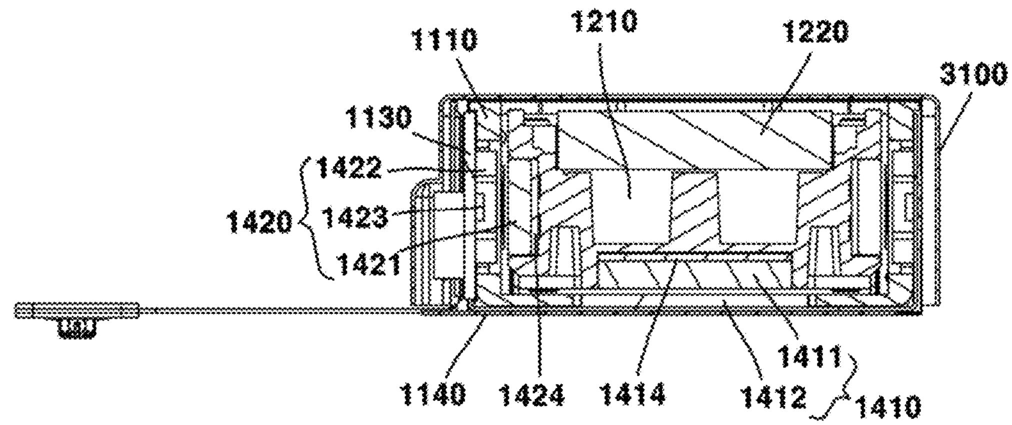
FIG. 4 is a cross-sectional view seen from A-A in FIG. 3.
Figure 5:
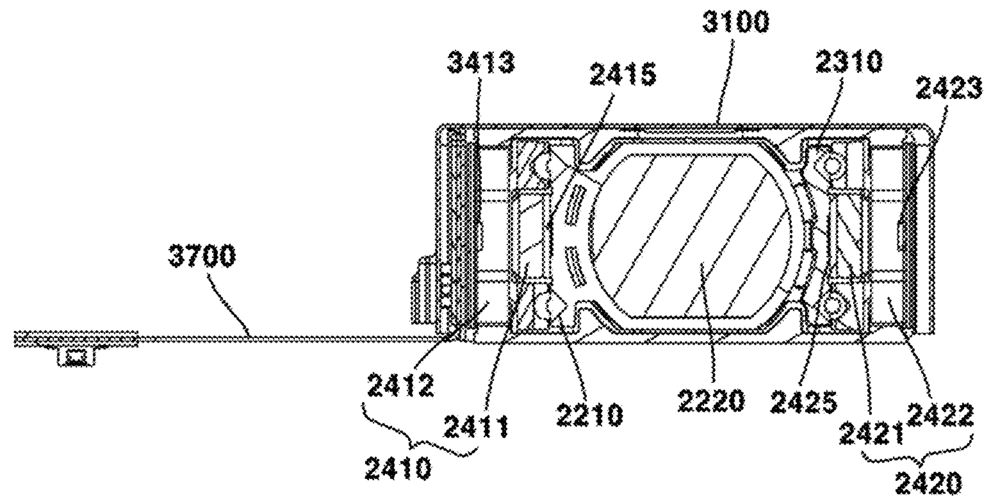
FIG. 5 is a cross-sectional view seen from line B-B in FIG. 3.
Figure 6:
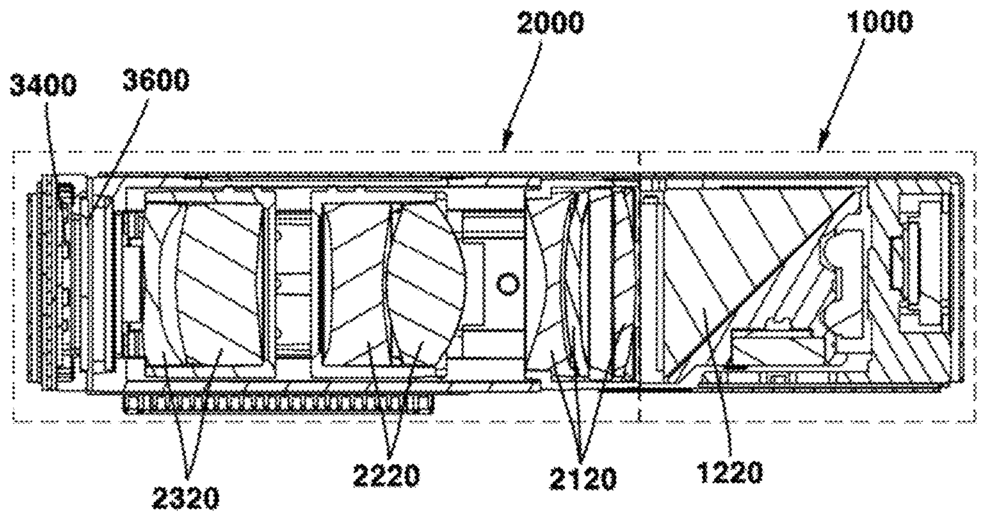
FIG. 6 is a cross-sectional view seen from C-C in FIG. 3.
Figure 7:
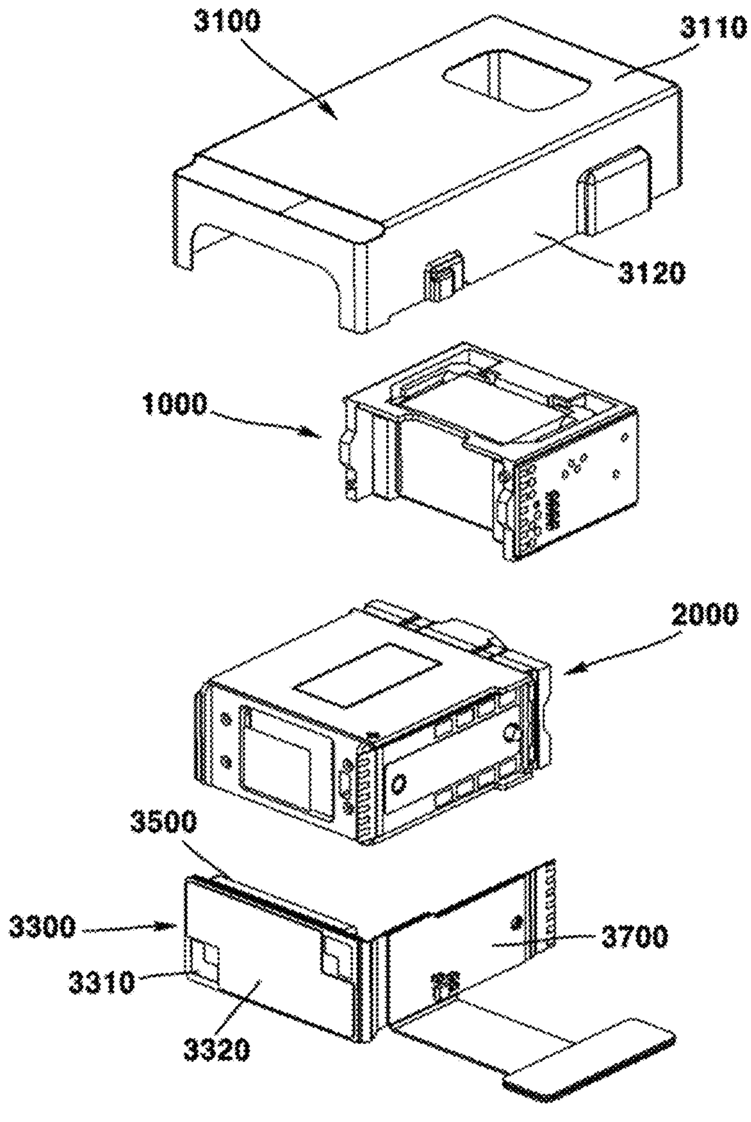
FIG. 7 is an exploded perspective view of a camera device according to the present embodiment.
Figure 8:
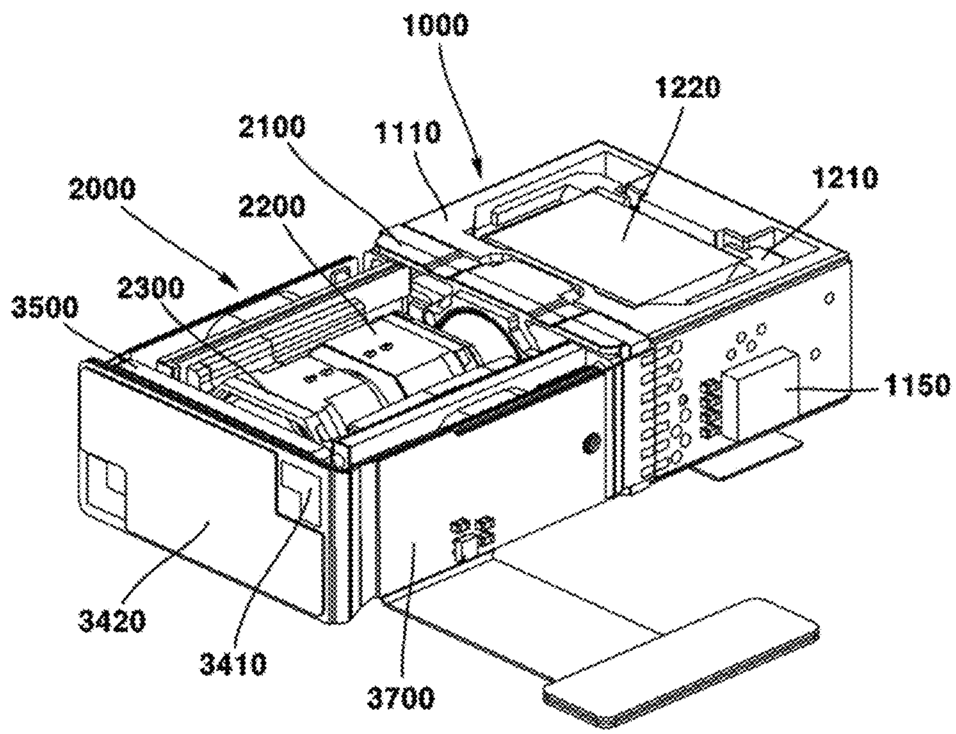
FIG. 8 is a perspective view in which a cover member is omitted from the camera device according to the present embodiment.
Figure 9:
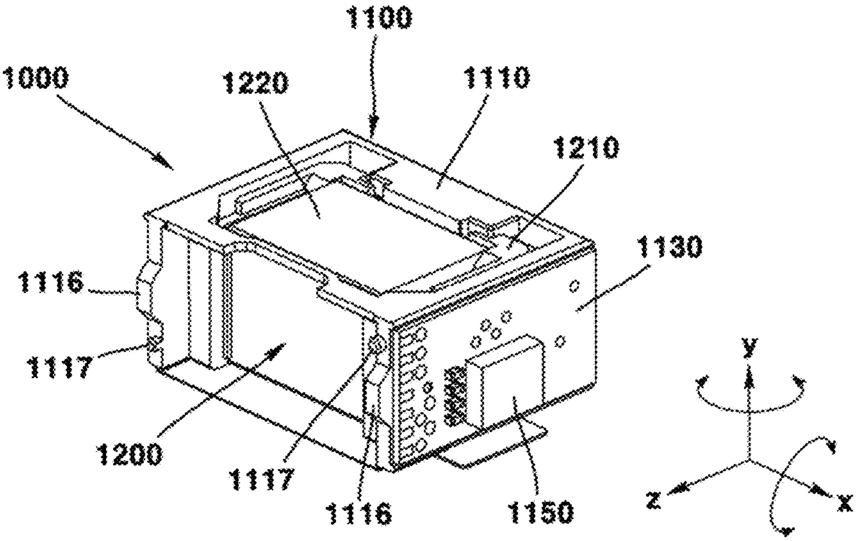
FIG. 9 is a perspective view of a reflective member driving device according to a present embodiment.
Figure 10:
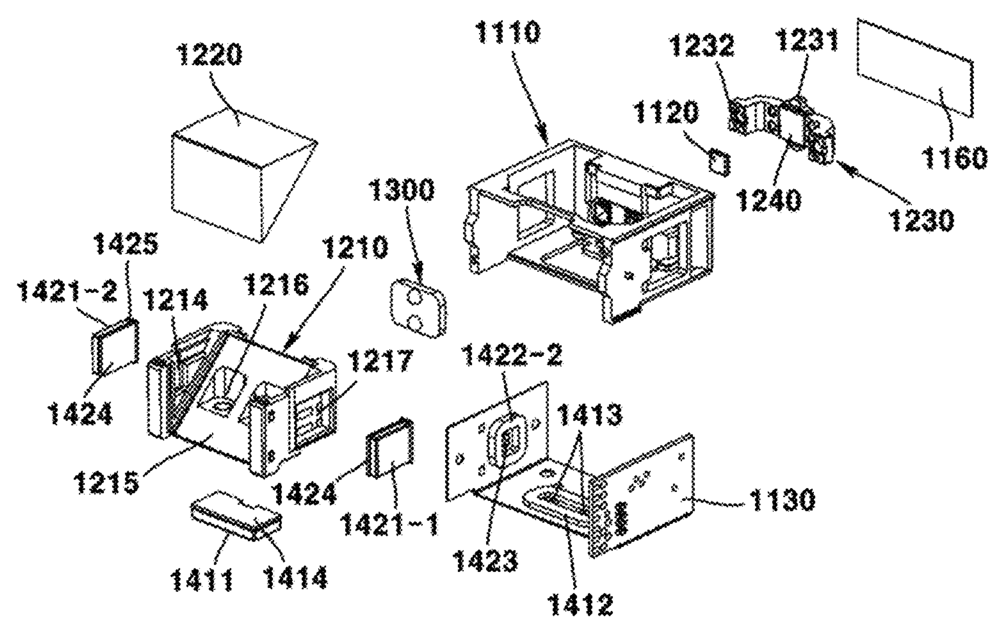
FIG. 10 is an exploded perspective view of a reflective member driving device according to the present embodiment.
Figure 11:
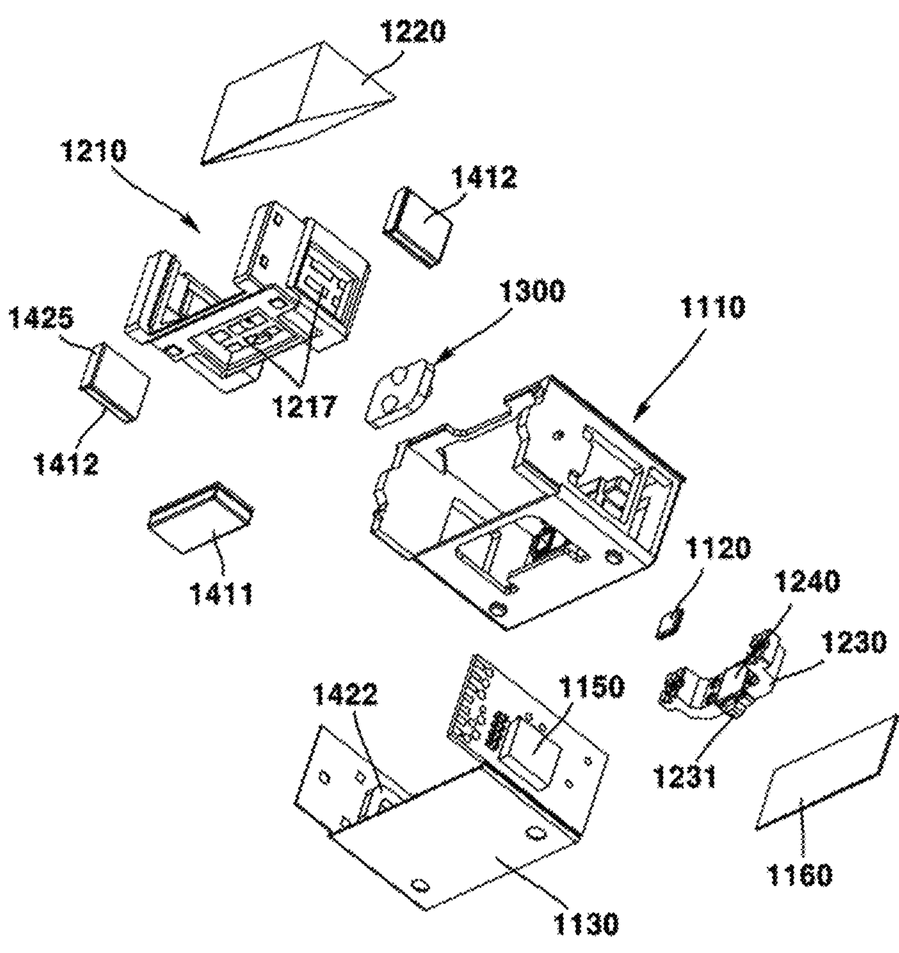
FIG. 11 is a bottom exploded perspective view of a reflective member driving device according to the present embodiment.
Figure 12:
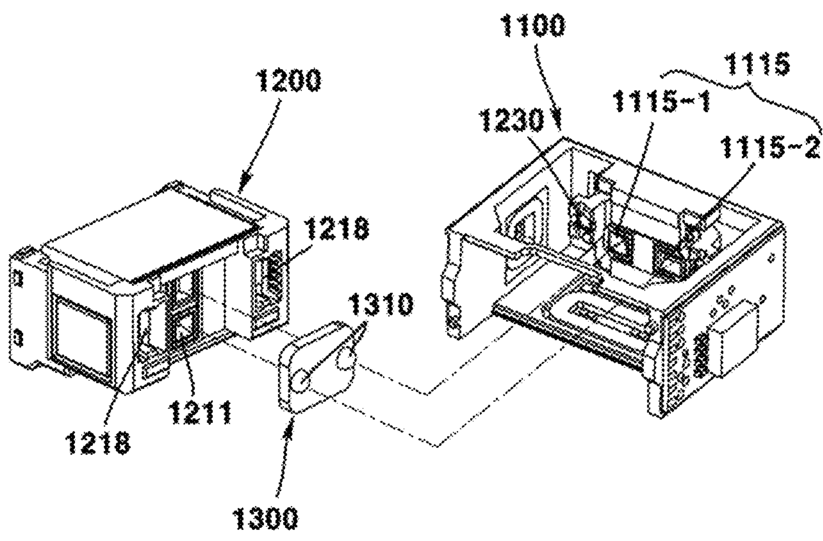
FIGS. 12 and 13 are views for explaining a structure related to a moving plate of a reflective member driving device according to the present embodiment.
Figure 13:
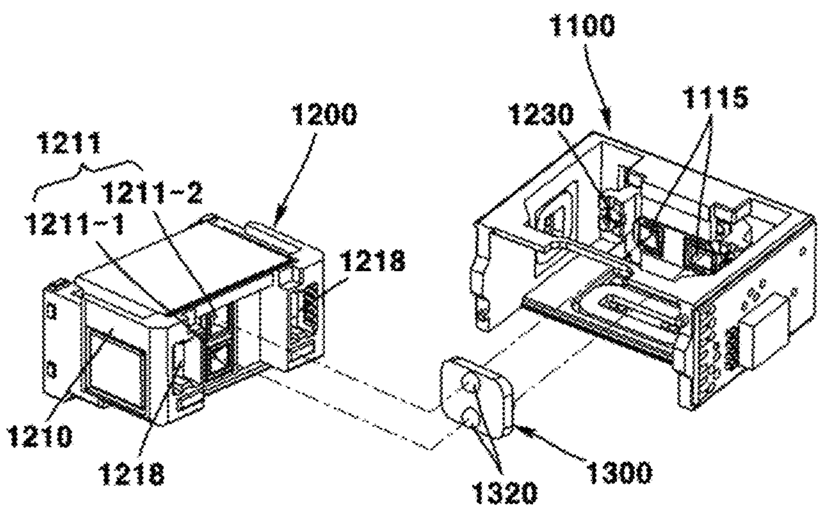
Figure 14:
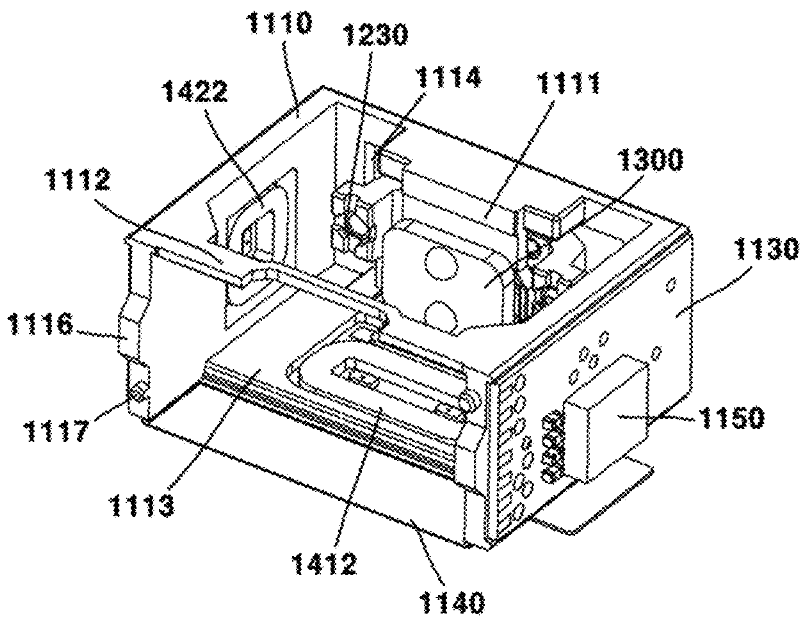
FIG. 14 is a perspective view of a state in which components such as a moving unit of a reflective member driving device according to the present embodiment are omitted.
Figure 15:
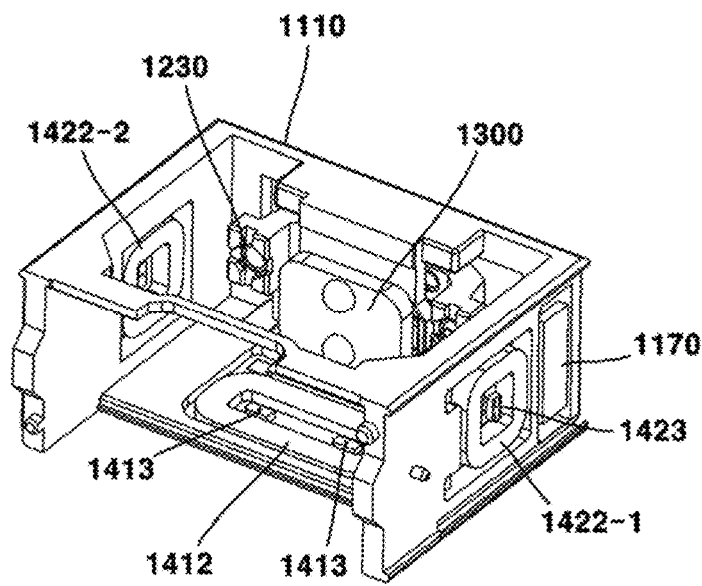
FIG. 15 is a perspective view of a state in which components such as a substrate are omitted from the reflective member driving device of FIG. 14.
Figure 16:
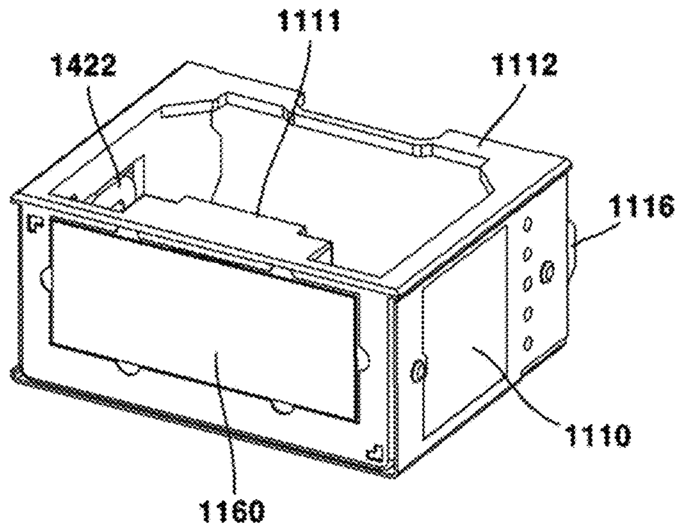
FIG. 16 is a perspective view illustrating a stationary unit and related components of a reflective member driving device according to the present embodiment.
Figure 17:
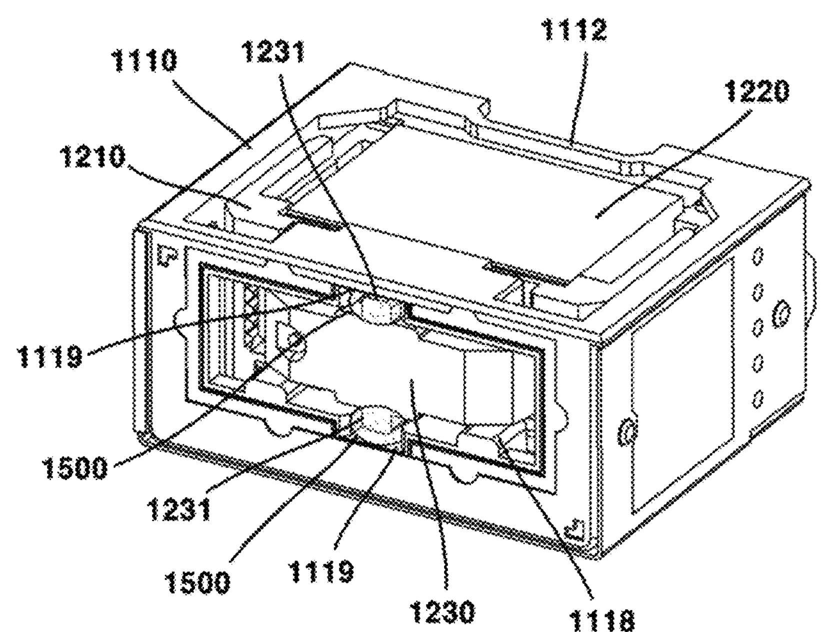
FIG. 17 is a perspective view illustrating a state in which a moving unit is disposed on a stationary unit in a reflective member driving device according to the present embodiment.
Figure 18:
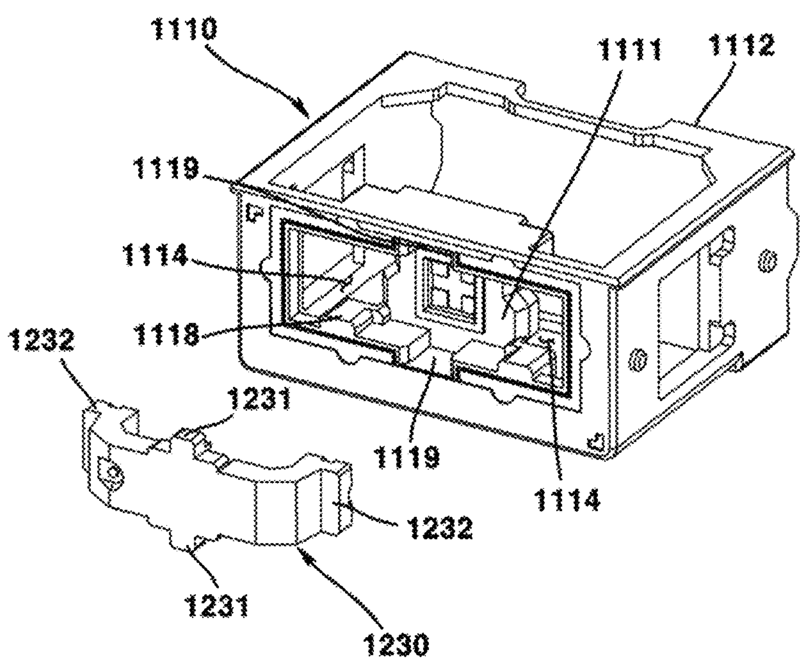
FIG. 18 is an exploded perspective view illustrating related shapes of a rigid mover and a stationary unit of a reflective member driving device according to the present embodiment.
Figure 19:
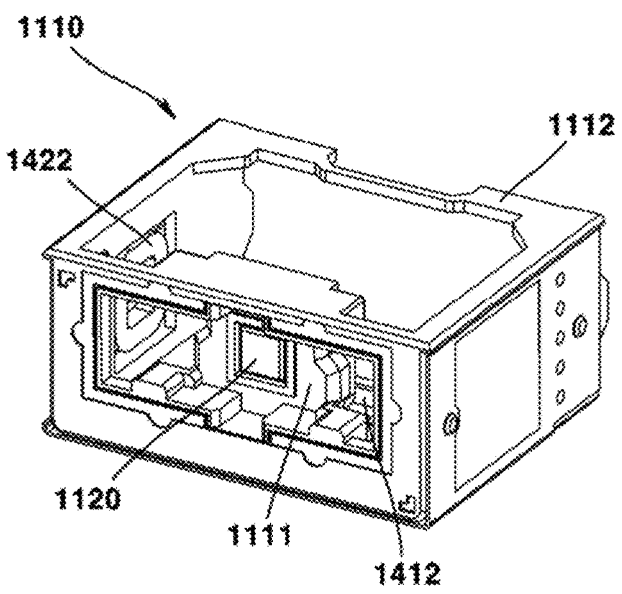
FIG. 19 is a perspective view illustrating a disposition state of a second magnet of a stationary unit of a reflective member driving device according to the present embodiment.
Figure 20:
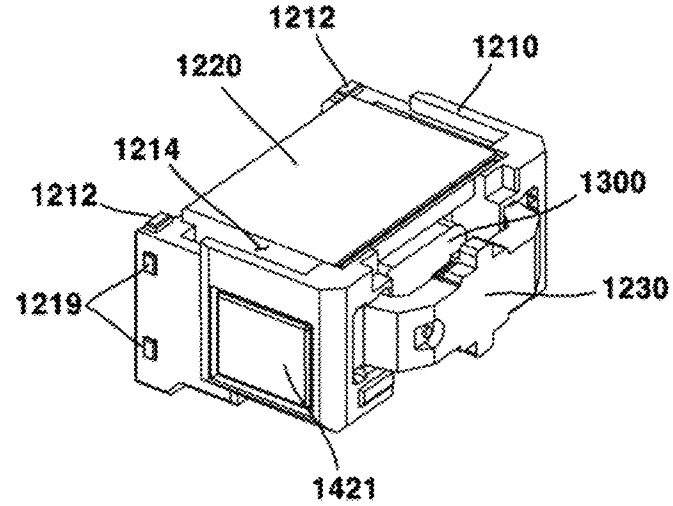
FIG. 20 is a perspective view illustrating a coupled state of a holder and a rigid mover of a reflective member driving device according to the present embodiment.
Figure 21:
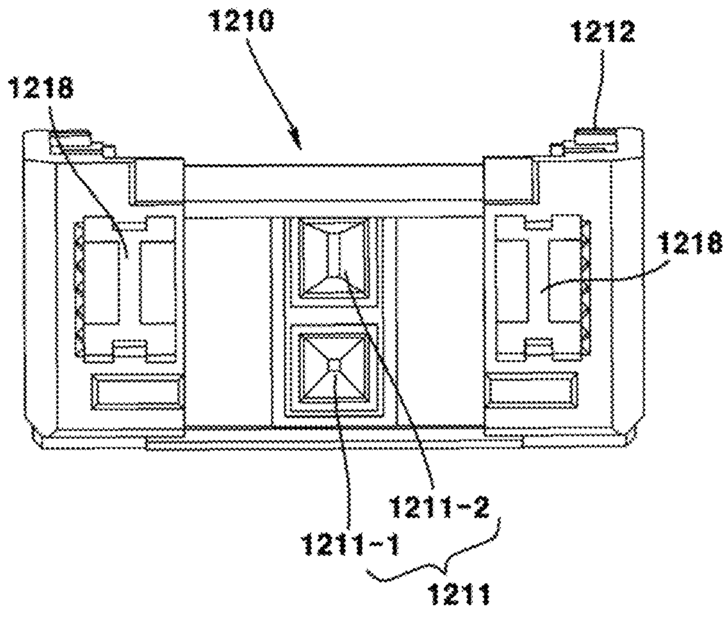
FIG. 21 is a front view illustrating a holder of a reflective member driving device according to the present embodiment.
Figure 22:
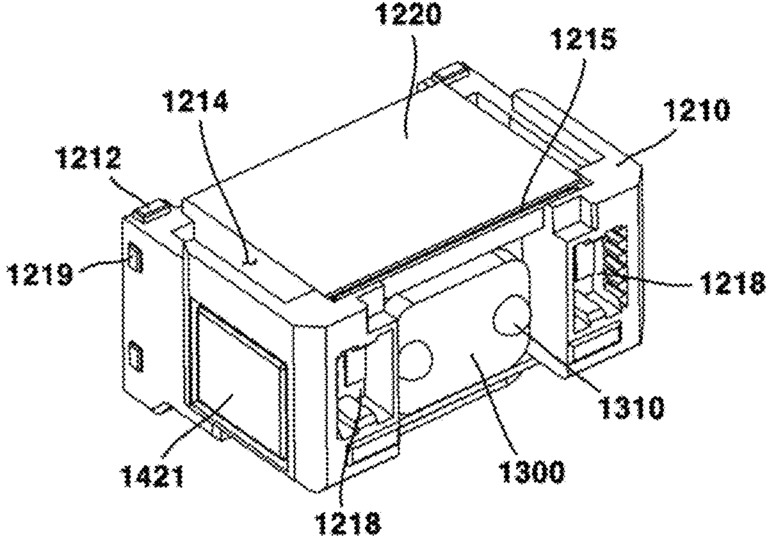
FIG. 22 is a perspective view illustrating a state in which a moving plate is disposed in a moving unit of a reflective member driving device according to the present embodiment.
Figure 23:
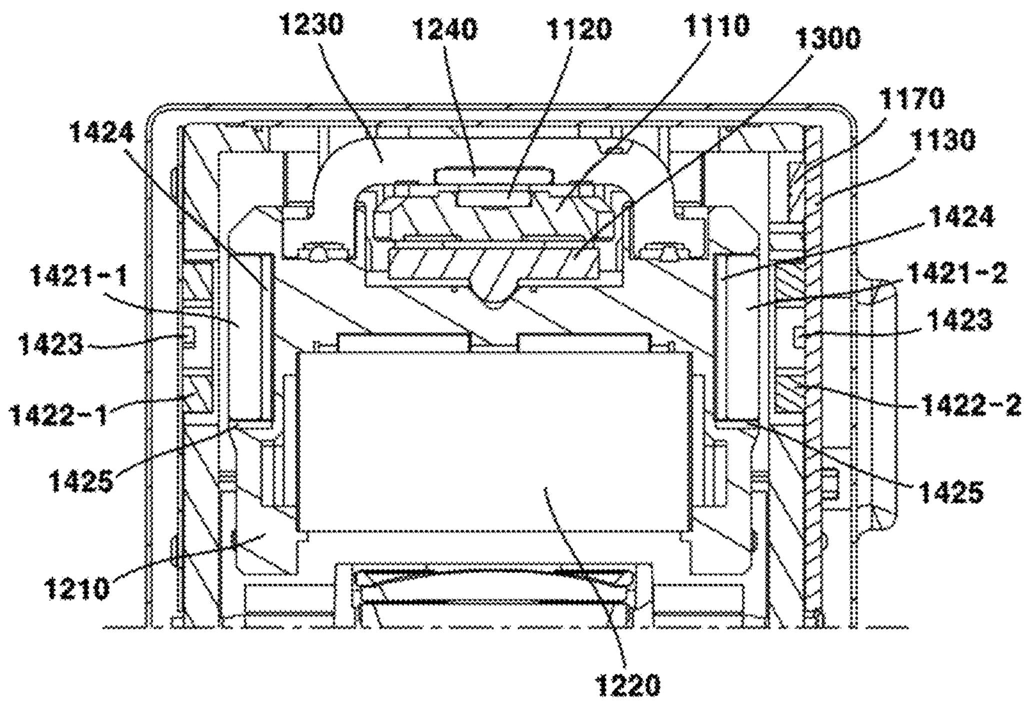
FIG. 23 is a cross-sectional view of a reflective member driving device according to the present embodiment.
Figure 24:
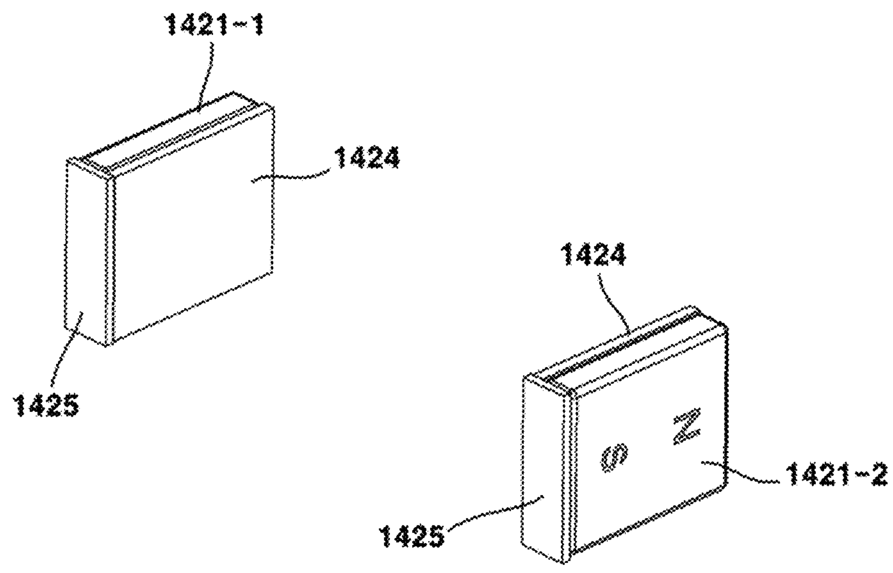
FIG. 24 is a perspective view illustrating a second driving magnet and first and second yokes of a reflective member driving device according to the present embodiment.
Figure 25:
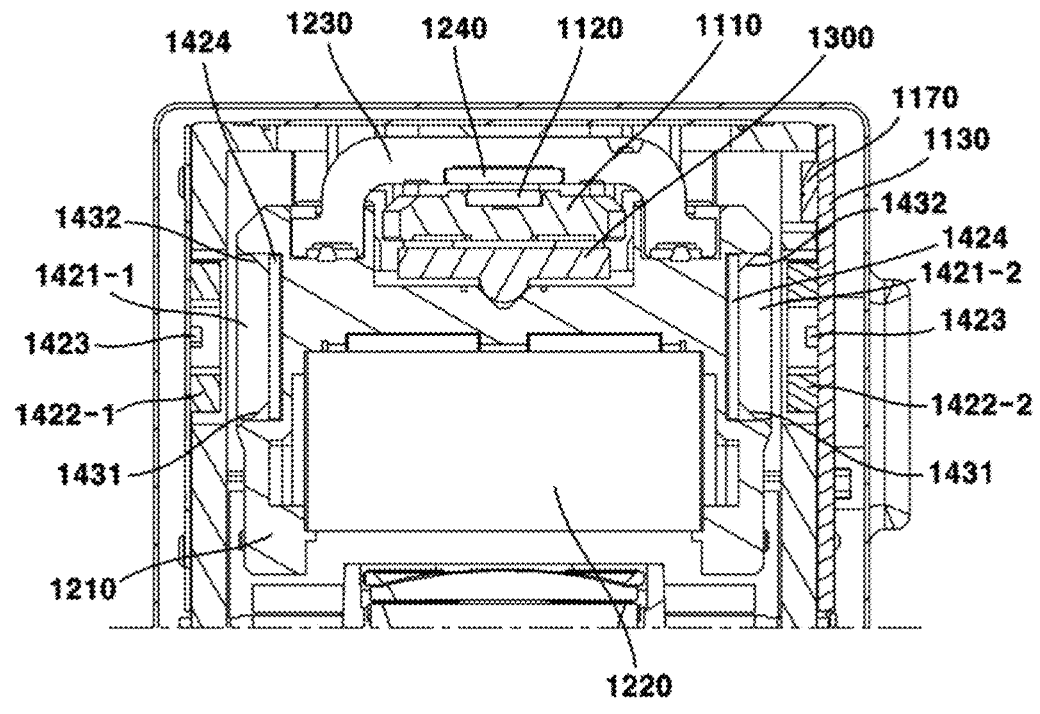
FIG. 25 is a cross-sectional view of a reflective member driving device according to a modified embodiment.
Figure 26:
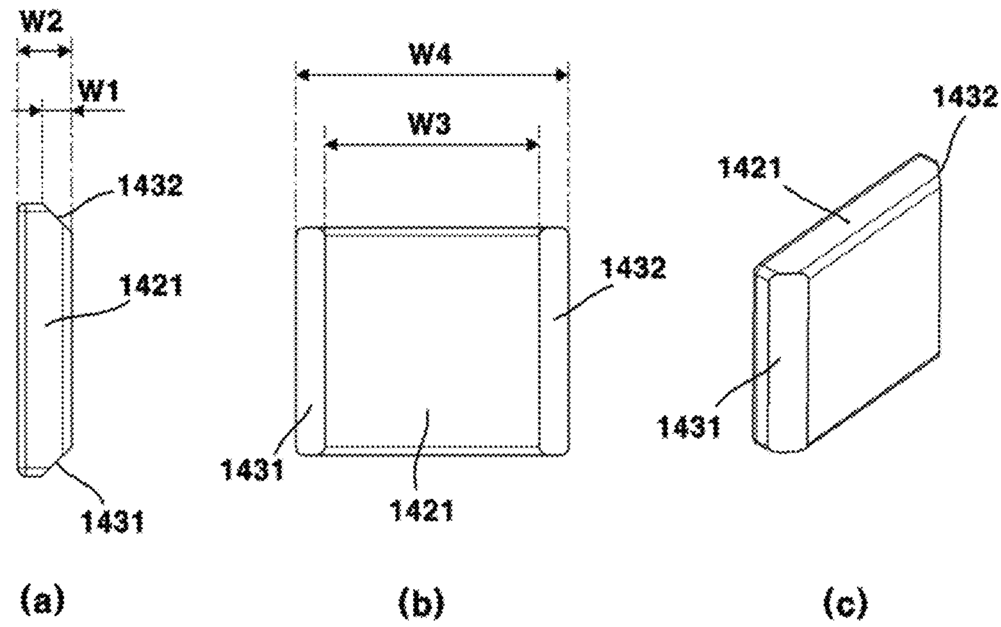
FIG. 26(*a*) is a view of a second driving magnet according to a modified embodiment viewed from above, (b) is a view of a second driving magnet according to a modified embodiment viewed from the inside, and (c) is a perspective view.
Figure 27:
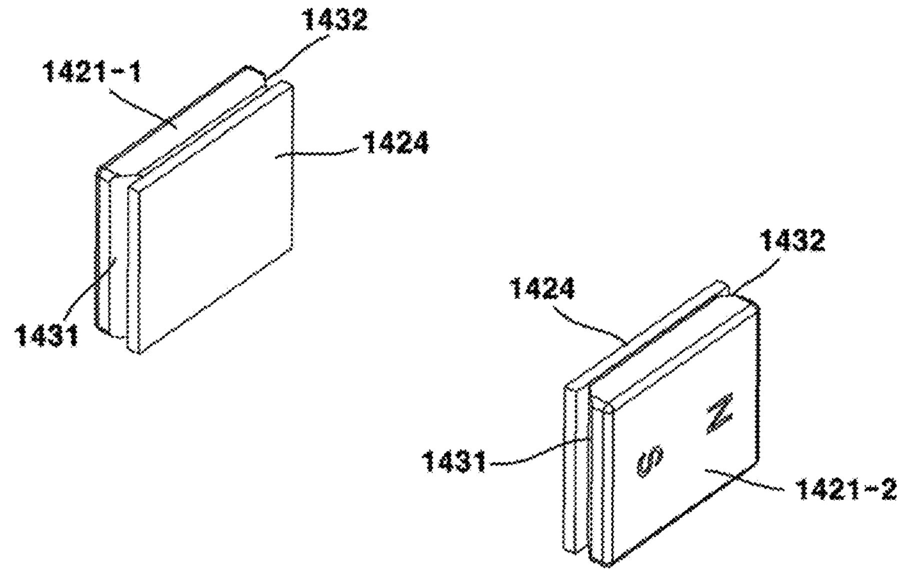
FIG. 27 is a perspective view illustrating a second driving magnet and a yoke according to a modified embodiment.
Figure 28:
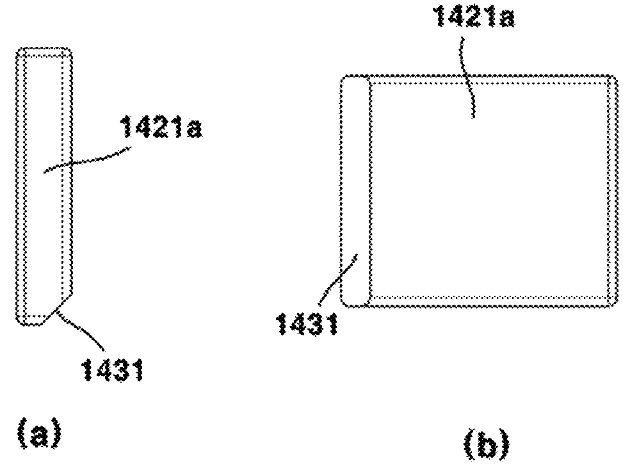
FIG. 28(*a*) is a view of the second driving magnet according to another modified embodiment as seen from above, and (b) is a view of a second driving magnet according to another modified embodiment as viewed from the inside.
Figure 29:
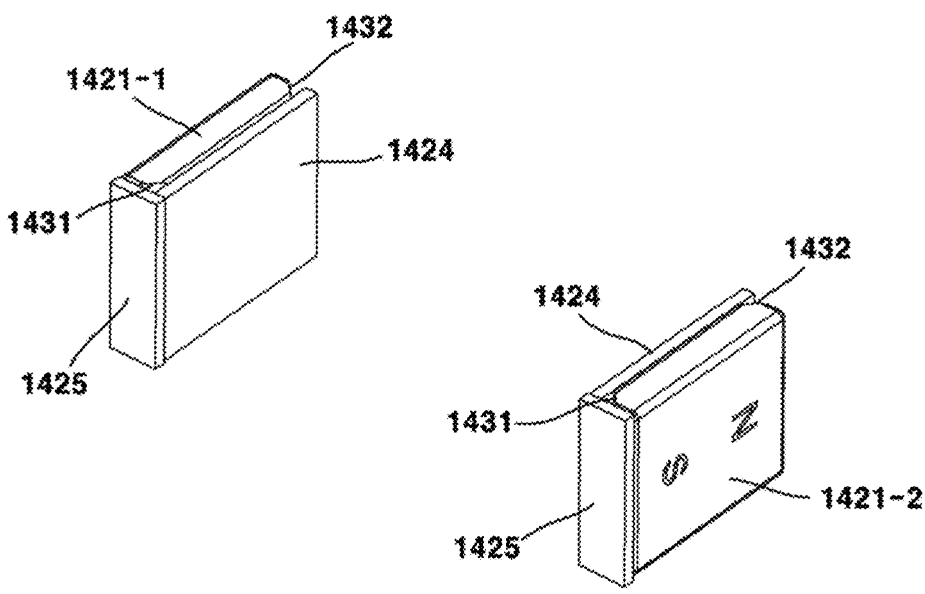
FIG. 29 is a perspective view illustrating a second driving magnet and first and second yokes according to another modified embodiment.
Figure 30:
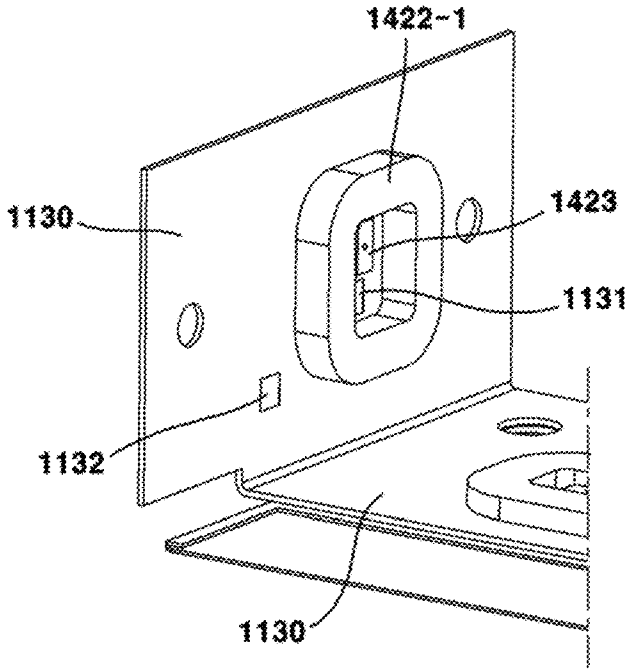
FIG. 30 is a perspective view illustrating a substrate and a first sub coil of a second coil according to the present embodiment.
Figure 31:
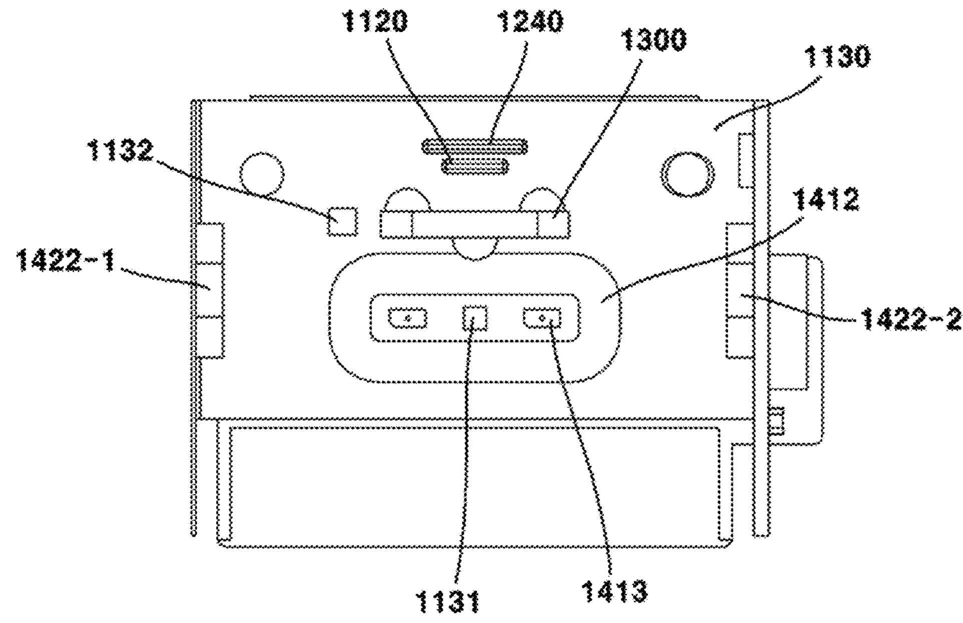
FIG. 31 is a plan view illustrating a first coil and a substrate according to the present embodiment.
Figure 32:
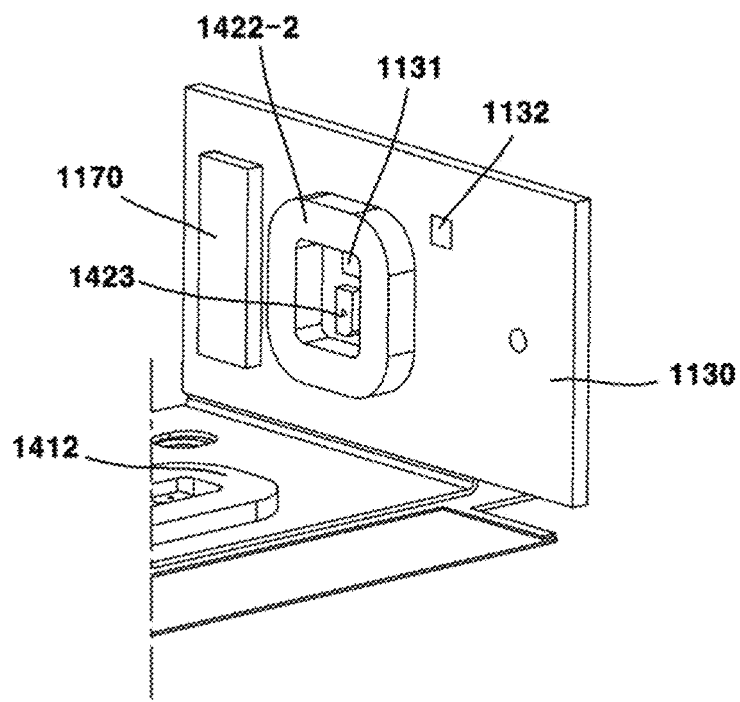
FIG. 32 is a perspective view illustrating a second sub coil and a substrate of a second coil according to the present embodiment.
Figure 33:
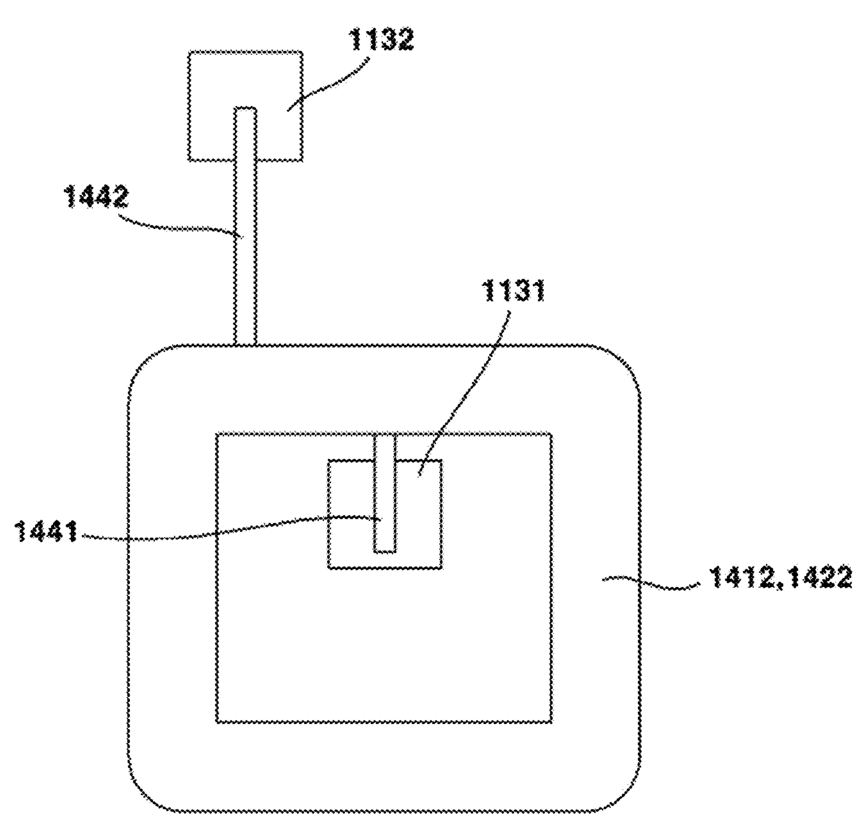
FIG. 33 is a conceptual diagram illustrating a state in which start lines and end lines of coils according to the present embodiment are disposed in terminals of a substrate.

FIG. 1 is a perspective view of a camera device according to the present embodiment; FIG. 2 is a bottom perspective view of a camera device according to the present embodiment; FIG. 3 is a plan view of a camera device according to the present embodiment; FIG. 4 is a cross-sectional view seen from A-A in FIG. 3; FIG. 5 is a cross-sectional view seen from line B-B in FIG. 3; FIG. 6 is a cross-sectional view seen from C-C in FIG. 3; FIG. 7 is an exploded perspective view of a camera device according to the present embodiment; FIG. 8 is a perspective view in which a cover member is omitted from the camera device according to the present embodiment; FIG. 9 is a perspective view of a reflective member driving device according to a present embodiment; FIG. 10 is an exploded perspective view of a reflective member driving device according to the present embodiment; FIG. 11 is a bottom exploded perspective view of a reflective member driving device according to the present embodiment; FIGS. 12 and 13 are views for explaining a structure related to a moving plate of a reflective member driving device according to the present embodiment; FIG. 14 is a perspective view of a state in which components such as a moving unit of a reflective member driving device according to the present embodiment are omitted; FIG. 15 is a perspective view of a state in which components such as a substrate are omitted from the reflective member driving device of FIG. 14; FIG. 16 is a perspective view illustrating a stationary unit and related components of a reflective member driving device according to the present embodiment; FIG. 17 is a perspective view illustrating a state in which a moving unit is disposed on a stationary unit in a reflective member driving device according to the present embodiment; FIG. 18 is an exploded perspective view illustrating related shapes of a rigid mover and a stationary unit of a reflective member driving device according to the present embodiment; FIG. 19 is a perspective view illustrating a disposition state of a second magnet of a stationary unit of a reflective member driving device according to the present embodiment; FIG. 20 is a perspective view illustrating a coupled state of a holder and a rigid mover of a reflective member driving device according to the present embodiment; FIG. 21 is a front view illustrating a holder of a reflective member driving device according to the present embodiment; FIG. 22 is a perspective view illustrating a state in which a moving plate is disposed in a moving unit of a reflective member driving device according to the present embodiment; FIG. 23 is a cross-sectional view of a reflective member driving device according to the present embodiment; FIG. 24 is a perspective view illustrating a second driving magnet and first and second yokes of a reflective member driving device according to the present embodiment; FIG. 25 is a cross-sectional view of a reflective member driving device according to a modified embodiment; FIG. 26(*a*) is a view of a second driving magnet according to a modified embodiment viewed from above, (b) is a view of a second driving magnet according to a modified embodiment viewed from the inside, and (c) is a perspective view; FIG. 27 is a perspective view illustrating a second driving magnet and a yoke according to a modified embodiment; FIG. 28(*a*) is a view of the second driving magnet according to another modified embodiment as seen from above, and (b) is a view of a second driving magnet according to another modified embodiment as viewed from the inside; FIG. 29 is a perspective view illustrating a second driving magnet and first and second yokes according to another modified embodiment; FIG. 30 is a perspective view illustrating a substrate and a first sub coil of a second coil according to the present embodiment; FIG. 31 is a plan view illustrating a first coil and a substrate according to the present embodiment; FIG. 32 is a perspective view illustrating a second sub coil and a substrate of a second coil according to the present embodiment; and FIG. 33 is a conceptual diagram illustrating a state in which start lines and end lines of coils according to the present embodiment are disposed in terminals of a substrate.

The reflective member driving device 1000 may perform optical image stabilization (OIS) function. The reflective member driving device 1000 may perform a handshake correction function. The reflective member driving device 1000 may move the reflective member 1220. The reflective member driving device 1000 may tilt the reflective member 1220. The reflective member driving device 1000 may tilt the reflective member 1220 about two axes. The reflective member driving device 1000 may tilt the reflective member 1220 about an x-axis and a y-axis. The x-axis and y-axis may be perpendicular to each other.

The reflective member driving device 1000 may be a reflective member actuator. The reflective member driving device 1000 may be an OIS actuator. The reflective member driving device 1000 may be an OIS driving device. The reflective member driving device 1000 may be a prism driving device. The reflective member driving device 1000 may be an actuator. The reflective member driving device 1000 may be an actuator device. The reflective member driving device 1000 may be an actuator driving device. The reflective member driving device 1000 may be a tilting device.

The reflective member driving device 1000 may comprise a stationary unit 1100. The stationary unit 1100 may be a relatively fixed part when the moving unit 1200 moves. The stationary unit 1100 may accommodate at least a portion of the moving unit 1200. The stationary unit 1100 may be disposed outside the moving unit 1200.

The reflective member driving device 1000 may comprise a housing 1110. The stationary unit 110 may comprise a housing 1110. The housing 1110 may be disposed outside the holder 1210. The housing 1110 may accommodate at least a portion of the holder 1210. The housing 1110 may comprise an opening or hole for securing a path of light in an upper plate and one of the side plates. The housing 1110 may comprise an upper plate, a lower plate, and pluralities of side plates.

The housing 1110 may comprise a first portion 1111. The first portion 1111 may be formed on a side plate of the housing 1110. A moving plate 1300 may be disposed on the first portion 1111. The first portion 1111 may be disposed between the holder 1210 and the rigid mover 1230. The first portion 1111 may be disposed between the rigid mover 1230 and the moving plate 1300. A second magnet 1120 may be disposed in the first portion 1111. The moving plate 1300 may be disposed at one side of the first portion 1111 and the second magnet 1120 may be disposed at the other side of the opposite side. A portion of the housing 1110 may be disposed between the moving plate 1300 and the rigid mover 1230.

The housing 1110 may comprise a second portion 1112. The second portion 1112 may be disposed above the holder 1210. The second portion 1112 may come into contact with the holder 1210 when the holder 1210 moves upward. The second portion 1112 may be overlapped with the holder 1210 in a moving direction of the holder 1210. The second portion 1112 may be an upper plate of the housing 1110.

The housing 1110 may comprise a third portion 1113. The third portion 1113 may be disposed below the holder 1210. The third portion 1113 may come into contact with the holder 1210 when the holder 1210 moves downward. The third portion 1113 may be overlapped with the holder 1210 in a moving direction thereof. The third portion 1113 may be a lower plate of the housing 1110.

The housing 1110 may comprise a hole 1114. The hole 1114 may be a hole through which the rigid mover passes. The hole 1114 may be formed in a side plate of the housing 1110. The hole 1114 may be formed in the first portion 1111 of the housing 1110. A rigid mover 1230 may be disposed in the hole 1114. The rigid mover 1230 may be disposed so as to pass through the hole 1114. The hole 1114 may be formed larger than the moving space of the rigid mover 1230 so as not to interfere with the rigid mover 1230. The housing 1110 may comprise two holes 1114 into which the rigid mover 1230 is inserted.

The housing 1110 may comprise a groove 1115. The groove 1115 may be a moving plate first protrusion accommodating groove. The first protrusion 1310 of the moving plate 1300 may be disposed in the groove 1115. The groove 1115 may accommodate at least a portion of the moving plate 1300. The groove 1115 may arrest the movement of the first protrusion 1310 of the moving plate 1300 except rotation. The groove 1115 may comprise an inclined surface being in contact with the first protrusion 1310 of the moving plate 1300. The inclined surface may comprise multiple inclined surfaces.

The housing 1110 may comprise pluralities of grooves 1115 in which pluralities of first protrusions 1310 are disposed. The plurality of grooves 1115 of the housing 1110 may comprise: a first groove 1115-1 in four-point contact with one first protrusion 1310 among pluralities of first protrusions 1310; and a second groove 1115-2 in contact with the other first protrusion 1310 at two points among the plurality of first protrusions 1310.

The groove 1115 may comprise a first groove 1115-1. The first groove 1115-1 may be a 4-point contact groove. The first groove 1115-1 may be in contact with one of the two first protrusions 1310 of the moving plate 1300 at four points. Through this, the first groove 1115-1 of the housing 1110 can arrest the movement in four directions except for the rotation of one protrusion among the first protrusion 1310 of the moving plate 1300.

The groove 1115 may comprise a second groove 1115-2. The second groove 1115-2 may be a two-point contact groove. The second groove 1115-2 may be in contact with the remaining one of the two first protrusions 1310 of the moving plate 1300 at two points. Through this, the second groove 1115-2 of the housing 1110 may arrest the movement of the remaining one protrusion of the first protrusion 1310 of the moving plate 1300 in two directions. For an example, the second groove 1115-2 of the housing 1110 may arrest the movement of the first protrusion 1310 of the moving plate 1300 in an up-down direction, but may not arrest the movement in a left and right direction.

The housing 1110 may comprise a protrusion 1116. The protrusion 1116 may be coupled with the lens driving device 2000. The protrusion 1116 may be formed in the side plate of the housing 1110. The protrusion 1116 may be formed at a side of the housing 1110 facing the lens driving device 2000. The protrusion 1116 may comprise a trapezoidal cross section. The protrusion 1116 may be coupled to the housing 2110 of the lens driving device 2000. The protrusion 1116 may be inserted into the first groove 2111 of the housing 2110 of the lens driving device 2000. The protrusion 1116 may be coupled to the housing 2110 of the lens driving device 2000 by an adhesive.

The housing 1110 may comprise a protrusion 1117. The protrusion 1117 may be coupled to the lens driving device 2000. The protrusion 1117 may be formed at a side plate of the housing 1110. The protrusion 1117 may be formed at a side of the housing 1110 facing the lens driving device 2000. The protrusion 1117 may have a circular cross section. The protrusion 1117 may be coupled to the housing 2110 of the lens driving device 2000. The protrusion 1117 may be inserted into the second groove 2112 of the housing 2110 of the lens driving device 2000. The protrusion 1117 may be coupled to the housing 2110 of the lens driving device 2000 by an adhesive.

The housing 1110 may comprise a protrusion 1118. The protrusion 1118 may be a rigid mover contact protrusion. The protrusion 1118 may be formed on a second surface of the housing 1110. The protrusion 1118 may come into contact with the rigid mover 1230. The protrusion 1118 may be formed on an inner circumferential surface of the hole 1114 of the housing 1110 through which the rigid mover 1230 passes. The protrusion 1118 may be formed to be in contact with at least one of a lower surface and an upper surface of the rigid mover 1230 when the rigid mover 1230 moves. The protrusion 1118 can prevent the rigid mover 1230 from being detached from its original position.

The protrusion 1118 may comprise pluralities of protrusions. The protrusion 1118 may comprise two protrusions. The two protrusions may be spaced apart from each other by the same distance as the second groove being disposed below among the grooves 1119 of the housing 1110. When a body portion of the rigid mover 1230 moves downward, the body portion of the rigid mover 1230 may be in contact with the two protrusions 1118 of the housing 1110.

The housing 1110 may comprise a groove 1119. At least a portion of the protruded portion 1231 may be disposed in the groove 1119. A portion of the protruded portion 1231 may be disposed in the groove 1119. The groove 1119 may be open toward the outside of the housing 1110. The groove 1119 may be larger than the protruded portion 1231 of the rigid mover 1230. The groove 1119 may be spaced apart from the protruded portion 1231 of the rigid mover 1230. In an initial state in which power is not applied to a driver unit 1400, the groove 1119 may be spaced apart from the protruded portion 1231 of the rigid mover 1230. Even when power is applied to the driver unit 1400 and driven, the groove 1119 may be spaced apart from the protruded portion 1231 of the rigid mover 1230. The groove 1119 of the housing 1110 and the protruded portion 1231 of the rigid mover 1230 may come into contact with each other due to an external impact. That is, the groove 1119 of the housing 1110 and the protruded portion 1231 of the rigid mover 1230 do not come into contact inside the normal driving range of the rigid mover 1230, but may come into contact when the rigid mover 1230 is out of the normal driving range due to an impact. The groove 1119 of the housing 1110 and the protruded portion 1231 of the rigid mover 1230 may perform a stopper function in case of impact.

The groove 1119 may comprise a first groove portion and a second groove portion being recessed from the first groove portion. The groove 1119 may be formed as a two-stage groove. The groove 1119 may have a double groove shape. A damper 1500 may be disposed in the second groove portion. The contact area between the damper 1500 and the housing 1110 may be increased by the second groove portion. The second groove portion may prevent the damper 1500 from flowing.

The groove 1119 may comprise pluralities of grooves. The groove 1119 may comprise a first groove in which at least a portion of the first protruded region of the rigid mover 1230 is disposed, and a second groove in which at least a portion of the second protruded region is disposed. The housing 1110 may comprise a first surface facing an upper surface of the body portion of the rigid mover 1230. The housing 1110 may comprise a second surface facing a lower surface of the body portion of the rigid mover 1230. The housing 1110 may comprise a first groove being formed on a first surface of the housing 1110 and a second groove being formed on a second surface of the housing 1110.

The reflective member driving device 1000 may comprise a second magnet 1120. The stationary unit 1100 may comprise a second magnet 1120. The second magnet 1120 may be disposed in the stationary unit 1100. The second magnet 1120 may be a second repulsive magnet. The second magnet 1120 may be disposed on the housing 1110. The second magnet 1120 may be disposed in the first portion 1111 of the housing 1110. The second magnet 1120 may be disposed at an opposite side of the moving plate 1300 with respect to the first portion 1111 of the housing 1110. The second magnet 1120 may be disposed between the first magnet 1240 and the moving plate 1300. The second magnet 1120 may be disposed to face the first magnet 1240. The second magnet 1120 may generate a repulsive force with the first magnet 1240.

The second magnet 1120 may be disposed to generate repulsive force with the first magnet 1240. The second magnet 1120 may be disposed so that the same polarities as the first magnet 1240 face each other. The second magnet 1120 may push the first magnet 1240.

At least a portion of the second magnet 1120 may be disposed between the first magnet 1240 and the moving plate 1300. The second magnet 1120 may be disposed between the first magnet 1240 and the moving plate 1300. The center of the second magnet 1120 may be disposed at the same height as the center of the first magnet 1240.

In the present embodiment, the driver unit 1400 may tilt the moving unit 1200 with respect to the mutually perpendicular x and y axes of the moving plate 1300. At this time, in a direction of the y-axis, a horizontal axis passing through the center of the second magnet 1120 may be disposed to be eccentric with the x-axis of the moving plate 1300. The horizontal axis may be parallel to the x-axis.

In a direction passing through the x-axis, the center of the second magnet 1120 may not be eccentric with the y-axis. When viewed from the moving plate 1300 toward the first magnet 1240, the center of the second magnet 1120 may be disposed so as to coincide with the y-axis. The central portion of the second magnet 1120 may be disposed at the same height as the central portion of the first magnet 1240. The center of the second magnet 1120 may be disposed at the same height as the center of the first magnet 1240. The center of gravity of the second magnet 1120 may be disposed at the same height as the center of gravity of the first magnet 1240.

The second magnet 1120 may comprise a second surface being disposed at an opposite side of the first surface of the second magnet 1120. The first magnet 1240 may comprise a first surface facing the second surface of the second magnet 1120. The first surface of the first magnet 1240 may have the same polarity as the second surface of the second magnet 1120.

In a direction in which the first surface of a first driving magnet 1411 faces, the second magnet 1120 may be disposed so as not to be overlapped with the first driving magnet 1411. In a direction in which the first surface of the second magnet 1120 faces, the second magnet 1120 may be disposed so as not to be overlapped with the first driving magnet 1411.

The reflective member driving device 1000 may comprise a substrate 1130. The stationary unit 1100 may comprise a substrate 1130. The substrate 1130 may be a flexible printed circuit board (FPCB). The substrate 1130 may be a ductile printed circuit board. The substrate 1130 may be disposed in the housing 1110.

The substrate 1130 may comprise a terminal. The substrate 1130 may comprise terminals being coupled to the coils 1412 and 1422. The substrate 1130 may comprise pluralities of terminals.

The substrate 1130 may comprise a first terminal 1131. As illustrated in FIG. 33, the first terminal 1131 may be disposed inside the coils 1412 and 1422. As illustrated in FIG. 30, the first terminal 1131 may be disposed inside the first sub coil 1422-1. As illustrated in FIG. 31, the first terminal 1131 may be disposed inside the first coil 1412. As illustrated in FIG. 32, the first terminal 1131 may be disposed inside the second sub coil 1422-2.

The substrate 1130 may comprise a second terminal 1132. As illustrated in FIG. 33, the second terminal 1132 may be disposed outside the coils 1412 and 1422. As illustrated in FIG. 30, the second terminal 1132 may be disposed outside the first sub coil 1422-1. As illustrated in FIG. 31, the second terminal 1132 may be disposed outside the first coil 1412. As illustrated in FIG. 32, the second terminal 1132 may be disposed outside the second sub coil 1422-2.

The first terminal 1131 of the substrate 1130 may be coupled to one end of the coils 1412 and 1422. The second terminal 1132 of the substrate 1130 may be coupled to the other end of the coils 1412 and 1422. The first terminal 1131 of the substrate 1130 may be coupled to the first end portion of the coils 1412 and 1422. The second terminal 1132 of the substrate 1130 may be coupled to the second end portion of the coils 1412 and 1422. The first terminal 1131 of the substrate 1130 may be coupled to a start line of the coils 1412 and 1422. The second terminal 1132 of the substrate 1130 may be coupled to a longitudinal line of the coils 1412 and 1422.

As a comparative example, the first terminal 1131 of the substrate 1130 may be disposed outside the coils 1412 and 1422. That is, both the first terminal 1131 and the second terminal 1132 of the substrate 1130 may be disposed outside the coils 1412 and 1422. In this case, the start lines of the coils 1412 and 1422 may be structurally sandwiched between the bundle around which the coils 1412 and 1422 are wound and the substrate 1130. Due to this, when a pressure is applied, the start line or a region adjacent to the start line may be damaged, resulting in coil disconnection. This may cause camera non-operation to occur. Or, there is a possibility of developing into a progressive defect.

In the present embodiment, one terminal of the substrate 1130, that is, a pad may be positioned outside and the other one may be positioned inside the coils 1412 and 1422. In this case, start lines of the coils 1412 and 1422 may be connected to the inside of the coils 1412 and 1422, and longitudinal lines of the coils 1412 and 1422 may be connected to the outside of the coils 1412 and 1422. In the case of the second coil 1422, there may be cases where the size of the coil cannot be sufficiently increased due to the size of the product. In this case, the Hall sensor 1423 may be disposed shifted parallel to the gap of the corresponding second driving magnet 1421. Through this, an arrangement space for the first terminal 1131 of the substrate 1130 may be secured. That is, as the Hall sensor 1423 is moved and disposed, a coil soldering space inside the coil can be secured. For an example, the Hall sensor 1423 in the first sub coil 1422-1 is disposed shifted upward (refer to FIG. 30), and the Hall sensor 1423 in the second sub coil 1422-2 is shifted downward and may be disposed (refer to FIG. 32). However, as a modified embodiment, both of the Hall sensors 1423 may be disposed shifted upward or downward.

However, even when the Hall sensor 1423 is disposed shifted, the Hall sensor 1423 may have a section being overlapped with the air gap of the second driving magnet 1421 inside the driving section of the moving unit 1200.

The reflective member driving device 1000 may comprise a SUS 1140. The stationary unit 1100 may comprise a SUS 1140. The SUS 1140 may be disposed in the substrate 1130. The SUS 1140 may be disposed on an outer surface of the substrate 1130. The SUS 1140 may reinforce the strength of the substrate 1130.

The reflective member driving device 1000 may comprise a gyro sensor 1150. The stationary unit 1100 may comprise a gyro sensor 1150. The gyro sensor 1150 may detect shaking of the camera device 10. The shake detected by the gyro sensor 1150 may be offset through the handshake correction function. The gyro sensor 1150 may be disposed in the substrate 1130. The gyro sensor 1150 may be disposed on an outer surface of the substrate 1130.

The reflective member driving device 1000 may comprise a plate 1160. The stationary unit 1100 may comprise a plate 1160. The plate 1160 may be coupled to housing 1110. The plate 1600 may cap the rigid mover 1230. The plate 1600 may cover the rigid mover 1230. The plate 1160 may be disposed to cover the open portion of the housing 1110. The plate 1160 may be disposed to close the open front of the housing 1110. The plate 1160 may be formed of a metal sheet material. The housing 1110 may comprise a groove in which an adhesive fixing the plate 1160 to the housing 1110 is disposed.

The reflective member driving device 1000 may comprise a driver IC 1170. The stationary unit 1100 may comprise a driver IC 1170. The driver IC 1170 may be disposed in the substrate 1130. The driver IC 1170 may be electrically connected to the first coil 1412 and the second coil 1422. The driver IC 1170 may supply current to the first coil 1412 and the second coil 1422. The driver IC 1170 may control at least one of voltage and current being applied to each of the first coil 1412 and the second coil 1422. The driver IC 1170 may be electrically connected to the Hall sensors 1413 and 1423. The driver IC 1170 can feedback-control the voltage and current applied to the first coil 1412 and the second coil 1422 through the position of the reflective member 1220 detected by the Hall sensors 1413 and 1423.

The reflective member driving device 1000 may comprise a moving unit 1200. The moving unit 1200 may be a moving part. The moving unit 1200 may be a movable unit. The moving unit 1200 may be a mover. The moving unit 1200 may move against the stationary unit 1100. The moving unit 1200 may be tilted against the stationary unit 1100. The moving unit 1200 may be disposed inside the stationary unit 1100. At least a portion of the moving unit 1200 may be spaced apart from the stationary unit 1100.

In the present embodiment, in an initial state in which current is not applied to the driver unit 1400, the moving unit 1200 may come into contact with the stationary unit 1100.

The reflective member driving device 1000 may comprise a holder 1210. The moving unit 1200 may comprise a holder 1210. The holder 1210 may be disposed inside the housing 1110. The holder 1210 is movable against the housing 1110. The holder 1210 may be tilted against the housing 1110. At least a portion of the holder 1210 may be spaced apart from the housing 1110. The holder 1210 may be in contact with the housing 1110.

In the present embodiment, the holder 1210 may move between the second portion 1112 and the third portion 1113 of the housing 1110 by the first driving unit 1410. In an initial state in which current is not applied to the first driving unit 1410, the holder 1210 may come into contact with the housing 1110. In an initial state, the holder 1210 may be in contact with an inner surface of the housing 1110 adjacent to the incident surface of the reflective member 1220. As a current is applied to the driver unit 1400, the holder 1210 is spaced apart from the inner surface of the housing 1110 and may be tilted with respect to the first axis of the moving plate 1300.

The holder 1210 may comprise a groove 1211. The groove 1211 may be a moving plate second protrusion accommodating groove. A second protrusion 1320 of the moving plate 1300 may be disposed in the groove 1211. The groove 1211 may accommodate at least a portion of the moving plate 1300. The groove 1211 may arrest the movement of the second protrusion 1320 of the moving plate 1300 except rotation. The groove 1211 may comprise an inclined surface being in contact with the second protrusion 1320 of the moving plate 1300. An inclined surface may comprise multiple inclined surfaces.

The holder 1210 may comprise pluralities of grooves 1211 in which pluralities of second protrusions 1320 are disposed. The plurality of grooves 1211 of the holder 1210 may comprise a first groove 1211-1 in four-point contact with one second protrusion 1320 among the plurality of second protrusions 1320, and a second groove 1211-2 being in contact with the other second protrusion 1320 at two points among the plurality of second protrusions 1320.

The groove 1211 may comprise a first groove 1211-1. The first groove 1211-1 may be a 4-point contact groove. The first groove 1211-1 may contact one of the two second protrusions 1320 of the moving plate 1300 at four points. Through this, the first groove 1211-1 of the holder 1210 can arrest the movement in up, down, left, right four directions except for the rotation of one protrusion among the second protrusion 1320 of the moving plate 1300.

The groove 1211 may comprise a second groove 1211-2. The second groove 1211-2 may be a two-point contact groove. The second groove 1211-2 may be a two-point contact groove. The second groove 1211-2 may be in contact with the remaining one of the two second protrusions 1320 of the moving plate 1300 at two points. Through this, the second groove 1211-2 of the holder 1210 may arrest the movement of the remaining protrusion of the second protrusion 1320 among the moving plate 1300 in two directions. For an example, the second groove 1211-2 of the holder 1210 may arrest the movement of the second protrusion 1320 among the moving plate 1300 in a left-right direction and may not arrest the movement in an up-down direction.

The holder 1210 may comprise a first protrusion 1212. The first protrusion 1212 may be an upper stopper. The first protrusion 1212 may be formed on an upper surface of the holder 1210. The first protrusion 1212 may be protruded from the upper surface of the holder 1210. The first protrusion 1212 may be in contact with the housing 1110 when the holder 1210 moves upward. The first protrusion 1212 may be in contact with the second portion 1112 of the housing 1110 when the holder 1210 moves upward.

The holder 1210 may comprise a second protrusion 1213. The second protrusion 1213 may be a lower stopper. The second protrusion 1213 may be formed on a lower surface of the holder 1210. The second protrusion 1213 may be protruded from a lower surface of the holder 1210. The second protrusion 1213 may be in contact with the housing 1110 when the holder 1210 moves downward. The second protrusion 1213 may be in contact with the third portion 1113 of the housing 1110 when the holder 1210 moves downward.

In the present embodiment, the first protrusion 1212 of the holder 1210 may come into contact with the second portion 1112 of the housing 1110 in an initial state. The second protrusion 1213 of the holder 1210 may come into contact with the third portion 1113 of the housing 1110 by applying current to the first driving unit 1410 or by an impact.

The holder 1210 may comprise an adhesive accommodating groove 1214. The adhesive accommodating groove 1214 may accommodate an adhesive for fixing the reflective member 1220 to the holder 1210. The adhesive accommodating groove 1214 may be formed on a surface being in contact with the reflective member 1220. An adhesive may be disposed in the adhesive accommodating groove 1214.

The holder 1210 may comprise a groove 1215. The groove 1215 may be a separation groove providing a separation space between the reflective member 1220 and the reflective member 1220. The groove 1215 may be formed on a surface being in contact with the reflective member 1220. The contact area between the reflective member 1220 and the holder 1210 may be reduced due to the groove 1215.

The holder 1210 may comprise a groove 1216. The groove 1216 may be a slimming groove. The groove 1216 may be formed in a central portion of the holder 1210. The weight of the holder 1210 may be reduced by the groove 1216.

The holder 1210 may comprise a magnet accommodating groove 1217. In the magnet accommodating groove 1217, driving magnets 1411 and 1421 may be disposed. The magnet accommodating groove 1217 may be formed in a shape corresponding to the driving magnets 1411 and 1421. The magnet accommodating groove 1217 may be concavely formed on a lower surface of the holder 1210. The magnet accommodating groove 1217 may be formed on a lower surface and both side surfaces of the holder 1210. The magnet accommodating groove 1217 may comprise pluralities of magnet accommodating grooves. The magnet accommodating groove 1217 may comprise a first magnet accommodating groove accommodating the first driving magnet 1411 and a yoke 1414. The magnet accommodating groove 1217 may comprise a second magnet accommodating groove accommodating the second driving magnet 1421 and a second yoke 1424.

The holder 1210 may comprise a groove 1218. The groove 1218 may be a rigid mover accommodating groove. A coupling part 1232 of the rigid mover 1230 may be disposed in the groove 1218. The groove 1218 may be formed in a shape corresponding to the coupling part 1232 of the rigid mover 1230. The groove 1218 may comprise a groove in which an adhesive for fixing the coupling portion 1232 of the rigid mover 1230 to the holder 1210 is accommodated. The holder 1210 may comprise pluralities of protrusions being formed in the groove 1218. At least a portion of the coupling part 1232 of the rigid mover 1230 may be inserted into the groove 1218. The reflective member driving device 1000 may comprise an adhesive for fixing the rigid mover 1230 to the holder 1210. At least a portion of the adhesive may be disposed between the pluralities of protrusions being formed inside the groove 1218 of the holder 1210. Through this, the coupling force between the rigid mover 1230 and the holder 1210 may be improved.

The holder 1210 may comprise a lateral stopper 1219. The lateral stoppers 1219 may be formed on both sides of the holder 1210. The lateral stopper 1219 may be protruded from the side surface of the holder 1210. The lateral stopper 1219 may come into contact with the housing 1110 when the holder 1210 moves laterally. The lateral stopper 1219 may come into contact with the side plate of the housing 1110 when the holder 1210 moves laterally.

The reflective member driving device 1000 may comprise a reflective member 1220. The moving unit 1200 may comprise a reflective member 1220. The reflective member 1220 may be disposed in the holder 1210. The reflective member 1220 may be disposed inside the holder 1210. The reflective member 1220 may be coupled to the holder 1210. The reflective member 1220 may be fixed to the holder 1210. The reflective member 1220 may be fixed to the holder 1210 using an adhesive. The reflective member 1220 may move integrally with the holder 1210. The reflective member 1220 may change a path of light. The reflective member 1220 may reflect light. The reflective member 1220 may comprise a prism. The reflective member 1220 may comprise a mirror. The reflective member 1220 may be formed in a triangular prism shape. The angle between a path of light incident on the reflective member 1220 and a path of light emitted may be 90 degrees.

The reflective member driving device 1000 may comprise a rigid mover 1230. The moving unit 1200 may comprise a rigid mover 1230. The rigid mover 1230 may be coupled to the holder 1210. The rigid mover 1230 may be formed as a separate member from the holder 1210. The rigid mover 1230 may pass through the hole 1114 of the housing 1110 to be coupled to the holder 1210. The rigid mover 1230 may be formed of a non-magnetic metal. A first magnet 1240 and a second magnet 1120 may be disposed between the rigid mover 1230 and the holder 1210. The first magnet 1240 and the second magnet 1120 are disposed so that the same polarities face each other, and can push each other. The first magnet 1240 fixed to the housing 1110 may push the second magnet 1120 outward. The rigid mover 1230 to which the second magnet 1120 is fixed may also be pushed outward by the repulsive force of the first magnet 1240. The holder 1210 to which the rigid mover 1230 is fixed may also be pressed outward. Through this, the holder 1210 may press the moving plate 1300 against the housing 1110. Through this, the moving plate 1300 may be disposed between the holder 1210 and the housing 1110 without being detached.

The rigid mover 1230 may comprise a protruded portion 1231. The protruded portion 1231 may be extended from the body portion of the rigid mover 1230. The protruded portion 1231 may be coupled to the housing 1110 by the damper 1500. The protruded portion 1231 may be disposed in a central region of the rigid mover 1230. The protruded portion 1231 may be formed in the central region of the rigid mover 1230. The protruded portion 1231 may be protruded from an upper surface of the body portion of the rigid mover 1230. The protruded portion 1231 may come into contact with the housing 1110 when the rigid mover 1230 moves.

The protruded portion 1231 may comprise pluralities of protruded portions. The protruded portion 1231 of the rigid mover 1230 may comprise a first protruded portion being formed on an upper surface of the body portion of the rigid mover 1230. A second protruded portion being formed on a lower surface of the body portion of the rigid mover 1230 may be comprised. At least a portion of a first protruded portion of the rigid mover 1230 may be disposed in a first groove of the housing 1110. At least a portion of a second protruded portion of the rigid mover 1230 may be disposed in a second groove of the housing 1110. The protruded portion 1231 may comprise a first protruded region being protruded to one side and a second protruded region being protruded to the other side. Each of the first and second protruded regions may be referred to as a protruded portion.

The rigid mover 1230 may comprise a body portion. The body portion may be disposed at an opposite side of the moving plate 1300 with respect to the first portion 1111 of the housing 1110. The rigid mover 1230 may comprise two coupling parts 1232 being protruded from both sides of the body portion. The rigid mover 1230 may comprise two protruded portions 1231 being protruded upward and downward from the body portion.

The rigid mover 1230 may comprise a coupling part 1232. The coupling part 1232 may be a leg part. The coupling part 1232 may be extended from a body portion of the rigid mover 1230. The coupling part 1232 may pass through the hole 1114 of the housing 1110. The coupling part 1232 may be coupled to the holder 1210. The coupling part 1232 may be fixed to the holder 1210 by an adhesive. At least a portion of the coupling part 1232 may be inserted into the groove 1218 of the holder 1210.

The reflective member driving device 1000 may comprise a first magnet 1240. The moving unit 1200 may comprise a first magnet 1240. The first magnet 1240 may be disposed in the moving unit 1200. The first magnet 1240 may be a first repulsive magnet. The first magnet 1240 may be disposed on the rigid mover 1230. The first magnet 1240 may be disposed in a body portion of the rigid mover 1230. The first magnet 1240 may be disposed to face the second magnet 1120. The first magnet 1240 may be disposed to generate repulsive force with the second magnet 1120. The first magnet 1240 and the second magnet 1120 may be disposed so that the same polarities face each other. The first magnet 1240 may push the second magnet 1120.

In the present embodiment, the central axis of the first magnet 1240 may be disposed to be eccentric with the central axis of the moving plate 1300 with respect to the first optical axis. At this time, the first optical axis may be a z-axis. The first optical axis may be an axis perpendicular to the sensor surface of the image sensor 3400. The first optical axis may be an optical axis of lens groups being disposed adjacent to the image sensor 3400.

When viewed from a direction directing from the moving plate 1300 toward the first magnet 1240, the center of the first magnet 1240 may be disposed to be eccentric with the center of the moving plate 1300.

Based on the facing surface, the horizontal axis passing through the central axis of the first magnet 1240 may be eccentric in the direction of the horizontal axis passing through the central axis of the moving plate 1300 and a second optical axis perpendicular to the first optical axis. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. Based on the facing surface, the horizontal axis that meets or contacts the central axis of the first magnet 1240 may be eccentric in the direction of the horizontal axis passing through the central axis of the moving plate 1300 and a second optical axis perpendicular to the first optical axis. The center of the first magnet 1240 may be disposed to be eccentric in a vertical direction with respect to the center of the moving plate 1300.

Based on the facing surfaces, a vertical axis passing through the central axis of the first magnet 1240 may not be eccentric in directions of a vertical axis and a horizontal axis passing through the central axis of the moving plate 1300. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. The center of the first magnet 1240 may be disposed so as not to be eccentric in the horizontal direction with respect to the center of the moving plate 1300.

Based on the facing surface, a horizontal line passing through the center of the first magnet 1240 may be eccentric with a horizontal line passing through the center of the moving plate 1300 in a vertical direction. Based on the facing surface, a vertical line passing through the center of the first magnet 1240 may not be eccentric with a vertical line passing through the center of the moving plate 1300 in a horizontal direction.

The horizontal axis of the first magnet 1240 may be disposed higher than a horizontal axis of the moving plate 1300. As a modified embodiment, the horizontal axis of the first magnet 1240 may be disposed lower than the horizontal axis of the moving plate 1300.

The first magnet 1240 and the second magnet 1120 may be disposed between the rigid mover 1230 and the moving plate 1300.

The size of the first magnet 1240 may be different from that of the second magnet 1120. The first magnet 1240 may be formed to have a size different from that of the second magnet 1120. The size of the first magnet 1240 may be greater than that of the second magnet 1120. The first magnet 1240 may be formed to be larger than the second magnet 1120.

The area of the first surface of the first magnet 1240 may be greater than the area of the second surface of the second magnet 1120 facing the first surface. The first and second surfaces are arbitrarily referred to, and either of them may be referred to as a first surface, the other may be referred to as a second surface, and both may be referred to as a first surface. The first magnet 1240 may comprise a first surface. The second magnet 1120 may comprise a first surface facing the first surface of the first magnet 1240. The area of the first surface of the first magnet 1240 may be greater than that of the first surface of the second magnet 1120.

The first surface of the first magnet 1240 may comprise a first side. The first surface of the second magnet 1120 may comprise a first side being disposed in a direction corresponding to the first side of the first magnet 1240. The first side of the second magnet 1120 may be 55% to 75% of the first side of the first magnet 1240. The first side of the second magnet 1120 may be 60% to 66% of the first side of the first magnet 1240. The first side of the second magnet 1120 may be 62% to 64% of the first side of the first magnet 1240. The height H1 of the first magnet 1240 may be greater than the height H2 of the second magnet 1120. The width W1 of the first magnet 1240 may be greater than the width W2 of the second magnet 1120.

The area of the first surface of the second magnet 1120 may be 30% to 50% of the area of the first surface of the first magnet 1240. The area of the first surface of the second magnet 1120 may be 35% to 45% of the area of the first surface of the first magnet 1240. The area of the first surface of the second magnet 1120 may be 38% to 42% of the area of the first surface of the first magnet 1240.

The first magnet 1240 and the second magnet 1120 may be formed to have the same thickness. The volume of the second magnet 1120 may be 30% to 50% of the volume of the first magnet 1240.

When viewed from a direction directing from the second magnet 1120 toward the first magnet 1240, an edge region of the second magnet 1120 may be disposed within the first surface of the first magnet 1240. The edge region may be an edge region. An edge region may be a corner. The first magnet 1240 may be disposed so that all regions of the second magnet 1120 are overlapped with the first magnet 1240 in a first direction in which the first magnet 1240 faces the second magnet 1120. The first magnet 1240 may be disposed so that all regions of the second magnet 1120 are overlapped with the first magnet 1240 in a first direction in which the first magnet 1240 faces the second magnet 1120.

As a modified embodiment, the size of the first magnet 1240 may be smaller than that of the second magnet 1120. The second magnet 1120 may be formed to be larger than the first magnet 1240.

Central axes of the first magnet 1240 and the second magnet 1120 may coincide. However, a tolerance of ±1% to ±2% may occur in actual products.

In the present embodiment, the second magnet 1120 may comprise a second surface facing the first surface of the first magnet 1240. At this time, in a direction perpendicular to the first surface, the central axis of the first magnet 1240 may be disposed to be eccentric with the central axis of the moving plate 1300. The area of the first surface of the first magnet 1240 may be greater than the area of the second surface of the second magnet 1120.

In the present embodiment, in an initial state in which current is not applied to the driver unit 1400, the moving unit 1200 may come into contact with the stationary unit 1100. When viewed in a direction directing from the second magnet 1120 toward the first magnet 1240, a corner of the first magnet 1240 may surround the second magnet 1120. When viewed in a direction directing from the second magnet 1120 toward the first magnet 1240, the second magnet 1120 may be disposed inside the corner of the first magnet 1240.

The first surface of the first magnet 1240 may be formed in a square shape. A first surface of the second magnet 1120 may be formed in a square shape. Or, each of the first surface of the first magnet 1240 and the first surface of the second magnet 1120 may be formed in a rectangular shape. At least a portion of the first magnet 1240 may have a square cross section. At least a portion of the second magnet 1120 may have a square cross section. The first magnet 1240 may have a rounded edge. The second magnet 1120 may have a rounded edge.

As a modified embodiment, the first magnet 1240 may have a circular cross section. The first magnet 1240 may be formed in a cylindrical shape. The second magnet 1120 may have a circular cross section. The second magnet 1120 may be formed in a cylindrical shape. The first magnet 1240 may formed to have a rounded edge. The first magnet 1240 may be formed to have a curved edge. The edge of the first magnet 1240 may be formed to have a curvature. The first magnet 1240 may be formed to have a C-cut or R-cut edge. The second magnet 1120 may be formed to have a rounded edge. The second magnet 1120 may be formed to have a curved edge. The edge of the second magnet 1120 may be formed to have a curvature. The second magnet 1120 may be formed to have a C-cut or R-cut edge.

The reflective member driving device 1000 may comprise a moving plate 1300. The moving plate 1300 may be an intermediate plate. The moving plate 1300 may be disposed between the housing 1110 and the holder 1210. The moving plate 1300 may be disposed between the rigid mover 1230 and the holder 1210. The moving plate 1300 may be disposed between the first magnet 1240 and the holder 1210. The moving plate 1300 may be disposed between the stationary unit 1100 and the moving unit 1200. The moving plate 1300 may be disposed between the first surface of the second magnet 1120 and the holder 1210. The moving plate 1300 may guide the movement of the holder 1210 against the housing 1110. The moving plate 1300 may provide a tilt center of the holder 1210. That is, the holder 1210 may be tilted about the moving plate 1300. One side of the moving plate 1300 may be disposed in the holder 1210 and the other side may be disposed in the housing 1110. The moving plate 1300 may be in contact with the holder 1210 and the housing 1110.

The moving plate 1300 may comprise a first surface facing the housing 1110 and a second surface facing the holder 1210. The first surface of the moving plate 1300 may comprise pluralities of first protrusions 1310 being spaced apart from each other in a first axis direction. The second surface of the moving plate 1300 may comprise pluralities of second protrusions 1320 being spaced apart from each other in a second axis direction.

The moving plate 1300 may comprise pluralities of first convex portions formed on one surface and pluralities of second convex portions formed on the other surface. The first convex portion may be a first protrusion 1310. The second convex portion may be a second protrusion 1320. The x-axis may correspond to a straight line connecting two convex portions among the plurality of first convex portions. The x-axis may coincide with or be parallel to a straight line connecting two convex portions among the plurality of first convex portions. The y-axis may correspond to a straight line connecting two convex portions among the plurality of second convex portions. The y-axis may coincide with or be parallel to a straight line connecting two of the plurality of second convex portions. As a modified embodiment, the first convex portion may be second protrusion 1320 and the second convex portion may be first protrusion 1310.

The moving plate 1300 may comprise a first protrusion 1310. The first protrusion 1310 may be disposed in the housing 1110. The first protrusion 1310 may come into contact with the housing 1110. The first protrusion 1310 may be disposed in the groove 1115 of the housing 1110. The first protrusion 1310 may provide a first axis tilt center for the holder 1210. The first protrusion 1310 may provide an x-axis tilt center for the holder 1210. The first protrusion 1310 may comprise two first protrusions. The two first protrusions may be spaced apart in an x-axis direction. The two first protrusions can be disposed on an x-axis. The holder 1210 may be tilted about the first protrusion 1310 of the moving plate 1300 by the first driving unit 1410. The holder 1210 may be tilted in an up-down direction about the first protrusion 1310 of the moving plate 1300 by the first driving unit 1410.

The first axis of the moving plate 1300 may be defined by a first protrusion 1310 of the moving plate 1300 and a groove 1115 of the housing 1110. In the present embodiment, the first protrusion 1310 of the moving plate 1300 is disposed on the side of the housing 1110 instead of the side of the holder 1210, so that the center of rotation of the tilt around the first axis may be further away. Through this, the accuracy of the Hall value for detecting the first axis tilt movement amount may be increased. A mechanical stroke for the x-axis tilt driving may be secured.

The moving plate 1300 may comprise a second protrusion 1320. A second protrusion 1320 may be disposed on the holder 1210. The second protrusion 1320 may come into contact with the holder 1210. The second protrusion 1320 may be disposed in the groove 1211 of the holder 1210. The second protrusion 1320 may provide a second axis tilt center perpendicular to the first axis for the holder 1210. The second protrusion 1320 may provide a y-axis tilt center for holder 1210. The second protrusion 1320 may comprise two second protrusions. The two second protrusions may be spaced apart in a y-axis direction. The two second protrusions can be placed on a y-axis. The holder 1210 may be tilted about the second protrusion 1320 of the moving plate 1300 by the second driving unit 1420. The holder 1210 may be tilted left and right direction about the second protrusion 1320 of the moving plate 1300 by the second driving unit 1420.

As a modified embodiment, the first protrusion 1310 of the moving plate 1300 may provide a y-axis tilt center for the holder 1210 and the second protrusion 1320 of the moving plate 1300 may provide an x-axis tilt center.

The reflective member driving device 1000 may comprise grease. The grease may be disposed between the moving plate 1300 and the housing 1110. The grease may be formed of a material different from that of the damper 1500. The grease may be spaced apart from the damper 1500. The grease can be distinguished from the damper 1500. The grease may be applied in a shape different from that of the damper 1500. The grease may be applied to a location different from that of the damper 1500.

The reflective member driving device 1000 may comprise a driver unit 1400. The driver unit 1400 may move the moving unit 1200 against the stationary unit 1100. The driver unit 1400 may tilt the moving unit 1200 against the stationary unit 1100. The driver unit 1400 may tilt the holder 1210. The driver unit 1400 may tilt the moving unit 1200 with respect to the mutually perpendicular x-axis and y-axes of the moving plate 1300. The driver unit 1400 may comprise a coil and a magnet. The driver unit 1400 may move the moving unit 1200 through electromagnetic interaction. As a modified embodiment, the driver unit 1400 may comprise a shape memory alloy (SMA).

The driver unit 1400 may comprise a first driving unit 1410 and a second driving unit 1420. The first driving unit 1410 may comprise a first driving magnet 1411 and a first coil 1412. The second driving unit 1420 may comprise a second driving magnet 1421 and a second coil 1422. The first driving magnet 1411 and the first coil 1412 may tilt the holder 1210 about a first axis. The second driving magnet 1421 and the second coil 1422 may tilt the holder 1210 about a second axis perpendicular to the first axis. One of the first driving magnet 1411 and the second driving magnet 1421 may be referred to as a third magnet and the other may be referred to as a fourth magnet.

The driver unit 1400 may comprise a first driving unit 1410. The first driving unit 1410 may tilt the moving unit 1200 against the stationary unit 1100 about a first axis. The first driving unit 1410 may tilt the holder 1210 with respect to the first axis of the moving plate 1300. The first driving unit 1410 may tilt the moving unit 1200 about an x-axis against the stationary unit 1100. The first driving unit 1410 may comprise a coil and a magnet. The first driving unit 1410 may move the moving unit 1200 through electromagnetic interaction. As a modified embodiment, the first driving unit 1410 may comprise a shape memory alloy (SMA).

The first driving unit 1410 may comprise a first driving magnet 1411. The first driving magnet 1411 may be disposed in the holder 1210. The first driving magnet 1411 may be disposed on a lower surface of the holder 1210. The first driving magnet 1411 may be fixed to the holder 1210. The first driving magnet 1411 may be fixed to the holder 1210 by an adhesive. The first driving magnet 1411 may be disposed between the holder 1210 and a lower surface of the housing 1110. The first driving magnet 1411 may be disposed between the holder 1210 and a lower plate of the housing 1110. The first driving magnet 1411 may move integrally with the holder 1210. The first driving magnet 1411 may tilt the holder 1210. The first driving magnet 1411 may tilt the holder 1210 about a first axis. The first driving magnet 1411 may be disposed to face the first coil 1412. The first driving magnet 1411 may face the first coil 1412. The first driving magnet 1411 may be disposed at a position corresponding to the first coil 1412. The first driving magnet 1411 may interact with the first coil 1412. The first driving magnet 1411 may interact with the first coil 1412 electromagnetically. At least a portion of the first driving magnet 1411 may be disposed in the groove 1217 of the holder 1210.

The first driving magnet 1411 may comprise a first surface in a direction directing toward the reflective member 1220. The second magnet 1120 may comprise a first surface in a direction directing toward the reflective member 1220. The first surface of the first driving magnet 1411 may comprise a first region most adjacent to the second magnet 1120. The first region of the first driving magnet 1411 may have a polarity different from that of the first surface of the second magnet 1120. The first surface of the first driving magnet 1411 may comprise a second region having a polarity different from that of the first region. The first region of the first driving magnet 1411 may have an S pole and the second region may have an N pole. At this time, the first surface of the second magnet 1120 may have an N pole. As a modified embodiment, the first region of the first driving magnet 1411 may have an N pole and the second region may have an S pole.

In the present embodiment, magnetic field interference can be minimized through arrangement of magnet polarities of the first driving magnet 1411 and the second magnet 1120.

The first driving magnet 1411 may comprise a second surface at an opposite side of the first surface of the first driving magnet 1411. The second surface of the first driving magnet 1411 may comprise a third region having a polarity different from that of the first region. The second surface of the first driving magnet 1411 may comprise a fourth region having a polarity different from that of the second region. The second surface of the first driving magnet 1411 may face the first coil 1412. The third region may have an N pole and the fourth region may have an S pole. As a modified embodiment, the third region may have an S pole and the fourth region may have an N pole.

The first driving magnet 1411 may comprise a neutral portion being disposed between a first region and a second region. The first driving magnet 1411 may comprise a neutral portion being disposed between the third region and the fourth region. The neutral portion may be a portion whose polarity is close to neutral. The neutral portion may be a void. Or, as a modified embodiment, the neutral portion may be disposed between the first region and the third region and between the second region and the fourth region.

The region of the first driving magnet 1411 most adjacent to the first surface of the second magnet 1120 may have a polarity generating an attractive force with the first surface of the second magnet 1120. The first surface of the second magnet 1120 and the first region of the first driving magnet 1411 most adjacent to the first surface of the second magnet 1120 may generate an attractive force to each other.

Each of the second magnet 1120 and the first driving magnet 1411 may comprise a first surface facing the central portion of the moving unit 1200. The first surface of the first driving magnet 1411 may comprise a first region and a second region having different polarities. The first surface of the second magnet 1120 may be disposed closer to the first driving magnet 1411 than the second driving magnet 1421. The first region of the first driving magnet 1411 may be disposed closer to the second magnet 1120 than the second region. The first region of the first driving magnet 1411 may have a polarity different from that of the first surface of the second magnet 1120.

Each of the second magnet 1120 and the first driving magnet 1411 may comprise a first surface facing the central portion of the holder 1210. The first surface of the first driving magnet 1411 and the first surface of the second magnet 1120 may comprise regions having different polarities.

The first driving unit 1410 may comprise a first coil 1412. The first coil 1412 may be disposed in the substrate 1130. The first coil 1412 may be disposed in the housing 1110. The first coil 1412 may be disposed at a position corresponding to the first driving magnet 1411 in the substrate 1130. The first coil 1412 may be disposed below the holder 1210. The first coil 1412 may interact with the first driving magnet 1411. When a current is applied to the first coil 1412, an electromagnetic field is formed around the first coil 1412 and can interact with the first driving magnet 1411. The first driving magnet 1411 and the first coil 1412 may tilt the holder 1210 with respect to the first axis. At this time, the first axis may be an x-axis.

In the present embodiment, a driving current in a first direction may be applied to the first coil 1412 to drive the first coil 1412. At this time, the driving current in a second direction opposite to the driving current in a first direction may not be used to drive the first coil 1412. That is, only one current in one direction of reverse or forward current may be supplied to the first coil 1412.

The reflective member driving device 1000 may comprise a Hall sensor 1413. The Hall sensor 1413 may detect the first driving magnet 1411. The Hall sensor 1413 may detect the magnetic force of the first driving magnet 1411. The Hall sensor 1413 may detect the position of the holder 1210. The Hall sensor 1413 may detect the position of the reflective member 1220. The Hall sensor 1413 may detect the amount of tilt of the holder 1210 about an x-axis.

The reflective member driving device 1000 may comprise a yoke 1414. The yoke 1414 may be disposed between the first driving magnet 1411 and the holder 1210. The yoke 1414 may be formed in a shape corresponding to that of the first driving magnet 1411. The yoke 1414 may increase the interaction force between the first driving magnet 1411 and the first coil 1412.

The driver unit 1400 may comprise a second driving unit 1420. The second driving unit 1420 may tilt the moving unit 1200 about the second axis against the stationary unit 1100. The second driving unit 1420 may tilt the holder 1210 with respect to a second axis perpendicular to the first axis of the moving plate 1300. The second driving unit 1420 may tilt the moving unit 1200 about a y-axis against the stationary unit 1100. The second driving unit 1420 may comprise a coil and a magnet. The second driving unit 1420 may move the moving unit 1200 through electromagnetic interaction. As a modified embodiment, the second driving unit 1420 may comprise a shape memory alloy (SMA).

The second driving unit 1420 may comprise a second driving magnet 1421. The second driving magnet 1421 may be disposed in the holder 1210. The second driving magnet 1421 may be disposed on both side surfaces of the holder 1210. The second driving magnet 1421 may be fixed to the holder 1210. The second driving magnet 1421 may be fixed to the holder 1210 by an adhesive. The second driving magnet 1421 may be disposed between the side surface of the holder 1210 and the housing 1110. The second driving magnet 1421 may be disposed between the holder 1210 and the side plate of the housing 1110. The second driving magnet 1421 may move integrally with the holder 1210. The second driving magnet 1421 may tilt the holder 1210. The second driving magnet 1421 may tilt the holder 1210 about a second axis perpendicular to the first axis. The second driving magnet 1421 may be disposed to face the second coil 1422. The second driving magnet 1421 may face the second coil 1422. The second driving magnet 1421 may be disposed at a position corresponding to the second coil 1422. The second driving magnet 1421 may interact with the second coil 1422. The second driving magnet 1421 may interact with the second coil 1422 electromagnetically.

The second driving magnet 1421 may comprise a neutral portion having no polarity. The neutral portion may be a void. The neutral portion may be placed between the N pole and the S pole. The neutral portion may be disposed between a first portion corresponding to the front side of the second driving magnet 1421 and a second portion corresponding to the rear side. Or, the neutral portion may be disposed between the inner side portion and the outer side portion of the second driving magnet 1421.

The second driving magnet 1421 may comprise the first sub magnet 1421-1. The first sub magnet 1421-1 may be disposed on one side of the holder 1210. The first sub magnet 1421-1 may be disposed to face the first sub coil 1422-1. The first sub magnet 1421-1 may face the first sub coil 1422-1. The first sub magnet 1421-1 may be disposed at a position corresponding to the first sub coil 1422-1. The first sub magnet 1421-1 may interact with the first sub coil 1422-1. The first sub magnet 1421-1 may electromagnetically interact with the first sub coil 1422-1.

The second driving magnet 1421 may comprise a second sub magnet 1421-2. The second sub magnet 1421-2 may be disposed on the other side of the holder 1210. The second sub magnet 1421-2 may be disposed at an opposite side of the first sub magnet 1421-1. The second sub magnet 1421-2 may have the same size and shape as the first sub magnet 1421-1. The second sub magnet 1421-2 may be disposed to face the second sub coil 1422-2. The second sub magnet 1421-2 may face the second sub coil 1422-2. The second sub magnet 1421-2 may be disposed at a position corresponding to the second sub coil 1422-2. The second sub magnet 1421-2 may interact with the second sub coil 1422-2. The second sub magnet 1421-2 may electromagnetically interact with the second sub coil 1422-2.

The second driving unit 1420 may comprise a second coil 1422. The second coil 1422 may be disposed in the substrate 1130. The second coil 1422 may be disposed in the housing 1110. The second coil 1422 may be disposed in the second portion of the substrate 1130. The second coil 1422 may be disposed at both sides of the holder 1210. The second coil 1422 may be disposed to interact with the second driving magnet 1421. When current is applied to the second coil 1422, an electromagnetic field is formed around the second coil 1422 and can interact with the second driving magnet 1421. The second coil 1422 may comprise two sub coils 1421-1 and 1421-2 disposed opposite to each other with respect to the holder 1210. The two sub coils 1421-1 and 1421-2 may be electrically connected to each other. The second driving magnet 1421 and the second coil 1422 may tilt the holder 1210 with respect to a second axis perpendicular to the first axis. At this time, the second axis may be a y axis. The first axis may be an x-axis and a z-axis may be an optical axis of the image sensor 3400.

The second coil 1422 may comprise the first sub coil 1422-1. The first sub coil 1422-1 may be disposed in the substrate 1130. The first sub coil 1422-1 may be disposed in the housing 1110. The first sub coil 1422-1 may be disposed in a second portion of the substrate 1130. The first sub coil 1422-1 may be disposed at a side of the holder 1210. When a current is applied to the first sub coil 1422-1, an electromagnetic field is formed around the first sub coil 1422-1 and can interact with the first sub magnet 1421-1.

The second coil 1422 may comprise a second sub coil 1422-2. The second sub coil 1422-2 may be disposed in the substrate 1130. The second sub coil 1422-2 may be disposed in the housing 1110. The second sub coil 1422-2 may be disposed in a second portion of the substrate 1130. The second sub coil 1422-2 may be disposed at a side of the holder 1210. When a current is applied to the second sub coil 1422-2, an electromagnetic field is formed around the second sub coil 1422-2 and can interact with the second sub magnet 1421-2.

The second driving magnet 1421 may comprise a first sub magnet 1421-1 being disposed in the first side of the holder 1210 and a second sub magnet 1421-2 being disposed on a second side surface of the holder 1210. The second coil 1422 comprises a first sub coil 1422-1 being disposed in the substrate and disposed at a position corresponding to the first sub magnet 1421-1, and a second sub coil 1422-2 being disposed in the substrate and disposed at a position corresponding to the second sub magnet 1421-2.

The reflective member driving device 1000 may comprise a Hall sensor 1423. The Hall sensor 1423 may detect the second driving magnet 1421. The Hall sensor 1423 may sense the magnetic force of the second driving magnet 1421. The Hall sensor 1423 may detect the position of the holder 1210. The Hall sensor 1423 may detect the position of the reflective member 1220. The Hall sensor 1423 may detect the amount of tilt of the holder 1210 about a y-axis.

The reflective member driving device 1000 may comprise a second yoke 1424. The second yoke 1424 may be disposed between the second driving magnet 1421 and the holder 1210. The second yoke 1424 may be formed in a shape corresponding to that of the second driving magnet 1421. The second yoke 1424 may increase the interaction force between the second driving magnet 1421 and the second coil 1422.

The reflective member driving device 1000 may comprise a first yoke 1425. As illustrated in FIGS. 23 and 24, a first yoke 1425 may be provided. The first yoke 1425 may be disposed on one surface of the second driving magnet 1421. The first yoke 1425 may be disposed on a second surface of the second driving magnet 1421. The second driving magnet 1421 may comprise a first surface facing in the same direction as the first surface of the holder 1210 and a second surface at an opposite side of a first surface of the second driving magnet 1421. At this time, the first surface of the second driving magnet 1421 may be a surface facing forward and the second surface may be a surface facing rearward. The second surface of the second driving magnet 1421 may be a surface facing the lens driving device 2000. The holder 1210 may comprise a first surface on which the moving plate 1300 is disposed, a second surface being connected to the first surface, and a third and fourth surfaces being connected to the first and second surfaces and being disposed at an opposite side to each other. At this time, the first surface of the holder 1210 is facing forward, and the second surface may be a lower surface facing downward, and the third and fourth surfaces may be the both side surfaces. A second driving magnet 1421 may be disposed on at least one of the third and fourth surfaces of the holder 1210.

The first yoke 1425 may be disposed at the same height as the second driving magnet 1421. The first yoke 1425 may be disposed at a height lower than that of the second driving magnet 1421. The first yoke 1425 may be bonded to the second driving magnet 1421. The first yoke 1425 may be fixed to the second driving magnet 1421 with an adhesive. The first yoke 1425 may be coupled to the second driving magnet 1421. As a modified embodiment, the first yoke 1425 may comprise a chamfered shape at a corner. Any one or more of the corners of the first yoke 1425 may be formed with any one or more among a C-cut, an R-cut, or a chamfer.

The holder 1210 may comprise a magnet accommodating groove 1217 concavely formed on the third and fourth surfaces of the holder 1210. The magnet accommodating groove 1217 may be a groove. The second driving magnet 1421 may be disposed in the magnet accommodating groove 1217 of the holder 1210. The first yoke 1425 may be disposed between the second surface of the second driving magnet 1421 and the holder 1210. The first yoke 1425 may be disposed between the second surface of the second driving magnet 1421 and the magnet accommodating groove 1217 of the holder 1210.

The second driving magnet 1421 may comprise a third surface facing the second coil 1422 and a fourth surface at an opposite side of the third surface of the second driving magnet 1421. A second yoke 1424 may be disposed between the fourth surface of the second driving magnet 1421 and the holder 1210. That is, in the present embodiment, the first yoke 1425 and the second yoke 1424 may be disposed in the second driving magnet 1421. In other words, a first yoke 1425 separate from the second yoke 1424 may be disposed in the second driving magnet 1421. The first yoke 1425 may be formed as a separate member from the second yoke 1424. However, in a modified embodiment, the first yoke 1425 may be integrally formed with the second yoke 1424. In this case, the yoke may comprise a first portion corresponding to the first yoke 1425 and a second portion corresponding to the second yoke 1424. The first portion may be formed by being bent from the second portion. The first yoke 1425 may be disposed perpendicular to the second yoke 1424. The first yoke 1425 and the second yoke 1424 may have the same length in an optical axis direction. Or, as a modified embodiment, lengths of the first yoke 1425 and the second yoke 1424 in an optical axis direction may be different from each other.

A yoke may not be disposed between the first surface of the second driving magnet 1421 and the holder 1210. That is, the first yoke 1425 may be disposed between the rear surface of the second driving magnet 1421 and the holder 1210, and the yoke may not be disposed between the front surface of the second driving magnet 1421 and the holder 1210. That is, the first yoke 1425 may not be symmetrically disposed with respect to the center of the second driving magnet 1421.

The second driving magnet 1421 may comprise a first sub magnet 1421-1 being disposed on a third surface of the holder 1210. The second driving magnet 1421 may comprise a second sub magnet 1421-2 being disposed on a fourth surface of the holder 1210. The first yoke 1425 may be disposed on each of the first sub magnet 1421-1 and the second sub magnet 1421-2. The first yoke 1425 may be disposed in the first sub magnet 1421-1. The first yoke 1425 may be disposed in the second sub magnet 1421-2.

The first yoke 1425 may not be overlapped with the first sub magnet 1421-1 in a direction in which the first sub magnet 1421-1 faces the second sub magnet 1421-2. However, the second yoke 1424 may be overlapped with the first sub magnet 1421-1 in a direction in which the first sub magnet 1421-1 faces the second sub magnet 1421-2. When the first yoke 1425 is determined to have a separate component from the second yoke 1424, in a direction in which the first sub magnet 1421-1 faces the second sub magnet 1421-2, the second yoke 1424 is overlapped with the first sub magnet 1421-1 and the first yoke 1425 may not be overlapped with the first sub magnet 1421-1.

In the present embodiment, the first yoke 1425 is additionally disposed in addition to the second yoke 1424 that shields the leakage flux of the second driving magnet 1421 to improve the driving force, thereby possibly minimizing a phenomenon in which magnetic field interference of the leakage flux generated from the reflective member driving device 1000 with the driving magnets 2411 and 2421 of the lens driving device 2000 occurs. Through this, a sweep phenomenon during AF driving can be prevented. In addition, a phenomenon of AF failure in a tele-direction can be prevented.

In a modified embodiment, the second driving magnet 1421 may comprise recesses 1431 and 1432. The influence of the magnetic force of the second driving magnet 1421 on the driving magnets 2411 and 2421 of the lens driving device 2000 may be reduced through the first recess 1431.

The second driving magnet 1421 may comprise a first surface facing the same direction as the first surface of the holder 1210. A first surface of the second driving magnet 1421 may face forward. The second driving magnet 1421 may comprise a second surface at an opposite side of the first surface of the second driving magnet 1421. A second surface of the second driving magnet 1421 may face rearward. The second driving magnet 1421 may comprise a third surface facing the second coil 1422. A third surface of the second driving magnet 1421 may face outward. The second driving magnet 1421 may comprise a fourth surface at an opposite side of the third surface of the second driving magnet 1421. A fourth surface of the second driving magnet 1421 may face inward.

The second driving magnet 1421 may comprise a first recess 1431. As illustrated in FIGS. 25 to 27, a first recess 1431 may be provided. In the present embodiment, the second recess 1432 may be provided together. The first yoke 1425 may be omitted and the second yoke 1424 may be provided. The second driving magnet 1421 may comprise a first recess 1431 being formed in a corner region where the second surface of the second driving magnet 1421 and the fourth surface of the second driving magnet 1421 meet. The first recess 1431 may be formed in a corner region where an inner surface and a rear surface of the second driving magnet 1421 meet. At this time, the rear surface may be a surface facing the lens driving device 2000.

The first recess 1431 may be a shape in which some portion is omitted compared to the corner region wherein a second surface of the second driving magnet 1421 and a third surface of the second driving magnet 1421 meet. That is, the shape of the corner region where the second and fourth surfaces of the second driving magnet 1421 meet may differ from the shape of the corner region where the second and third surfaces of the second driving magnet 1421 meet. The shape of the corner region where the second and fourth surfaces of the second driving magnet 1421 meet may be a shape in which some portion of the corner region where the second and third surfaces of the second driving magnet 1421 meet is omitted.

A corner region where the second and fourth surfaces of the second driving magnet 1421 meet may be partially cut. A corner region where the second and fourth surfaces of the second driving magnet 1421 meet may be cut with a C-cut. At this time, the cutting surface may be formed as an inclined surface being disposed inclined with each of the second and fourth surfaces of the second driving magnet 1421. Or, the corner region where the second and fourth surfaces of the second driving magnet 1421 meet may be cut into an inverted 'L' shape. At this time, the cutting surface may comprise a first surface perpendicular to the second surface of the second driving magnet 1421 and a second surface perpendicular to the fourth surface of the second driving magnet 1421. A portion of the corner region where the second and fourth surfaces of the second driving magnet 1421 meet may be cut or machined.

By adding a C-cut to the corner region of the lens driving device 2000 side of the second driving magnet 1421, a phenomenon in which the leakage flux generated from the reflective member driving device 1000 interferes with the lens driving device 2000 can be minimized. The C-cut may be formed only in the corner region where the second and fourth surfaces of the second driving magnet 1421 meet. Or, the C-cut may be additionally formed in a corner region where the first and fourth surfaces of the second driving magnet 1421 meet. The C-cut may be formed in a way that a portion of the third surface of the second driving magnet 1421 is not omitted. Through this, even if the C-cut is provided, the decrease in magnetic force between the second driving magnet 1421 and the second coil 1422 can be minimized compared to the case without a C-cut.

As in the previous embodiment, adding the first yoke 1425 may be a more reliable way to prevent leakage flux. However, the first recess 1431 of the modified embodiment has an advantage in that the cost compared to adding the first yoke 1425 is low and no additional process is required during assembly.

The first recess 1431 may comprise an inclined surface connecting the second surface of the second driving magnet 1421 and the third surface of the second driving magnet 1421 inclinedly. In a modified embodiment, an inclined surface can be changed to a curved surface with curvature. That is, the first recess 1431 may comprise a curved surface being connected to the second surface of the second driving magnet 1421 and the third surface of the second driving magnet 1421.

In the direction in which the first surface of the second driving magnet 1421 faces the second surface of the second driving magnet 1421, the length of the third surface of the second driving magnet 1421 may be longer than the length of the fourth surface of the second driving magnet 1421. That is, it may be a shape in which a portion of the third surface of the second driving magnet 1421 is omitted compared to the fourth surface of the second driving magnet 1421.

The second driving magnet 1421 may comprise a second recess 1432 being formed in a corner region where the first surface of the second driving magnet 1421 and the fourth surface of the second driving magnet 1421 meet. The second recess 1432 may be formed symmetrically with the first recess 1431 with respect to an imaginary plane passing through the center of the second driving magnet 1421. That is, the second recess 1432 may have the same size as the first recess 1431. The second recess 1432 may be formed in the same shape as or a corresponding shape to the first recess 1431.

The length of the second surface of the second driving magnet 1421 (refer to W1 in FIG. 26) in a direction in which the third surface of the second driving magnet 1421 faces the fourth surface of the second driving magnet 1421 may be 40 to 60% of the distance between the third surface of the second driving magnet 1421 and the fourth surface of the second driving magnet 1421 (refer to W2 in FIG. 26). The length of the second surface of the second driving magnet 1421 (refer to W1 in FIG. 26) in a direction in which the third surface of the second driving magnet 1421 faces the fourth surface of the second driving magnet 1421 may be 30 to 70% of the distance between the third surface of the second driving magnet 1421 and the fourth surface of the second driving magnet 1421 (refer to W2 in FIG. 26).

In a direction in which the third surface of the second driving magnet 1421 faces the fourth surface of the second driving magnet 1421, the length of the second surface of the second driving magnet 1421 may be 0.3 mm or more. In a direction in which the third surface of the second driving magnet 1421 faces the fourth surface of the second driving magnet 1421, the omitted length of the second surface of the second driving magnet 1421 may be 0.3 mm or more. In a direction in which the third surface of the second driving magnet 1421 faces the fourth surface of the second driving magnet 1421, the omitted length of the second surface of the second driving magnet 1421 may be 0.2 mm or more. In a direction in which the third surface of the second driving magnet 1421 faces the fourth surface of the second driving magnet 1421, the omitted length of the second surface of the second driving magnet 1421 may be 0.4 mm or less.

In a direction in which the first surface of the second driving magnet 1421 faces the second surface of the second driving magnet 1421, the length of the fourth surface (refer to W3 in FIG. 26) may be 70% to 90% of the length of the third side (refer to W4 in FIG. 26). In a direction in which the first surface of the second driving magnet 1421 faces the second surface of the second driving magnet 1421, the length of the fourth surface (refer to W3 in FIG. 26) may be 75% to 82% of the length of the third side (refer to W4 in FIG. 26). At this time, the reason why the length of the third surface is shorter than the length of the fourth surface may be that the third surface is omitted as much as the first and second recesses 1431 and 1432.

In another modified embodiment, as illustrated in FIG. 28, the second recess 1432 may be omitted. Only the first recess 1431 is formed in the second driving magnet 1421 and the second recess 1432 may be omitted. The first recess 1431 of the second driving magnet 1421 may be provided in a direction directing toward the lens driving device 2000.

In yet another modified embodiment, as illustrated in FIG. 29, first and second recesses 1431 and 1432 may be formed in the second driving magnet 1421 and a first yoke 1425 may be additionally disposed. As a modified embodiment, only the first recess 1431 may be formed in the second driving magnet 1421, the second recess 1432 may be omitted, and the first yoke 1425 may be disposed.

The reflective member driving device 1000 may comprise a damper 1500. The damper 1500 may comprise an adhesive material. The damper 1500 may have viscosity. The damper 1500 may be disposed between the stationary unit 1100 and the moving unit 1200. The damper 1500 may be disposed between the rigid mover 1230 and the housing 1110. The damper 1500 may connect the rigid mover 1230 and the housing 1110. The damper 1500 may be coupled to the rigid mover 1230 and the housing 1110. The damper 1500 may be disposed in the rigid mover 1230. The damper 1500 may be coupled with the rigid mover 1230. The damper 1500 may be coupled to the rigid mover 1230. The rigid mover 1230 may be coupled to the housing 1110. The housing 1110 and the rigid mover 1230 may be attached to each other by the damper 1500.

The damper 1500 may be disposed on at least one of an upper portion and a lower portion of the first portion 1111 of the housing 1110. The damper 1500 may connect the protruded portion 1231 of the rigid mover 1230 and the housing 1110. At least a portion of the damper 1500 may be disposed between the protruded portion 1231 of the rigid mover 1230 and the housing 1110 in the groove 1119 of the housing 1110. At least a portion of the damper 1500 may be disposed in a second groove portion being recessed from the first groove portion of the housing 1110.

In the present embodiment, a bond of a gel component serving as a damper may be applied between the housing 1110 and the rigid mover 1230. Through this, it is possible to increase the responsiveness of the actuator by maintaining a gain value and securing a phase margin. That is, FRA characteristics can be improved. In particular, response characteristics of a tilt (pitch) about an x-axis may be improved. The tilt about a y-axis (yaw) can also be improved.

Figure 34:
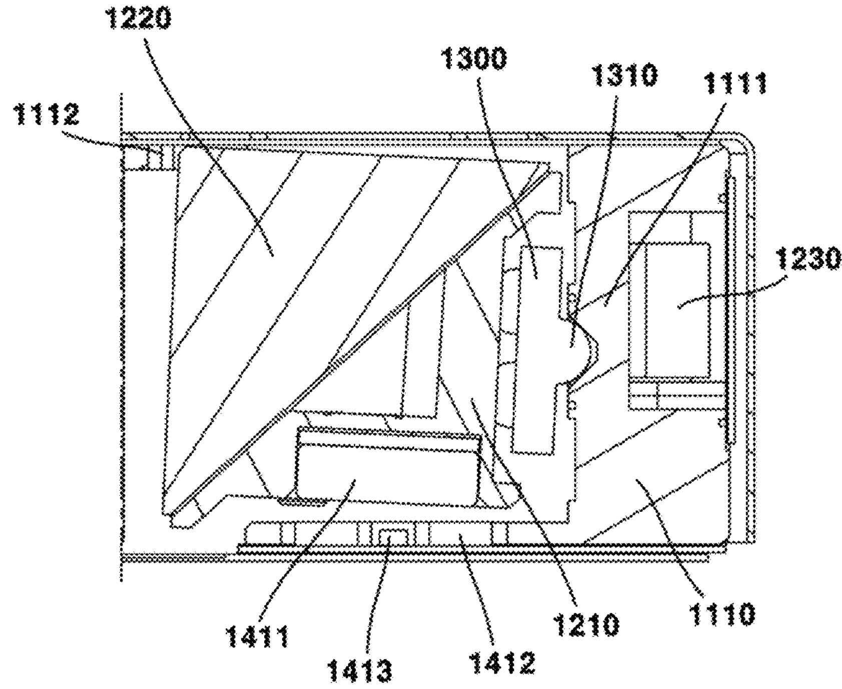
FIGS. 34 and 35 are diagrams for explaining a tilt about an x-axis of a reflective member driving device according to the present embodiment.
Figure 35:
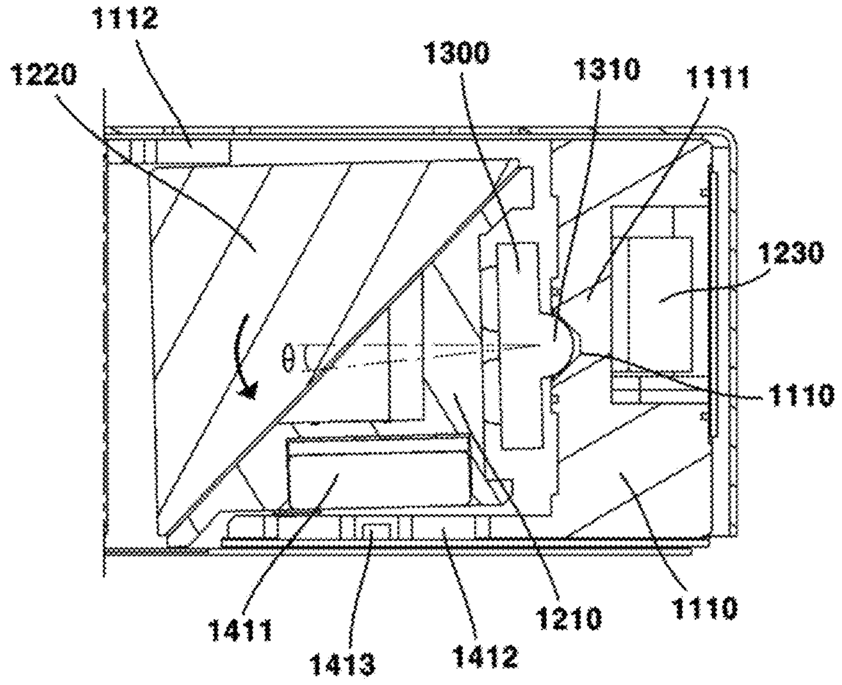

FIGS. 34 and 35 are diagrams for explaining a tilt about an x-axis of a reflective member driving device according to the present embodiment.

In the present embodiment, the holder 1210 may be disposed between the upper and lower plates of the housing 1110 in an initial state in which current is not supplied to the first driving unit 1410. At this time, the holder 1210 may be in contact with an upper plate of the housing 1110 (refer to FIG. 30).

At this time, when a current in a first direction is applied to the first coil 1412, by the electromagnetic interaction between the first coil 1412 and the first driving magnet 1411, the holder 1210 may tilt downward about the first protrusion 1310 of the moving plate 1300 (refer to θ in FIG. 35).

That is, when a current is applied to the first coil 1412, the holder 1210 may be tilted downward with respect to the housing 1110 about an x-axis. At this time, since the holder 1210 and the reflective member 1220 are also tilted, the optical path is changed so that shaking detected by the gyro sensor 1150 can be offset.

In the present embodiment, only the current in a first direction is used to control the first coil 1412, and the current in a second direction opposite to the first direction may not be used. Through this, the detachment problem of the moving plate 1300 that may occur when a current in a second direction is applied to the first coil 1412 can be fundamentally prevented.

In more detail, as a comparative example, when the centers of the first magnet 1240 and the second magnet 1120 are disposed at the same height as the first protrusion 1310 of the moving plate 1300, When the repulsive force between the first magnet 1240 and the magnets 1120 the second magnet 1240 and the electromagnetic force between the first coil 1412 and the first driving magnet 1411 are non-uniform, the moving unit 1200 may slide due to the electromagnetic force so that the moving plate 1300 may be detached. When the electromagnetic force between the first coil 1412 and when the first driving magnet 1411 is greater than the repulsive force between the first magnet 1240 and the second magnet 1120, a phenomenon in which the rigid mover 1230 comes off as much as the gap between the first magnet 1240 and the second magnet 1120 occurs, and the moving plate 1300 may be separated. This may cause a failure of a hole calibration dynamic characteristics.

In the present embodiment, the center axis of the repulsive force and the center axis of the x-axis drive may be shifted by a certain distance. Through this, the reflective member 1220 may be mechanically shifted in an upward direction. At this time, the upward direction may be the opposite direction of gravity.

In the present embodiment, it can be controlled by code rather than current control. In a pivot structure like the present embodiment, it is difficult to know the initial position in an open state due to deflection due to gravity, and the like, control may be required in a closed method (a method in which the moving unit 1200 is in contact with the stationary unit 1100 in an initial state). In the present embodiment, since it is controlled in a closed manner, more precise driving can be performed. Furthermore, in the present embodiment, noise generated as the moving unit 1200 is moving around also can be minimized by the closed method.

Figure 36:
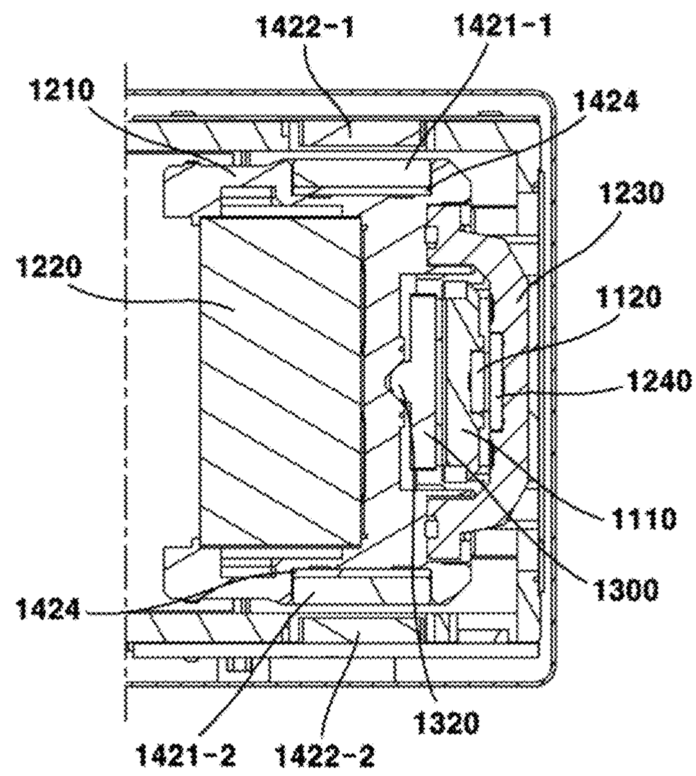
FIGS. 36 to 38 are views for explaining a tilt about a y-axis of a reflective member driving device according to the present embodiment.
Figure 37:
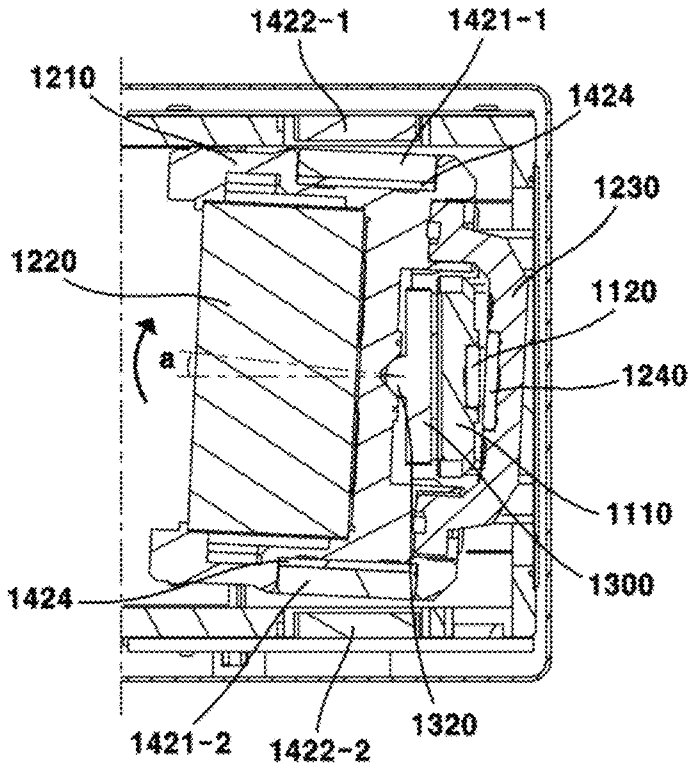
Figure 38:
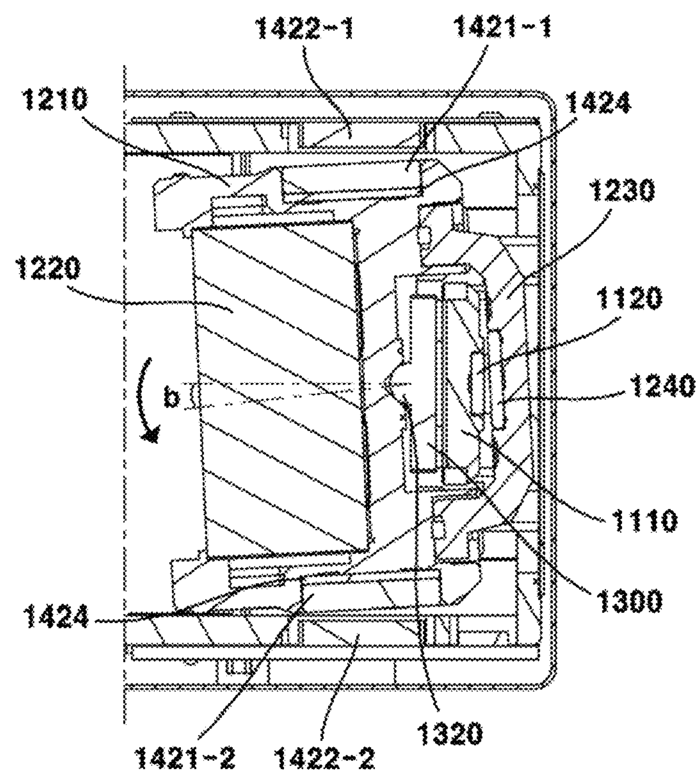

FIGS. 36 to 38 are views for explaining a tilt about a y-axis of a reflective member driving device according to the present embodiment.

In the present embodiment, the holder 1210 may be disposed between both side plates of the housing 1110 in an initial state in which current is not supplied to the second driving unit 1420. At this time, it may be a state in which the holder 1210 is spaced apart from both side plates of the housing 1110 (refer to FIG. 36).

At this time, when current in a first direction is applied to the second coil 1422, the holder 1210 may be tilted to one side about the second protrusion 1320 of the moving plate 1300 due to the electromagnetic interaction between the second coil 1422 and the second driving magnet 1421 (refer to a in FIG. 37).

Meanwhile, when a current in the second direction which is opposite to the first direction is applied to the second coil 1422, the holder 1210 may be tilted to one side about the second protrusion 1320 of the moving plate 1300 due to the electromagnetic interaction between the second coil 1422 and the second driving magnet 1421 (refer to b in FIG. 38).

That is, current is selectively applied to the second coil 1422 in both directions so that the holder 1210 can be tilted in left and right directions with respect to the housing 1110 about a y-axis. At this time, since the holder 1210 and the reflective member 1220 are also tilted, the optical path is changed so that shaking detected by the gyro sensor 1150 can be offset. Therefore, in the present embodiment, hand shake correction for x-axis tilt and y-axis tilt, that is, 2-axis tilt may be performed.

Hereinafter, a lens driving device according to the present embodiment will be described with reference to drawings.

Figure 39:
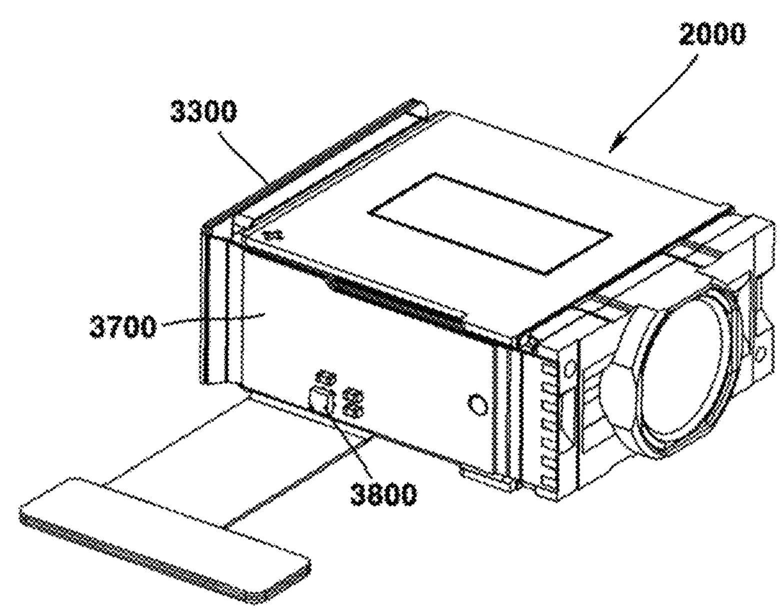
FIG. 39 is a perspective view of a lens driving device according to the present embodiment.
Figure 40:
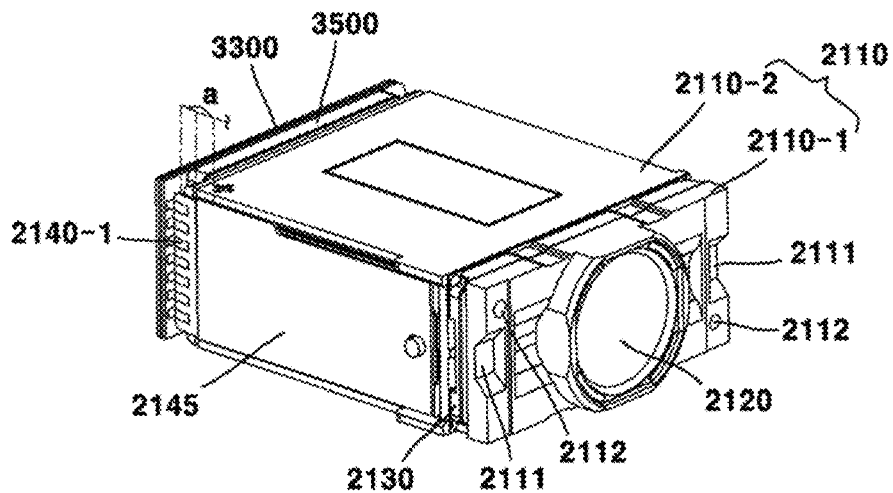
FIG. 40 is a perspective view in which some components of a lens driving device according to the present embodiment are omitted.
Figure 41:
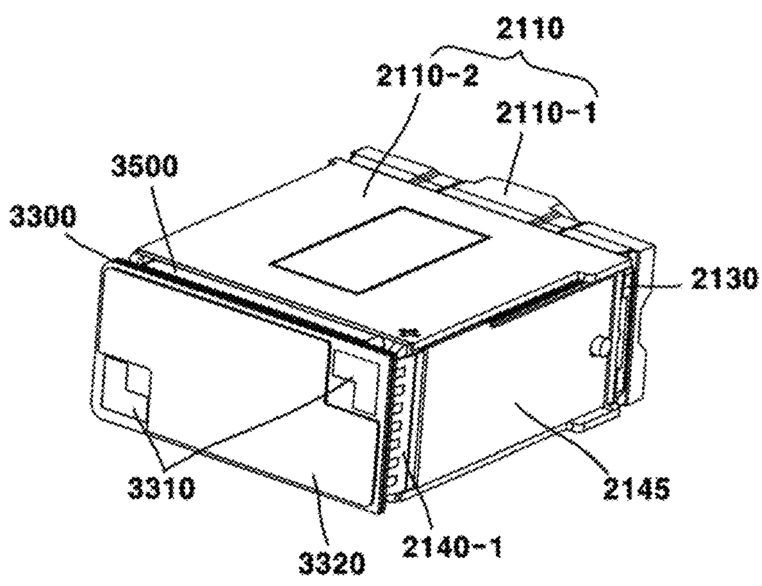
FIG. 41 is a perspective view of a lens driving device in a state illustrated in FIG. 40 viewed from another direction.
Figure 42:
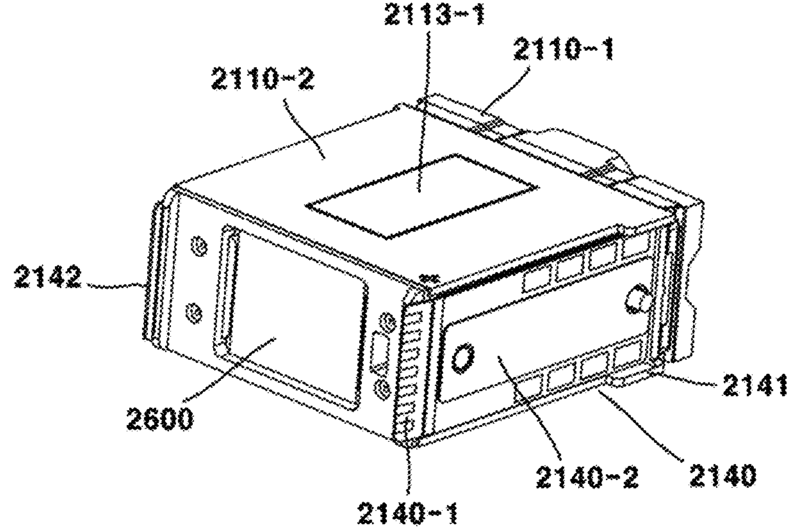
FIG. 42 is a perspective view in which some components of a lens driving device according to the present embodiment are omitted.
Figure 43:
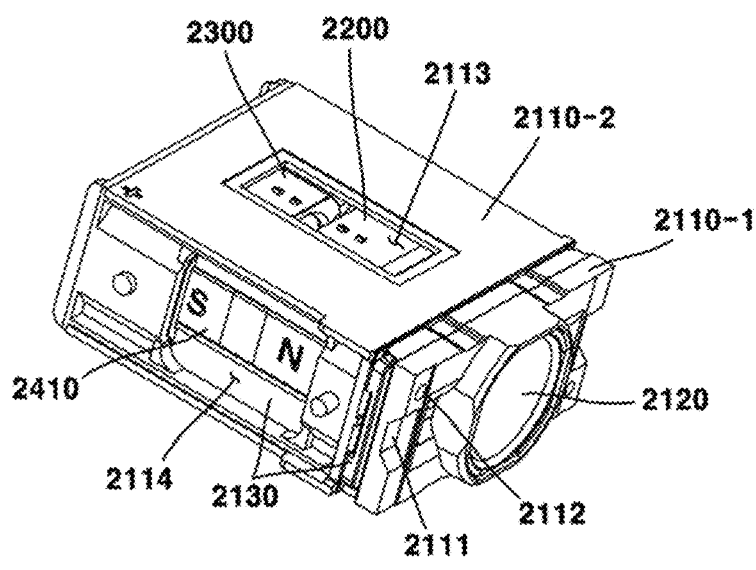
FIG. 43 is a perspective view of a state in which components such as a substrate and a coil are omitted in a lens driving device according to the present embodiment.
Figure 44:
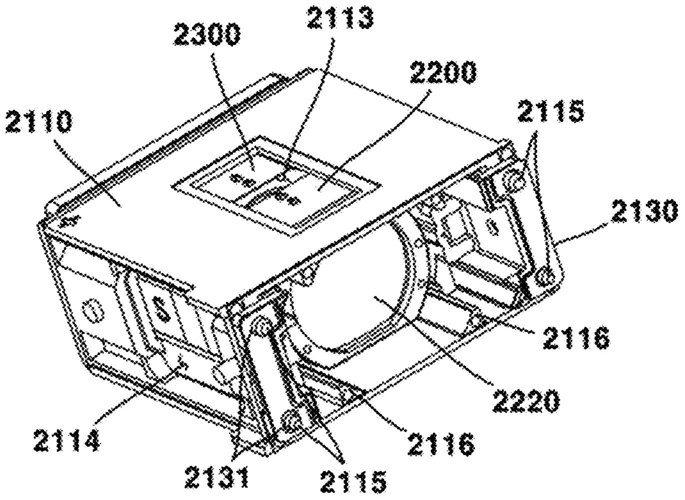
FIG. 44 is a perspective view of a state in which a first lens and related components are omitted from the lens driving device illustrated in FIG. 43.
Figure 45:
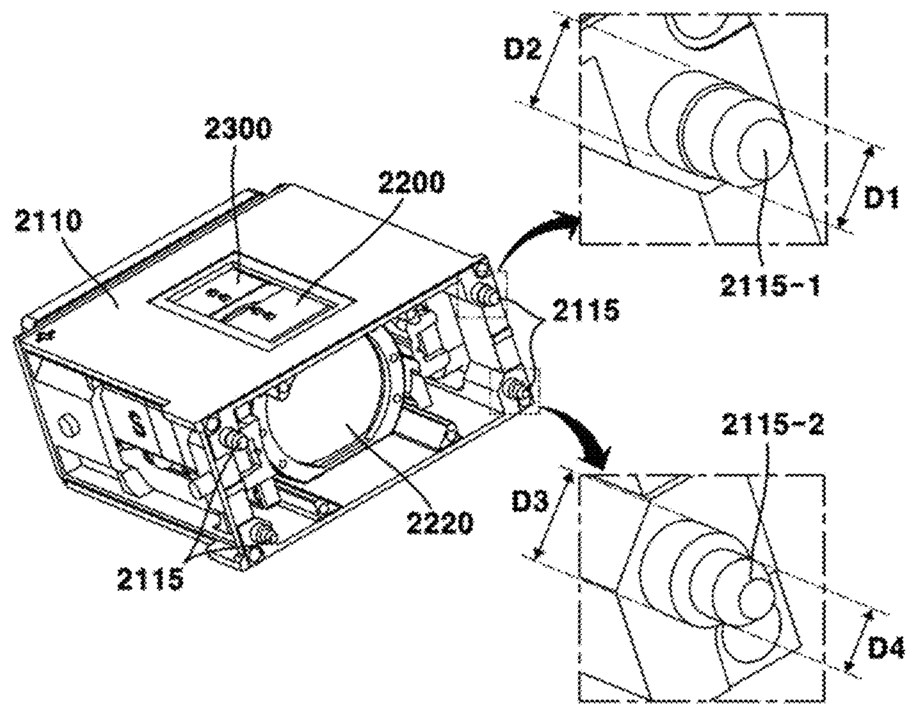
FIG. 45 is a perspective view and a partial enlarged view of some components of a lens driving device according to the present embodiment.
Figure 46:
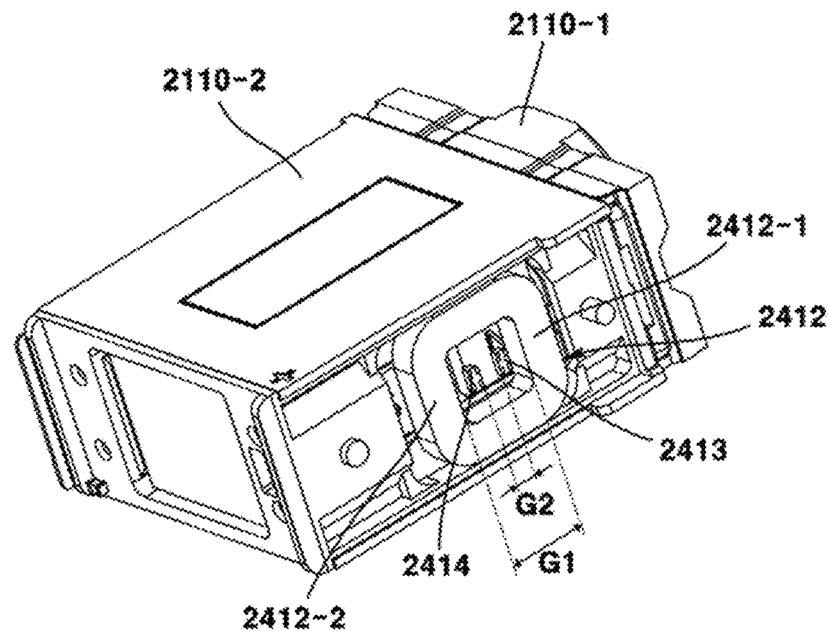
FIG. 46 is a diagram for explaining an arrangement structure of a coil and a sensor of a lens driving device according to the present embodiment.
Figure 47:
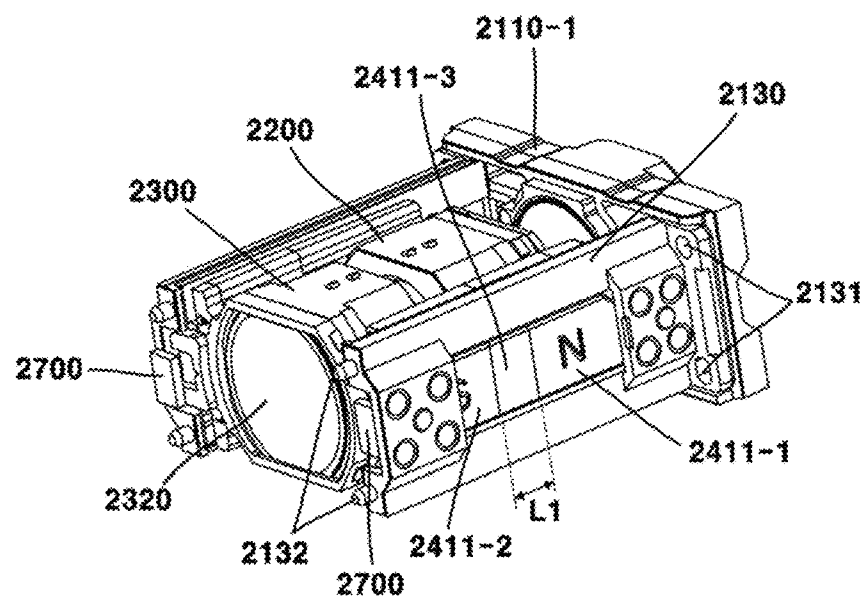
FIG. 47 is a perspective view of a state in which the second housing is omitted from the lens driving device illustrated in FIG. 43.
Figure 48:
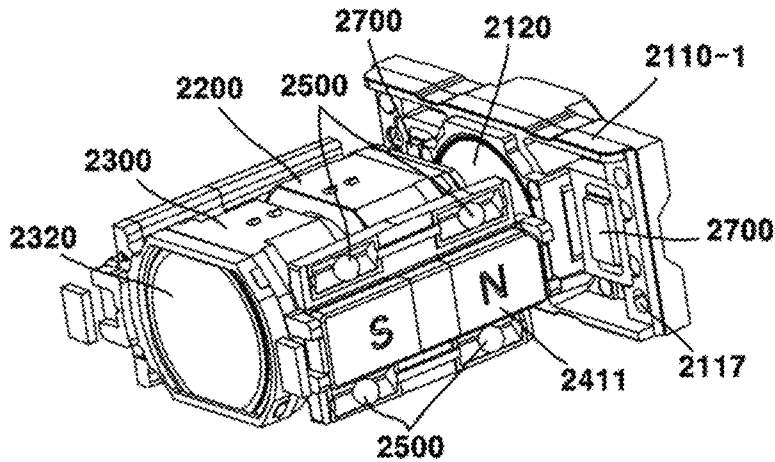
FIG. 48 is a perspective view of a state in which a guide rail is omitted from the lens driving device illustrated in FIG. 47.
Figure 49:
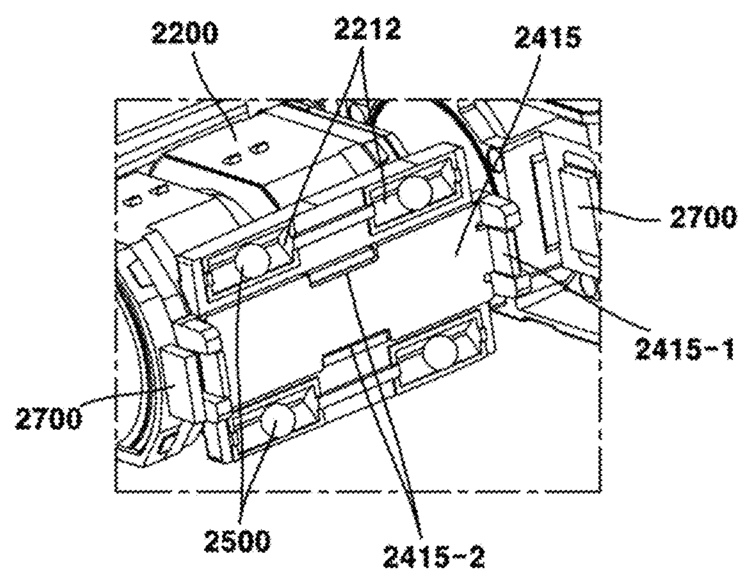
FIG. 49 is an enlarged view of some components of a lens driving device according to the present embodiment.
Figure 50:
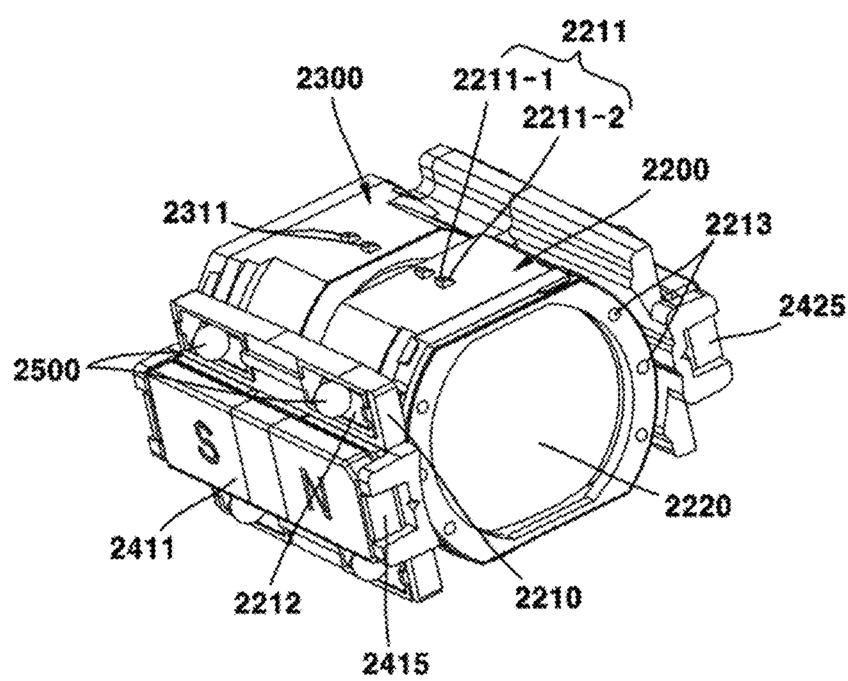
FIG. 50 is a perspective view of a first moving unit and a second moving unit and related components of a lens driving device according to the present embodiment.
Figure 51:
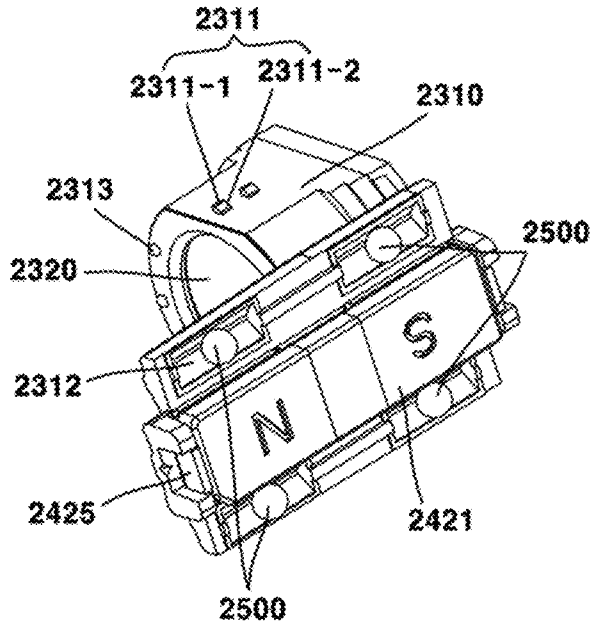
FIG. 51 is a perspective view of a second moving unit and related components of a lens driving device according to the present embodiment.
Figure 52:
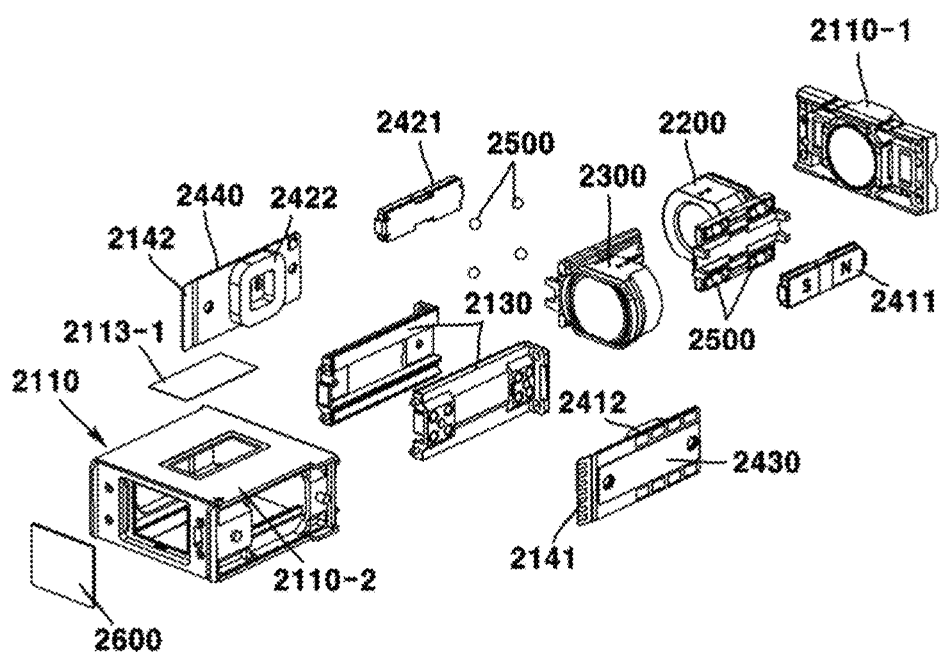
FIG. 52 is an exploded perspective view of a lens driving device according to the present embodiment.
Figure 53:
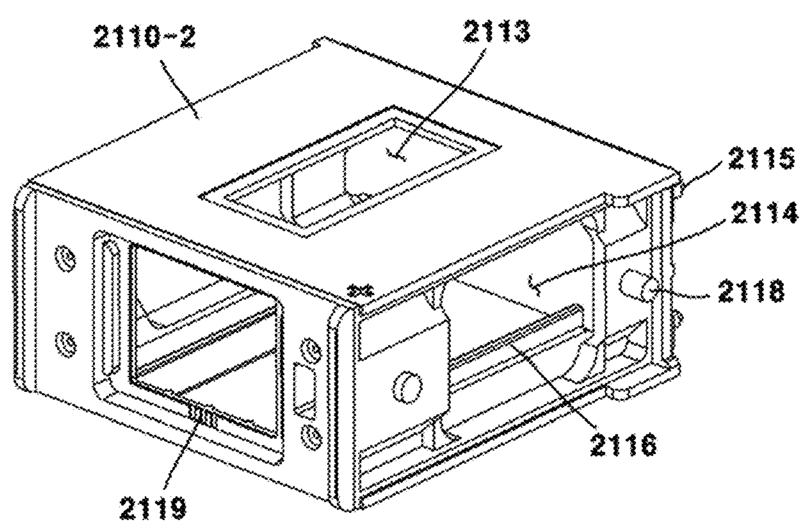
FIG. 53 is a perspective view of a second housing of a lens driving device according to the present embodiment.
Figure 54:
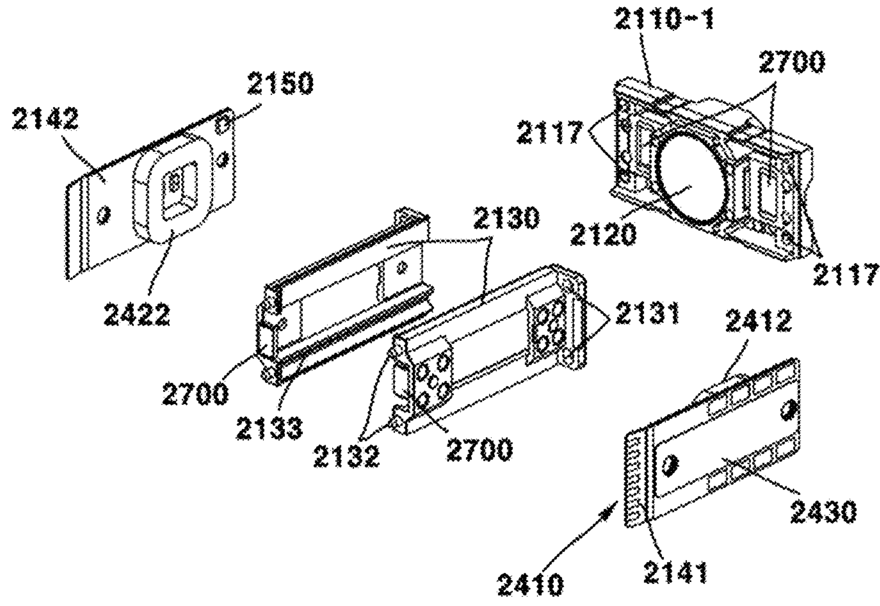
FIGS. 54 and 55 are exploded perspective views of some components of a lens driving device according to the present embodiment.
Figure 55:
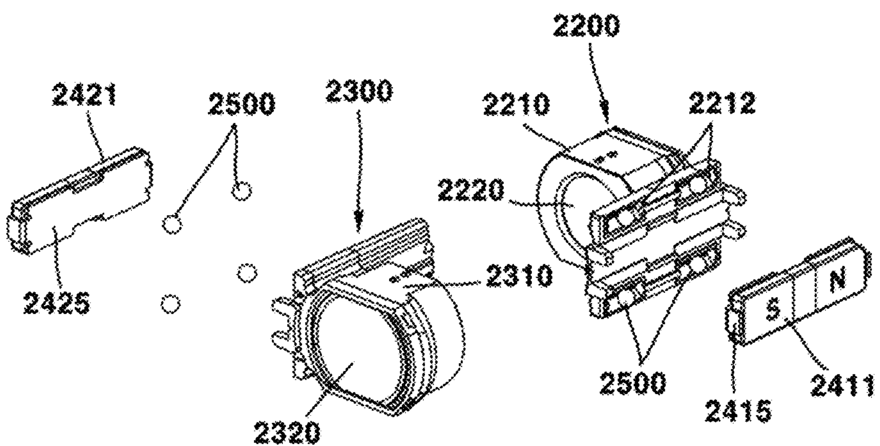
Figure 56:
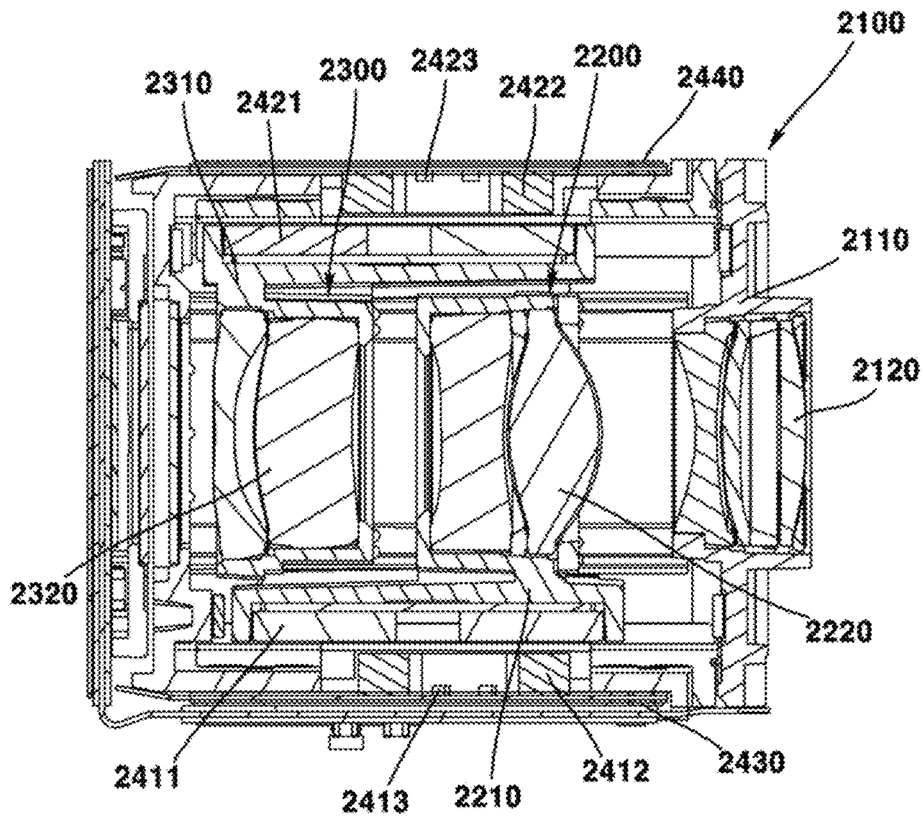
FIG. 56 is a cross-sectional view of a lens driving device according to the present embodiment.

FIG. 39 is a perspective view of a lens driving device according to the present embodiment; FIG. 40 is a perspective view in which some components of a lens driving device according to the present embodiment are omitted; FIG. 41 is a perspective view of a lens driving device in a state illustrated in FIG. 40 viewed from another direction; FIG. 42 is a perspective view in which some components of a lens driving device according to the present embodiment are omitted; FIG. 43 is a perspective view of a state in which components such as a substrate and a coil are omitted in a lens driving device according to the present embodiment; FIG. 44 is a perspective view of a state in which a first lens and related components are omitted from the lens driving device illustrated in FIG. 43; FIG. 45 is a perspective view and a partial enlarged view of some components of a lens driving device according to the present embodiment; FIG. 46 is a diagram for explaining an arrangement structure of a coil and a sensor of a lens driving device according to the present embodiment; FIG. 47 is a perspective view of a state in which the second housing is omitted from the lens driving device illustrated in FIG. 43; FIG. 48 is a perspective view of a state in which a guide rail is omitted from the lens driving device illustrated in FIG. 47; FIG. 49 is an enlarged view of some components of a lens driving device according to the present embodiment; FIG. 50 is a perspective view of a first moving unit and a second moving unit and related components of a lens driving device according to the present embodiment; FIG. 51 is a perspective view of a second moving unit and related components of a lens driving device according to the present embodiment; FIG. 52 is an exploded perspective view of a lens driving device according to the present embodiment; FIG. 53 is a perspective view of a second housing of a lens driving device according to the present embodiment; FIGS. 54 and 55 are exploded perspective views of some components of a lens driving device according to the present embodiment; and FIG. 56 is a cross-sectional view of a lens driving device according to the present embodiment.

The lens driving device 2000 may perform a zoom function. The lens driving device 2000 may perform a continuous zoom function. The lens driving device 2000 may perform an auto focus (AF) function. The lens driving device 2000 may move the lens. The lens driving device 2000 may move the lens along an optical axis. The lens driving device 2000 may move lenses formed in pluralities of groups for each group. The lens driving device 2000 may move a second group lens. The lens driving device 2000 may move a third group lens. The lens driving device 2000 may be a lens actuator. The lens driving device 2000 may be an AF actuator. The lens driving device 2000 may be a zoom actuator. The lens driving device 2000 may comprise a voice coil motor (VCM).

The lens driving device 2000 may comprise a lens. Or, the lens may be described as one component of the camera device 10 rather than a component of the lens driving device 2000. The lens may be disposed in an optical path formed by the reflective member 1220 of the reflective member driving device 1000 and the image sensor 3400. A lens may comprise pluralities of lenses. The pluralities of lenses may form pluralities of groups. The lenses can form three groups. The lenses may comprise first to third group lenses. A first group lens, a second group lens, and a third group lens may be sequentially disposed between the reflective member 1220 and the image sensor 3400. The first group lens may comprise a first lens 2120. The second group lens may comprise a second lens 2220. The third group lens may comprise a third lens 2320.

The lens driving device 2000 may comprise a stationary unit 2100. The stationary unit 2100 may be a relatively fixed part when the first moving unit 2200 and a second moving unit 2300 move.

The lens driving device 2000 may comprise a housing 2110. The stationary unit 2100 may comprise a housing 2110. The housing 2110 may be disposed outside the first holder 2210 and the second holder 2310. The housing 2110 may accommodate at least a portion of the first holder 2210 and the second holder 2310. The housing 2110 may comprise a front plate, a rear plate, and pluralities of connecting plates. At this time, the front plate is referred to as an upper plate, the rear plate is referred to as a lower plate, and the connecting plate is referred to as a side plate.

The housing 2110 may comprise a first housing 2110-1. The first housing 2110-1 may form a front plate of the housing 2110. The first housing 2110-1 may be coupled to the first lens 2120. The first housing 2110-1 may be a cover. The first housing 2110-1 may be coupled to the reflective member driving device 1000. The first lens 2120 may be fixed to the first housing 2110-1.

The housing 2110 may comprise a second housing 2110-2. The second housing 2110-2 may form a connection plate with a rear plate of the housing 2110. The second housing 2110-2 may be opened forward. The first housing 2110-1 may be coupled to the front of the second housing 2110-2. A portion of a guide rail 2130 may be disposed between the first housing 2110-1 and the second housing 2110-2.

The housing 2110 may comprise a first groove 2111. The first groove 2111 may be coupled to the protruded portion 1116 of the housing 1110 of the reflective member driving device 1000. The first groove 2111 may be formed in a shape corresponding to the protruded portion 1116 of the reflective member driving device 1000. An adhesive for coupling the reflective member driving device 1000 to the lens driving device 2000 may be disposed in the first groove 2111.

The housing 2110 may comprise a second groove 2112. The second groove 2112 may be coupled to the protrusion 1117 of the housing 1110 of the reflective member driving device 1000. The protrusion 1117 of the reflective member driving device 1000 may be inserted into the second groove 2112. The second groove 2112 may be formed in a shape corresponding to the protrusion 1117 of the reflective member driving device 1000. An adhesive for coupling the reflective member driving device 1000 to the lens driving device 2000 may be disposed in the second groove 2112.

The housing 2110 may comprise a first hole 2113. The first hole 2113 may expose the protrusion 2211 of the first holder 2210 and the protrusion 2311 of the second holder 2310. The first hole 2113 may be formed in a connection plate of the housing 2110. In the test stage during manufacturing, it is possible to check whether the lens driving device 2000 is normally operating by checking the protrusion 2211 of the first holder 2210 and the protrusion 2311 of the second holder 2310 being exposed through the first hole 2113.

The housing 2110 may comprise a plate 2113-1. The plate 2113-1 may cover the first hole 2113. The plate 2113-1 may be disposed in the first hole 2113 to close the first hole 2113.

The housing 2110 may comprise a second hole 2114. The second hole 2114 may be a coil accommodating hole in which the first coil 2412 and the second coil 2422 are disposed. A first coil 2412 and a second coil 2422 may be disposed in the second hole 2114. The second hole 2114 may be larger than the first coil 2412 and the second coil 2422.

The housing 2110 may comprise a protrusion 2115. The protrusion 2115 may be formed in the second housing 2110-2. The protrusion 2115 may be formed as a two-stage protrusion. The protrusion 2115 may be coupled with the guide rail 2130. The protrusion 2115 may be coupled to the first housing 2110-1. The guide rail 2130 may be coupled to a portion of the protrusion 2115 having a large diameter and the first housing 2110-1 may be coupled to a portion of the protrusion 2115 having a small diameter.

The protrusion 2115 may comprise a first protrusion 2115-1. The first protrusion 2115-1 may comprise a first portion having a first diameter D2 and a second portion being protruded from the first portion and having a second diameter D1. The protrusion 2115 may comprise a second protrusion 2115-2. The second protrusion 2115-2 may comprise a third portion having a third diameter D3 and a fourth portion being protruded from the third portion and having a fourth diameter D4. At this time, the fourth diameter D4 may be smaller than the second diameter D1. Through this, the first protrusion 2115-1 may be more tightly coupled to the first housing 2110-1 than the second protrusion 2115-2.

The housing 2110 may comprise a guide protrusion 2116. The guide protrusion 2116 may be formed on an inner surface of the housing 2110. The guide protrusion 2116 may be formed in a shape corresponding to the shape of at least a portion of the first holder 2210 and the second holder 2310. Through this, the guide protrusion 2116 may guide the movement of the first holder 2210 and the second holder 2310 in an optical axis direction. At this time, the optical axis direction may be a z-axis direction perpendicular to the x-axis and the y-axis. The guide protrusion 2116 may be disposed in an optical axis direction. The guide protrusion 2116 may be extended in an optical axis direction.

The housing 2110 may comprise a groove 2117. The groove 2117 may be formed in the first housing 2110-1. The groove 2117 of the first housing 2110-1 may be coupled with the protrusion 2115 of the second housing 2110-2.

The housing 2110 may comprise a protrusion 2118. The protrusion 2118 may be coupled to a substrate 2140. The protrusion 2118 may be inserted into a groove of the substrate 2140. The protrusion 2118 may be formed in a size and shape corresponding to the groove of the substrate 2140.

The housing 2110 may comprise a vent hole 2119. The vent hole 2119 may be formed in a rear plate of the housing 2110. The vent hole 2119 may form a gap between the housing 2110 and the dummy glass 2600. Air may flow into the gap between the housing 2110 and the dummy glass 2600. Gas generated during the curing process of the adhesive may escape through the vent hole 2119.

The lens driving device 2000 may comprise a first lens 2120. Or, the first lens 2120 may be described as a component of the camera device 10 rather than a component of the lens driving device 2000. The stationary unit 2100 may comprise a first lens 2120. The first lens 2120 may be disposed on an optical axis. The first lens 2120 may be disposed between the reflective member 1220 and the image sensor 3400. The first lens 2120 may be disposed between the reflective member 1220 and the second lens 2220. The first lens 2120 may be disposed inside the first housing 2110-1. The first lens 2120 may be fixed to the first housing 2110-1. The first lens 2120 may maintain a fixed state even when the second lens 2220 and the third lens 2320 move.

The first lens 2120 may be a first group lens. The first lens 2120 may comprise pluralities of lenses. The first lens 2120 may comprise three lenses.

The lens driving device 2000 may comprise a guide rail 2130. The stationary unit 2100 may comprise a guide rail 2130. The guide rail 2130 may be coupled between the first housing 2110-1 and the second housing 2110-2. The guide rail 2130 may guide the movement of the first holder 2210 and the second holder 2310. The rail 2130 may guide the first holder 2210 and the second holder 2310 to move in an optical axis direction. The guide rail 2130 may comprise a rail being disposed in an optical axis direction. The guide rail 2130 may comprise a rail being extended in an optical axis direction. The guide rail 2130 may comprise a rail on which the ball 2500 rolls.

The lens driving device 2000 may comprise a substrate 2140. The stationary unit 2100 may comprise a substrate 2140. The substrate 2140 may be disposed on both side surfaces of the housing 2110. The substrate 2140 may be a FPCB. A first coil 2412 and a second coil 2422 may be disposed in the substrate 2140.

The substrate 2140 may comprise a first region 2140-1. The first region 2140-1 may be formed at an end of the substrate 2140. A terminal may be disposed in the first region 2140-1. The substrate 2140 may comprise a second region 2140-2. The first region 2140-1 of the substrate 2140 may be bent inward with respect to the second region 2140-2. Through this, it is possible to minimize the size of the printed circuit board 3300 while securing a soldering arrangement region connecting the terminals of the board 2140 and the printed circuit board 3300. The first region 2140-1 may form an obtuse angle with the second region 2140-2.

The substrate 2140 may comprise a first substrate 2141. The first substrate 2141 may be disposed at one side of the housing 2110. A first coil 2412 may be disposed in the first substrate 2141. First and second Hall sensors 2413 and 2414 may be disposed in the first substrate 2141.

The substrate 2140 may comprise a second substrate 2142. The second substrate 2142 may be disposed at the other side of the housing 2110. The second substrate 2142 may be disposed at an opposite side of the first substrate 2141. A second coil 2422 may be disposed in the second substrate 2142. Third and fourth Hall sensors 2423 and 2424 may be disposed in the second substrate 2142.

The lens driving device 2000 may comprise a SUS 2145. The SUS 2145 may be disposed on substrate 2140. The SUS 2145 may reinforce the strength of the substrate 2140. The SUS 2145 may dissipate heat generated from the substrate 2140.

The lens driving device 2000 may comprise an EEPROM 2150. The EEPROM 2150 may be electrically connected to the first coil 2412 and the second coil 2422. The EEPROM 2150 may be used to control currents applied to the first coil 2412 and the second coil 2422 before connecting the lens driving device 2000 to a driver IC 3900 in the manufacturing process. That is, the EEPROM 2150 may be used to test whether the lens driving device 2000 normally operates. The EEPROM 2150 may be disposed on an inner surface of substrate 2140.

The lens driving device 2000 may comprise a first moving unit 2200. The first moving unit 2200 may move against the stationary unit 2100. At least a portion of the first moving unit 2200 may be disposed between the stationary unit 2100 and the second moving unit 2300. The first moving unit 2200 may move between the stationary unit 2100 and the second moving unit 2300.

The lens driving device 2000 may comprise a first holder 2210. The first moving unit 2200 may comprise a first holder 2210. The first holder 2210 may be disposed inside the housing 2110. The first holder 2210 may move against the housing 2110. At least a portion of the first holder 2210 may be spaced apart from the housing 2110. The first holder 2210 may be in contact with the housing 2110. The first holder 2210 may come into contact with the housing 2110 during moving. Or, the first holder 2210 may be in contact with the housing 2110 in an initial state.

The first holder 2210 may comprise a protrusion 2211. The protrusion 2211 may be a test protrusion. The protrusion 2211 may be formed on an outer surface of the first holder 2210. The protrusion 2211 may be protruded from the first holder 2210. The protrusion 2211 may be visible from the outside through the first hole 2113 of the housing 2110. The protrusion 2211 may be used during testing whether the lens driving device 2000 operates normally. The protrusion 2211 may comprise a plane 2211-1 and an inclined surface 2211-2.

The first holder 2210 may comprise a rail groove 2212. A ball 2500 may be disposed in the rail groove 2212. The ball 2500 may move by rolling in the rail groove 2212. The rail groove 2212 and the ball 2500 may be in contact with each other at two points. The rail groove 2212 may be disposed in an optical axis direction. The rail groove 2212 may be extended in an optical axis direction.

The rail groove 2212 may comprise pluralities of rail grooves. The rail groove 2212 may comprise four rail grooves. The rail groove 2212 may comprise first to fourth rail grooves. One or more balls 2500 may be disposed in each of the plurality of rail grooves 2212.

The first holder 2210 may comprise a protrusion 2213. The protrusion 2213 may be formed on a surface of the first holder 2210 facing the first housing 2110-1. The protrusion 2213 may come into contact with the first housing 2110-1 when the first holder 2210 moves in a direction being closer to the first housing 2110-1. At this time, compared to the case where the protrusion 2213 is omitted, the contact area between the first holder 2210 and the first housing 2110-1 can be reduced when the protrusion 2213 is formed. Through this, shock and noise generated due to contact between the first holder 2210 and the first housing 2110-1 can be minimized.

The lens driving device 2000 may comprise a second lens 2220. Or, the second lens 2220 may be described as a component of the camera device 10 rather than a component of the lens driving device 2000. The first moving unit 2200 may comprise a second lens 2220. The second lens 2220 may be disposed on an optical axis. The second lens 2220 may be disposed between the reflective member 1220 and the image sensor 3400. The second lens 2220 may be disposed between the first lens 2120 and the third lens 2320. The second lens 2220 may be disposed inside the first holder 2210. The second lens 2220 may be coupled to the first holder 2210. The second lens 2220 may be fixed to the first holder 2210. The second lens 2220 may move against the first lens 2120. The second lens 2220 may move separately from the third lens 2320.

The second lens 2220 may be a second group lens. The second lens 2220 may comprise pluralities of lenses. The second lens 2220 may comprise two lenses.

The lens driving device 2000 may comprise a second moving unit 2300. The second moving unit 2300 may move against the stationary unit 2100. The second moving unit 2300 may move separately from the first moving unit 2200. The second moving unit 2300 may be disposed at a rear of the first moving unit 2200. The second moving unit 2300 may move in a direction being closer to and being farther away from the first moving unit 2200.

The lens driving device 2000 may comprise a second holder 2310. The second moving unit 2300 may comprise a second holder 2310. The second holder 2310 may be disposed inside the housing 2110. The second holder 2310 may move against the housing 2110. At least a portion of the second holder 2310 may be spaced apart from the housing 2110. The second holder 2310 may be in contact with the housing 2110. The second holder 2310 may come into contact with the housing 2110 during moving. Or, the second holder 2310 may be in contact with the housing 2110 in an initial state. The second holder 2310 may be in contact with the first holder 2210. The second holder 2310 may be spaced apart from the first holder 2210. The second holder 2310 may come into contact with the first holder 2210 during moving. Or, the second holder 2310 may be in contact with the first holder 2210 in an initial state.

The second holder 2310 may comprise a protrusion 2311. The protrusion 2311 may be a test protrusion. The protrusion 2311 may be formed on an outer surface of the second holder 2310. The protrusion 2311 may be protruded from the second holder 2310. The protrusion 2311 may be visible from the outside through the first hole 2113 of the housing 2110. The protrusion 2311 may be used during testing whether the lens driving device 2000 operates normally. The protrusion 2311 may comprise a flat surface 2311-1 and an inclined surface 2311-2.

The second holder 2310 may comprise a rail groove 2312. A ball 2500 may be disposed in the rail groove 2312. The ball 2500 may move by rolling in the rail groove 2312. The rail groove 2312 and the ball 2500 may be in contact with each other at two points. The rail groove 2312 may be disposed in an optical axis direction. The rail groove 2312 may be extended in an optical axis direction.

The rail groove 2312 may comprise pluralities of rail grooves. The rail groove 2312 may comprise four rail grooves. The rail groove 2312 may comprise first to fourth rail grooves. One or more balls 2500 may be disposed in each of the pluralities of rail grooves 2312.

The second holder 2310 may comprise a protrusion 2313. The protrusion 2313 may be formed on a surface of the second holder 2310 facing the first holder 2210. The protrusion 2313 may come into contact with the first holder 2210 when the second holder 2310 moves in a direction being closer to the first holder 2210. At this time, compared to the case where the protrusion 2313 is omitted, the contact area between the second holder 2310 and the first holder 2210 can be reduced when the protrusion 2313 is formed. Through this, impact and noise being generated due to the contact between the second holder 2310 and the first holder 2210 can be minimized.

The lens driving device 2000 may comprise a third lens 2320. Or, the third lens 2320 may be described as a component of the camera device 10 rather than a component of the lens driving device 2000. The second moving unit 2300 may comprise a third lens 2320. The third lens 2320 may be disposed on an optical axis. The third lens 2320 may be disposed between the reflective member 1220 and the image sensor 3400. The third lens 2320 may be disposed between the second lens 2220 and the image sensor 3400. The third lens 2320 may be disposed inside the second holder 2310. The third lens 2320 may be coupled to the second holder 2310. The third lens 2320 may be fixed to the second holder 2310. The third lens 2320 may move against the first lens 2120. The third lens 2320 may move separately from the second lens 2220.

The third lens 2320 may be a third group lens. The third lens 2320 may comprise pluralities of lenses. The third lens 2320 may comprise two lenses.

The lens driving device 2000 may comprise a driving unit 2400. The driving unit 2400 may move at least some of the plurality of lenses. The driving unit 2400 may move the first moving unit 2200 and the second moving unit 2300 against the stationary unit 2100. The driving unit 2400 may comprise a coil and a magnet. The driving unit 2400 may move the first moving unit 2200 and the second moving unit 2300 through electromagnetic interaction. As a modified embodiment, the driver 2400 may comprise a shape memory alloy.

The driving unit 2400 may comprise a first driving unit 2410. The first driving unit 2410 may move the first moving unit 2200 against the stationary unit 2100. The first driving unit 2410 may move the first moving unit 2200 against the second moving unit 2300. The first driving unit 2410 may be used to drive a zoom function. Or, the first driving unit 2410 may be used to drive an auto focus function.

The first driving unit 2410 may comprise a first driving magnet 2411. The first driving magnet 2411 may be disposed in the first holder 2210. The first driving magnet 2411 may be disposed on a side surface of the first holder 2210. The first driving magnet 2411 may be coupled to the first holder 2210. The first driving magnet 2411 may be fixed to the first holder 2210. The first driving magnet 2411 may be fixed to the first holder 2210 by an adhesive. The first driving magnet 2411 may move integrally with the first holder 2210. The first driving magnet 2411 may be disposed to face the first coil 2412. The first driving magnet 2411 may face the first coil 2412. The first driving magnet 2411 may be disposed at a position corresponding to the first coil 2412. The first driving magnet 2411 may interact with the first coil 2412. The first driving magnet 2411 may interact with the first coil 2412 electromagnetically.

The first driving magnet 2411 may comprise a first magnet portion 2411-1. The first magnet portion 2411-1 may have a first polarity. The first driving magnet 2411 may comprise a second magnet portion 2411-2. The second magnet portion 2411-2 may have a second polarity different from the first polarity. At this time, the first polarity may be an N pole and the second polarity may be an S pole. Conversely, the first polarity may be an S pole and the second polarity may be an N pole.

The first driving magnet 2411 may comprise a neutral portion 2411-3. The neutral portion 2411-3 may be disposed between the first magnet portion 2411-1 and the second magnet portion 2411-2. The neutral portion 2411-3 may have a neutral polarity. The neutral portion 2411-3 may be a non-magnetized portion.

The first driving unit 2410 may comprise a first coil 2412. The first coil 2412 may be disposed in the substrate 2140. The first coil 2412 may be disposed in the first substrate 2141. The first coil 2412 may be disposed in the housing 2110. The first coil 2412 may be disposed outside the first holder 2210. When a current is applied to the first coil 2412, an electromagnetic field is formed around the first coil 2412 and can interact with the first driving magnet 2411.

As a modified embodiment, the first coil 2412 may be disposed in the first holder 2210 and the first driving magnet 2411 may be disposed in the housing 2110.

The first coil 2412 may be formed in a ring shape. The first coil 2412 may be formed as a square ring or a circular ring. Even when the first coil 2412 is formed in a square ring shape, the corner portion may be formed to be curved. The first coil 2412 may comprise a first portion 2412-1 and a second portion 2412-2 having a gap G1 therebetween. First and second Hall sensors 2413 and 2414 may be disposed in the gap G1 of the first coil 2412.

The lens driving device 2000 may comprise a Hall sensor. The Hall sensor may detect the first driving magnet 2411. The Hall sensor may comprise pluralities of Hall sensors. The Hall sensor may comprise a first Hall sensor 2413 and a second Hall sensor 2414. The first Hall sensor 2413 and the second Hall sensor 2414 may be spaced apart from each other. The first Hall sensor 2413 and the second Hall sensor 2414 may be spaced apart such that a gap G2 is formed therebetween. The first Hall sensor 2413 and the second Hall sensor 2414 may detect the first driving magnet 2411. The first Hall sensor 2413 and the second Hall sensor 2414 may detect the magnetic force of the first driving magnet 2411. The first Hall sensor 2413 and the second Hall sensor 2414 may detect the position of the first holder 2210. The first Hall sensor 2413 and the second Hall sensor 2414 may detect the position of the second lens 2220.

The lens driving device 2000 may comprise a yoke 2415. The yoke 2415 may be disposed between the first driving magnet 2411 and the first holder 2210. The yoke 2415 may be formed in a shape corresponding to that of the first driving magnet 2411. The yoke 2415 may increase the interaction force between the first driving magnet 2411 and the first coil 2412.

The yoke 2415 may comprise an extended portion 2415-1. The extended portion 2415-1 may cover the front and rear surfaces of the first driving magnet 2411. The yoke 2415 may comprise a groove 2415-2. The groove 2415-2 may be formed in the central portion of the body portion of the yoke 2415.

The driving unit 2400 may comprise a second driving unit 2420. The second driving unit 2420 may move the second moving unit 2300 against the stationary unit 2100. The second driving unit 2420 may move the second moving unit 2300 against the first moving unit 2200. The second driving unit 2420 may be used to drive an auto focus function. Or, the second driving unit 2420 may be used to drive a zoom function. The second driving unit 2420 may comprise a second driving magnet 2421. The second driving magnet 2421 may be disposed in the second holder 2310. The second driving magnet 2421 may be disposed on a side surface of the second holder 2310. The second driving magnet 2421 may be coupled to the second holder 2310. The second driving magnet 2421 may be fixed to the second holder 2310. The second driving magnet 2421 may be fixed to the second holder 2310 by an adhesive. The second driving magnet 2421 may move integrally with the second holder 2310. The second driving magnet 2421 may be disposed to face the second coil 2422. The second driving magnet 2421 may face the second coil 2422. The second driving magnet 2421 may be disposed at a position corresponding to the second coil 2422. The second driving magnet 2421 may interact with the second coil 2422. The second driving magnet 2421 may interact with the second coil 2422 electromagnetically.

The second driving unit 2420 may comprise a second coil 2422. The second coil 2422 may be disposed in the substrate 2140. The second coil 2422 may be disposed in the second substrate 2142. The second coil 2422 may be disposed in the housing 2110. The second coil 2422 may be disposed outside the second holder 2310. When a current is applied to the second coil 2422, an electromagnetic field is formed around the second coil 2422 and can interact with the second driving magnet 2421.

As a modified embodiment, the second coil 2422 may be disposed in the second holder 2310 and the second driving magnet 2421 may be disposed in the housing 2110.

The lens driving device 2000 may comprise a Hall sensor. The Hall sensor may detect the second driving magnet 2421. The Hall sensor may comprise pluralities of Hall sensors. The Hall sensor may comprise a third Hall sensor 2423 and a fourth Hall sensor 2424. The third Hall sensor 2423 and the fourth Hall sensor 2424 may be spaced apart from each other. The third Hall sensor 2423 and the fourth Hall sensor 2424 may be spaced apart such that a gap G2 is formed therebetween. The third Hall sensor 2423 and the fourth Hall sensor 2424 may detect the second driving magnet 2421. The third Hall sensor 2423 and the fourth Hall sensor 2424 may detect the magnetic force of the second driving magnet 2421. The third Hall sensor 2423 and the fourth Hall sensor 2424 may detect the position of the second holder 2310. The third Hall sensor 2423 and the fourth Hall sensor 2424 may detect the position of the third lens 2320.

The lens driving device 2000 may comprise a yoke 2425. The yoke 2425 may be disposed between the second driving magnet 2421 and the second holder 2310. The yoke 2425 may be formed in a shape corresponding to that of the second driving magnet 2421. The yoke 2425 may increase the interaction force between the second driving magnet 2421 and the second coil 2422.

The lens driving device 2000 may comprise a first yoke 2430. The first yoke 2430 may be disposed so that an attractive force acts between the first driving magnet 2411 and the first yoke 2430. The first yoke 2430 may be disposed in the housing 2110. The first yoke 2430 may be disposed in the substrate 2140. The first yoke 2430 may be disposed in the first substrate 2141. The first holder 2210 may press the ball 2500 toward the guide rail 2130 by the attractive force between the first driving magnet 2411 and the first yoke 2430. That is, the ball 2500 may be maintained between the first holder 2210 and the guide rail 2130 without being detached by the attractive force between the first driving magnet 2411 and the first yoke 2430.

The lens driving device 2000 may comprise a second yoke 2440. The second yoke 2440 may be disposed so that attractive force acts between the second driving magnet 2421 and the second yoke 2440. The second yoke 2440 may be disposed in the housing 2110. The second yoke 2440 may be disposed in the substrate 2140. The second yoke 2440 may be disposed in the second substrate 2142. The second holder 2310 may press the ball 2500 toward the guide rail 2130 by the attractive force between the second driving magnet 2421 and the second yoke 2440. That is, the ball 2500 may be maintained between the second holder 2310 and the guide rail 2130 without being detached by the attractive force between the second driving magnet 2421 and the second yoke 2440.

The lens driving device 2000 may comprise a ball 2500. The ball 2500 may guide the movement of the first holder 2210. The ball 2500 may be disposed between the first holder 2210 and the guide rail 2130. The ball 2500 may guide the movement of the second holder 2310. The ball 2500 may be disposed between the second holder 2310 and the guide rail 2130. The ball 2500 may be formed in a spherical shape. The ball 2500 may roll the rail groove 2212 of the first holder 2210 and the rail 2133 of the guide rail 2130. The ball 2500 may roll in an optical axis direction between the rail groove 2212 of the first holder 2210 and the rail 2133 of the guide rail 2130. The ball 2500 may roll the rail groove 2312 of the second holder 2310 and the rail 2133 of the guide rail 2130. The ball 2500 may move in an optical axis direction between the rail groove 2312 of the second holder 2310 and the rail 2133 of the guide rail 2130. The ball 2500 may comprise pluralities of balls. A total of 8 balls 2500 may be provided: 4 balls in the first holder 2210; and 4 balls in the second holder 2310.

The lens driving device 2000 may comprise a dummy glass 2600. The dummy glass 2600 may be disposed in the housing 2110. The dummy glass 2600 may close the rear opening of the housing 2110. The dummy glass 2600 may be transparent to allow light to pass therethrough.

The lens driving device 2000 may comprise a foron 2700. The poron 2700 may be an impact absorbing member. The foron 2700 can minimize impact and noise being generated by movement of the first holder 2210 and the second holder 2310. The foron 2700 may be disposed at a portion where the first holder 2210 collides with the housing 2110. The foron 2700 may be disposed at a portion where the second holder 2310 collides with the housing 2110.

Figure 57:
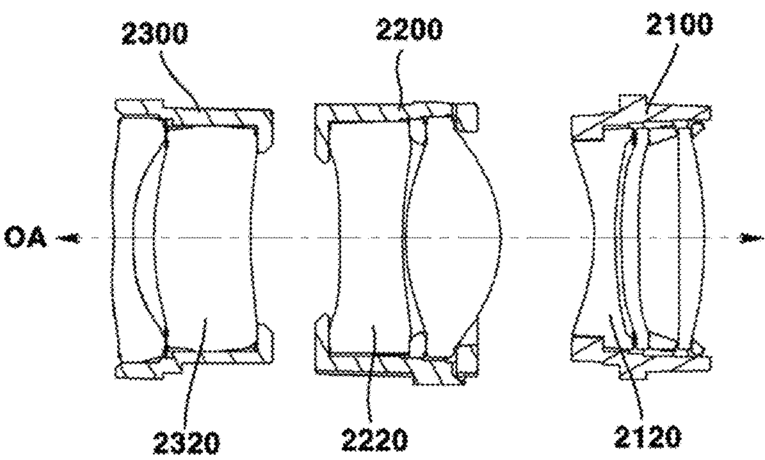
FIGS. 57 to 59 are views for explaining implementation of a zoom function and an autofocus function of a lens driving device according to the present embodiment.
Figure 58:
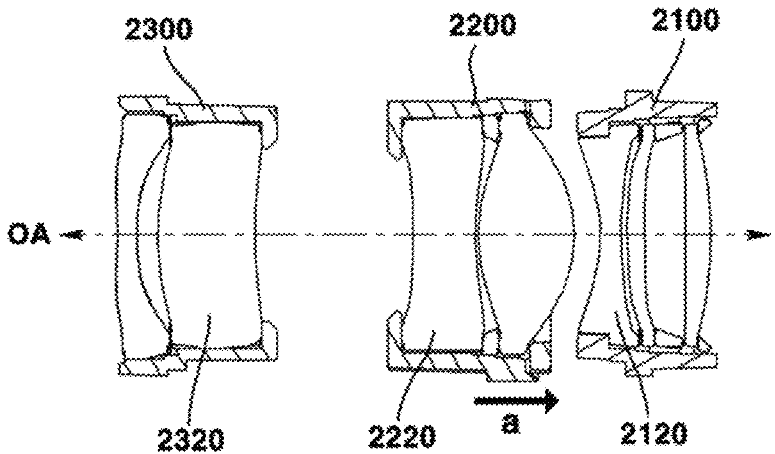
Figure 59:
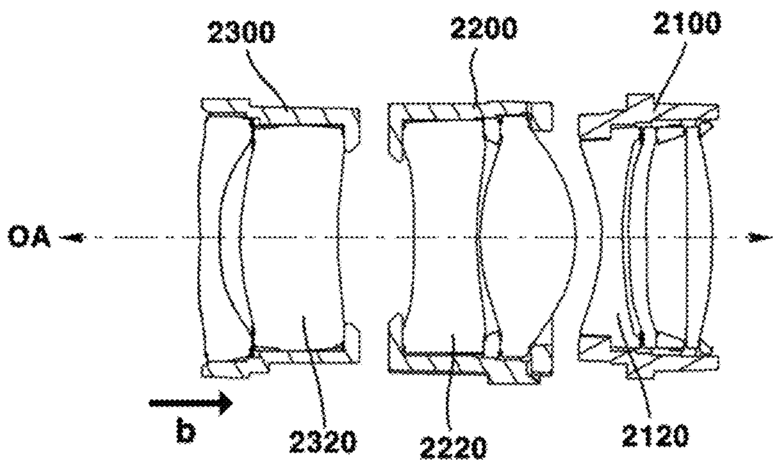

FIGS. 57 to 59 are views for explaining implementation of a zoom function and an autofocus function of a lens driving device according to the present embodiment.

In the present embodiment, in an initial state in which current is not supplied to the driving unit 2400, the first lens 2120, the second lens 2220, and the third lens 2320 may be disposed in alignment with the optical axis OA (refer to FIG. 57).

At this time, when a current is applied to the first coil 2412, the second lens 2220 moves along an optical axis OA due to the electromagnetic interaction between the first coil 2412 and the first driving magnet 2411 (refer to a in FIG. 58). As the second lens 2220 moves while the first lens 2120 is fixed, a zoom function may be performed. When a current in a first direction is applied to the first coil 2412, the second lens 2220 may move in a direction being closer to the first lens 2120. When a current in a second direction which is opposite to the first direction is applied to the first coil 2412, the second lens 2220 may move in a direction being farther away from the first lens 2120.

Meanwhile, when a current is applied to the second coil 2422, the third lens 2320 may move along an optical axis OA due to electromagnetic interaction between the second coil 2422 and the second driving magnet 2421 (refer to b in FIG. 59). An auto focus (AF) function may be performed by relative movement of the third lens 2320 against the first lens 2120 and the second lens 2220. When a current in a first direction is applied to the second coil 2422, the third lens 2320 may move in a direction being closer to the first lens 2120. When a current in a second direction which is opposite to the first direction is applied to the second coil 2422, the third lens 2320 may move in a direction being farther away from the first lens 2120.

Hereinafter, a camera device according to the present embodiment will be described with reference to drawings.

Figure 60:
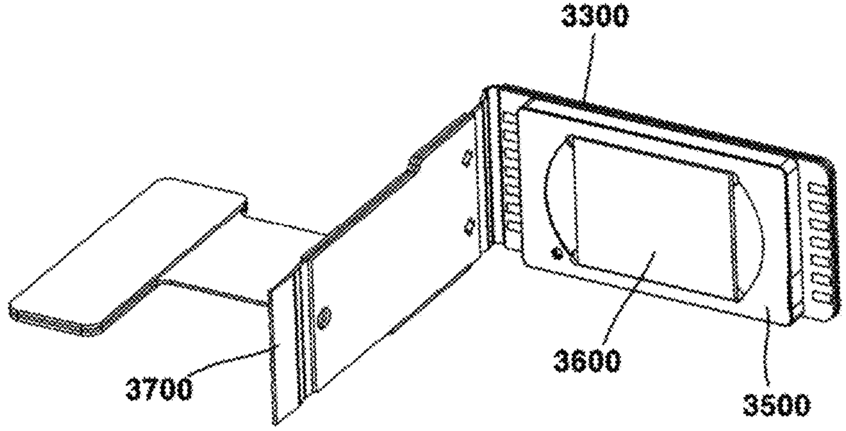
FIG. 60 is a perspective view of some components of a camera device according to the present embodiment.
Figure 61:
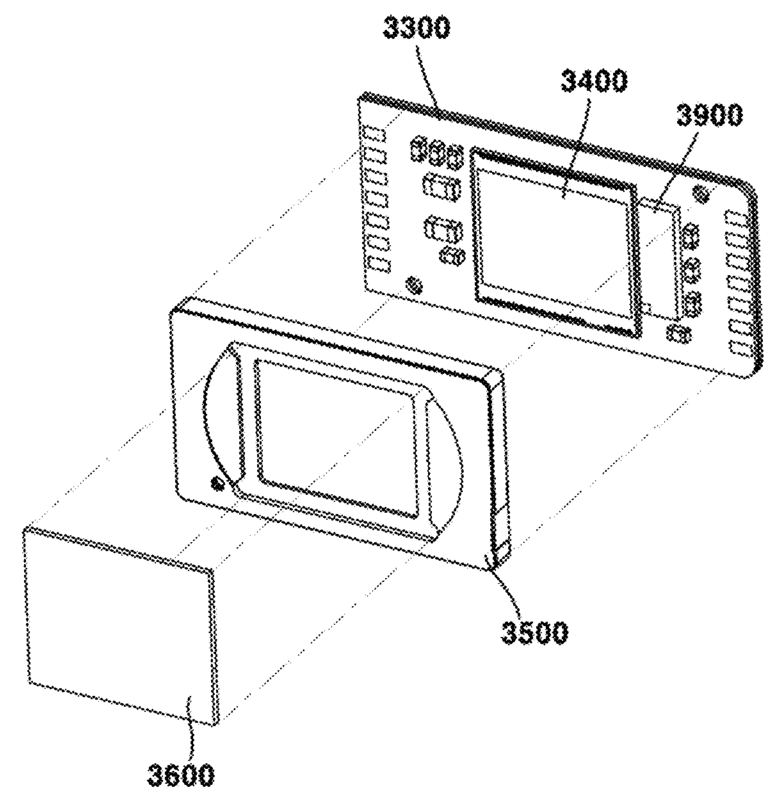
FIG. 61 is an exploded perspective view of an image sensor and a filter and related components of a camera device according to the present embodiment.

FIG. 1 is a perspective view of a camera device according to the present embodiment; FIG. 2 is a bottom perspective view of a camera device according to the present embodiment; FIG. 3 is a plan view of a camera device according to the present embodiment; FIG. 4 is a cross-sectional view seen from A-A in FIG. 3; FIG. 5 is a cross-sectional view seen from line B-B in FIG. 3; FIG. 6 is a cross-sectional view seen from C-C in FIG. 3; FIG. 7 is an exploded perspective view of a camera device according to the present embodiment; FIG. 8 is a perspective view in which a cover member is omitted from the camera device according to the present embodiment; FIG. 60 is a perspective view of some components of a camera device according to the present embodiment; and FIG. 61 is an exploded perspective view of an image sensor and a filter and related components of a camera device according to the present embodiment.

The camera device 10 may comprise a cover member 3100. The cover member 3100 may be a 'cover can' or a 'shield can'. The cover member 3100 may be disposed to cover the reflective member driving device 1000 and the lens driving device 2000. The cover member 3100 may be disposed outside the reflective member driving device 1000 and the lens driving device 2000. The cover member 3100 may cover the reflective member driving device 1000 and the lens driving device 2000. The cover member 3100 may accommodate the reflective member driving device 1000 and the lens driving device 2000. The cover member 3100 may be formed of a metal material. The cover member 3100 may block electromagnetic interference (EMI).

The cover member 3100 may comprise an upper plate 3110. The upper plate 3110 may comprise an opening or hole. Light may be incident through an opening or hole of the upper plate 3110. The opening or hole of the upper plate 3110 may be formed at a position corresponding to that of the reflective member 1220.

The cover member 3100 may comprise a side plate 3120. The side plate 3120 may comprise pluralities of side plates. The side plate 3120 may comprise four side plates. The side plate 3120 may comprise first to fourth side plates. The side plate 3120 may comprise first and second side plates being disposed at an opposite side to each other, and third and fourth side plates being disposed at an opposite side to each other.

The camera device 10 may comprise a printed circuit board 3300 (PCB). The printed circuit board 3300 may be a substrate or a circuit board. A sensor base 3500 may be disposed in the printed circuit board 3300. The printed circuit board 3300 may be electrically connected to the reflective member driving device 1000 and the lens driving device 2000. The printed circuit board 3300 may comprise various circuits, elements, and control units to convert an image formed by the image sensor 3400 into an electrical signal and transmit the converted electrical signal to an external device. The printed circuit board 3300 may comprise a marking portion 3310. The marking portion 3310 may be disposed on a rear surface of the printed circuit board 3300.

The camera device 10 may comprise a SUS 3320. The SUS 3320 may be disposed on a rear surface of the printed circuit board 3300. The SUS 3320 may reinforce the strength of the printed circuit board 3300. The SUS 3320 may dissipate heat being generated in the printed circuit board 3300.

The camera device 10 may comprise an image sensor 3400. The image sensor 3400 may be disposed in the printed circuit board 3300. Light passing through the lens and the filter 3600 may be incident on the image sensor 3400 to form an image. The image sensor 3400 may be electrically connected to the printed circuit board 3300. For an example, the image sensor 3400 may be coupled to the printed circuit board 3300 by a surface mounting technology (SMT). As another example, the image sensor 3400 may be coupled to the printed circuit board 3300 using a flip chip technology. The image sensor 3400 may be disposed such that an optical axis coincides with a lens. An optical axis of the image sensor 3400 and an optical axis of the lens may be aligned. The image sensor 3400 may convert light irradiated onto an effective image region of the image sensor 3400 into an electrical signal. The image sensor 3400 may comprise one or more among a charge coupled device (CCD), a metal oxide semi-conductor (MOS), a CPD, and a CID.

The camera device 10 may comprise a sensor base 3500. The sensor base 3500 may be disposed in the printed circuit board 3300. A filter 3600 may be disposed in the sensor base 3500. An opening may be formed in a portion of the sensor base 3500 where the filter 3600 is disposed so that light passing through the filter 3600 may be incident to the image sensor 3400.

The camera device 10 may comprise a filter 3600. The filter 3600 may serve to block light of a specific frequency band from entering the image sensor 3400 from light passing through the lens. The filter 3600 may be disposed between the lens and the image sensor 3400. The filter 3600 may be disposed in the sensor base 3500. The filter 3600 may comprise an infrared filter. The infrared filter may block light of an infrared region from being incident on the image sensor 3400.

The camera device 10 may comprise a substrate 3700. The substrate 3700 may be connected to the printed circuit board 3300. The substrate 3700 may be extended from the printed circuit board 3300. The substrate 3700 may comprise terminals electrically connected to the reflective member driving device 1000. The substrate 3700 may comprise an extended portion being extended outward.

The camera device 10 may comprise a connector 3710. The connector 3710 may be disposed in substrate 3700. The connector 3710 may be disposed on a lower surface of the extended portion of the substrate 3700. For an example, the connector 3710 may be connected to a power supply unit of a smart phone.

The camera device 10 may comprise a temperature sensor 3800. The temperature sensor 3800 may detect temperature. The temperature detected by the temperature sensor 3800 may be used for more accurate control of one or more among the hand shake correction function, the auto focus function, and the zoom function.

The camera device 10 may comprise a driver IC 3900. The driver IC 3900 may be electrically connected to the lens driving device 2000. The driver IC 3900 may be described as one component of the lens driving device 2000. The driver IC 3900 may be electrically connected to the first coil 2412 and the second coil 2422 of the lens driving device 2000. The driver IC 3900 may supply current to the first coil 2412 and the second coil 2422 of the lens driving device 2000. The driver IC 3900 may control at least one of voltage or current applied to each of the first coil 2412 and the second coil 2422 of the lens driving device 2000. The driver IC 3900 may be electrically connected to the Hall sensors 2413, 2414, 2423, and 2424. The driver IC 3900 may control the feedback of the voltage and current applied to the first coil 2412 and the second coil 2422 through the positions of the second lens 2220 and the third lens 2320 detected by the Hall sensors 2413, 2414, 2423, and 2424.

Hereinafter, an optical device according to the present embodiment will be described with reference to drawings.

Figure 62:
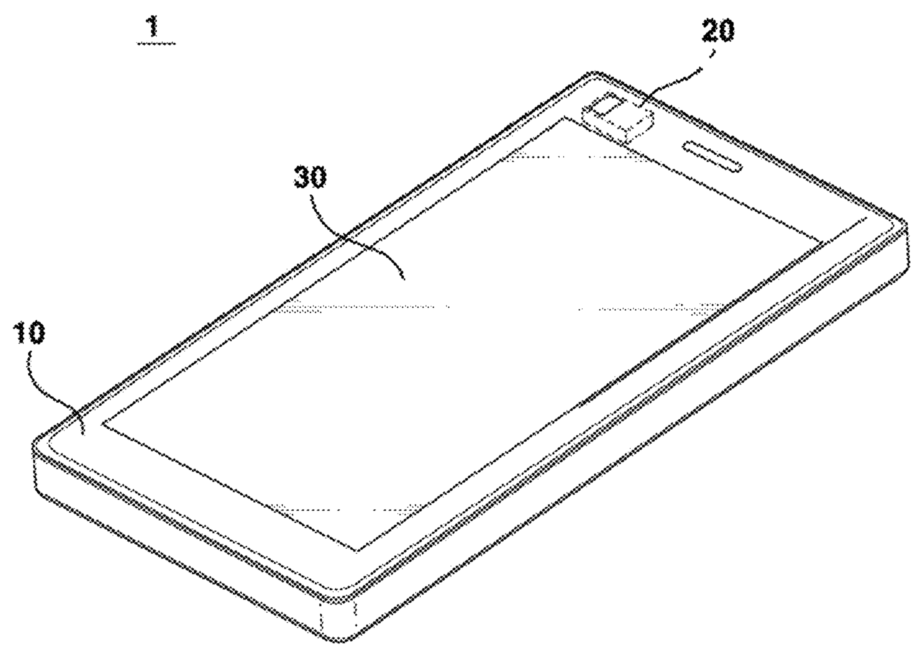
FIG. 62 is a perspective view of the front of the optical device according to the present embodiment.
Figure 63:
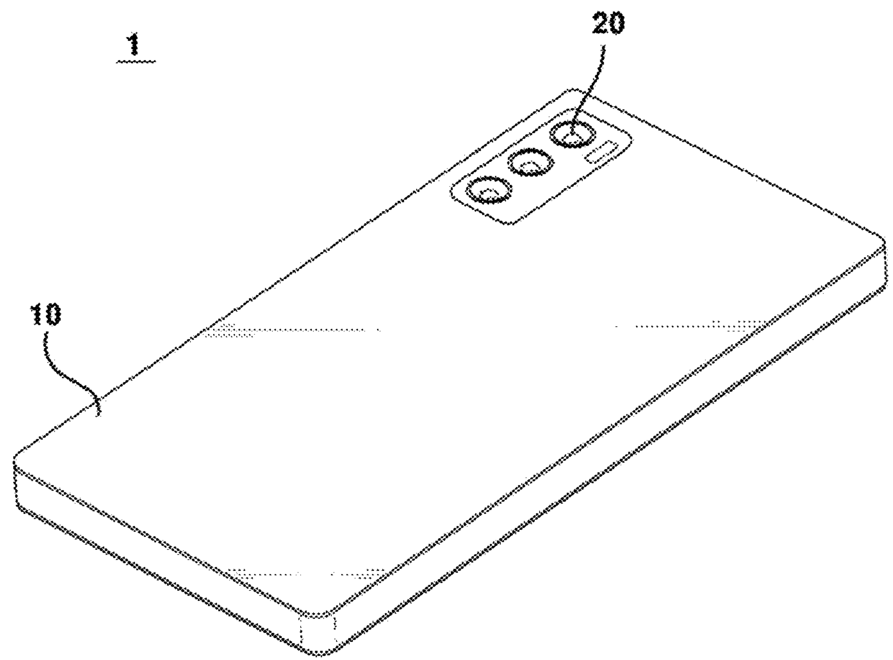
FIG. 63 is a perspective view of the rear of the optic according to the present embodiment.

FIG. 62 is a perspective view of the front of the optical device according to the present embodiment; and FIG. 63 is a perspective view of the rear of the optic according to the present embodiment.

The optical device 1 may comprise any one or more among a hand phone, a portable phone, a portable terminal, a mobile terminal, a smart phone, a smart pad, a portable smart device, a digital camera, a laptop computer, a digital broadcasting terminal, and personal digital assistants (PDAs), portable multimedia player (PMP), and navigation. The optical device 1 may comprise any device for photographing images or photos.

The optical device 1 may comprise a main body 20. The optical device 1 may comprise a camera device 10. The camera device 10 may be disposed in the main body 20. The camera device 10 may photograph a subject. The optical device 1 may comprise a display 30. The display 30 may be disposed in the main body 20. The display 30 may output any one or more of videos and images photographed by the camera device 10. The display 30 may be disposed at a first surface of the main body 20. The camera device 10 may be disposed on at least one of a first surface of the main body 20 and a second surface at an opposite side of the first surface.

The camera device 10 according to the present embodiment may be a folded camera module. The folded camera module may have an angle of view of 15 degrees to 40 degrees. The folded camera module may have a focal length of 18 mm to 20 mm or more. The folded camera module may be used as a rear camera of the optical device 1. A main camera having an angle of view of 70 degrees to 80 degrees may be disposed on a rear surface of the optical device 1. At this time, the folded camera can be placed next to the main camera. That is, the camera device 10 according to the present embodiment may be applied to any one or more of pluralities of rear cameras of the optical device 1. The camera device 10 according to the present embodiment may be applied to one camera among two, three, four or more of rear cameras of the optical device 1.

Meanwhile, the camera device 10 according to the present embodiment may be disposed at a front side of the optical device 1 as well. However, when the front camera of the optical device 1 is one, a wide-angle camera may be applied. When there are two or more of front cameras of the optical device 1, one of them could be a tele-camera like the present embodiment. However, since the focal length is shorter than that of the rear tele-camera, a normal camera module not equipped with a reflective member other than a folded camera module may be applied.

Although the embodiments of the present invention have been described with reference to the accompanying drawings, those skilled in the art to which the present invention pertains will understand that the present invention can be embodied in other specific forms without changing its technical spirit or essential features. Therefore, the embodiments described above should be understood as illustrative in all respects and not limiting.

The invention claimed is:

1. An actuator device comprising:
a housing;
a holder disposed in the housing;
a reflective member disposed on the holder;
a magnet disposed on the holder,
a coil disposed to interact with the magnet; and
a moving plate disposed between the housing and the holder,
wherein the holder comprises a first surface disposed with the moving plate, a second surface connected with the first surface, and a third surface and a fourth surface connected with the first surface and the second surface and disposed opposite to each other,
wherein the magnet is disposed on at least one of the third and fourth surfaces of the holder,
wherein the magnet comprises a first surface facing a same direction with the first surface of the holder, and a second surface opposite to the first surface of the magnet, and
wherein a first yoke is disposed on the second surface of the magnet.

2. The actuator device of claim 1, wherein the holder comprises a groove concavely formed on the third surface and the fourth surface of the holder,
wherein the magnet is disposed on the groove of the holder, and
wherein the first yoke is disposed between the second surface of the magnet and the holder.

3. The actuator device of claim 1, wherein the magnet comprises a third surface facing the coil and a fourth surface opposite to the third surface of the magnet, and
wherein a second yoke is disposed between the fourth surface of the magnet and the holder.

4. The actuator device of claim 3, wherein the first yoke is formed as a separate member from the second yoke.

5. The actuator device of claim 1, wherein a yoke is not disposed between the first surface of the magnet and the holder.

6. The actuator device of claim 1, wherein the magnet comprises a first sub magnet disposed on the third surface of the holder, and a second sub magnet disposed on the fourth surface of the holder, and
wherein the first yoke is disposed on each of the first sub magnet and the second sub magnet.

7. The actuator device of claim 6, wherein the first yoke is not overlapped with the first sub magnet in a direction in which the first sub magnet faces the second sub magnet.

8. The actuator device of claim 1, wherein the first yoke comprises a chamfered shape at a corner of the first yoke.

9. The actuator device of claim 1, comprising:
a rigid mover coupled with the holder; and
a damper connecting the rigid mover and the housing.

10. The actuator device of claim 9, comprising:
a first magnet disposed on the rigid mover; and
a second magnet disposed on the housing,
wherein the second magnet is configured to generate a repulsive force with the first magnet.

11. The actuator device of claim 10, wherein a central axis of the first magnet is disposed to be eccentric with a central axis of the moving plate.

12. A camera device comprising:
a printed circuit board;

an image sensor disposed on the printed circuit board;

the actuator device of claim 1; and a lens disposed on an optical path formed by the reflective member of the actuator device and the image sensor.

13. An optical device comprising:

a main body;

the camera device of claim 12 disposed on the main body; and a display disposed on the main body and outputting at least one of a video and an image photographed by the camera device.

14. An actuator device comprising:

a housing;

a holder disposed in the housing;

a reflective member disposed on the holder;

a magnet disposed on the holder;

a coil disposed to interact with the magnet; and a moving plate disposed between the housing and the holder, wherein the holder comprises a first surface disposed with the moving plate, a second surface connected with the first surface, and third and fourth surfaces connected with the first surface and the second surface and disposed opposite to each other, wherein the magnet is disposed on at least one of the third and fourth surfaces of the holder, wherein the magnet comprises a first surface facing a same direction with the first surface of the holder, a second surface opposite to the first surface of the magnet, a third surface facing the coil, and a fourth surface opposite to the third surface of the magnet, and wherein the magnet comprises a first recess formed on a corner region where the second surface of the magnet and the fourth surface of the magnet meet.

15. The actuator device of claim 14, wherein the first recess is a shape in which a part is omitted when compared to a corner area where the second surface of the magnet and the third surface of the magnet meet.

16. The actuator device of claim 14, wherein the first recess comprises an inclined surface slantedly connecting the second surface of the magnet and the third surface of the magnet.

17. The actuator device of claim 14, wherein a length of the third surface of the magnet is greater than a length of the fourth surface of the magnet in a direction in which the first surface of the magnet faces the second surface of the magnet.

18. The actuator device of claim 14, wherein the magnet comprises a second recess formed on a corner region where the first surface of the magnet and the fourth surface of the magnet meet.

19. The actuator device of claim 14, wherein a length of the second surface of the magnet is 40 to 60% of a distance between the third surface of the magnet and the fourth surface of the magnet in a direction in which the third surface of the magnet faces the fourth surface of the magnet.

20. A camera device comprising:

an image sensor;

a reflective member;

a lens disposed between the image sensor and the reflective member;

a reflective member driving device configured to move the reflective member; and a lens driving device configured to move the lens, wherein the reflective member driving device comprises a holder coupled with the reflective member and a driving magnet disposed on the holder, wherein the holder of the reflective member driving device comprises a first surface, and second and third surfaces disposed on both sides of the first surface, wherein the driving magnet comprises a first driving magnet disposed on the first surface of the holder and a second driving magnet disposed on at least one of the second surface and the third surface of the holder, wherein the second driving magnet comprises a first surface facing the lens driving device, and wherein a yoke is disposed on the first surface of the driving magnet.

* * * * *